Aug. 18, 1959   F. G. STEELE ET AL   2,900,134
DIGITAL DIFFERENTIAL ANALYZER

Filed March 26, 1951   32 Sheets-Sheet 1

INVENTORS:
FLOYD G. STEELE
WILLIAM F. COLLISON

By *Herbert E. Metcalf*

THEIR PATENT ATTORNEY

INVENTORS:
FLOYD G. STEELE
WILLIAM F. COLLISON

THEIR PATENT ATTORNEY

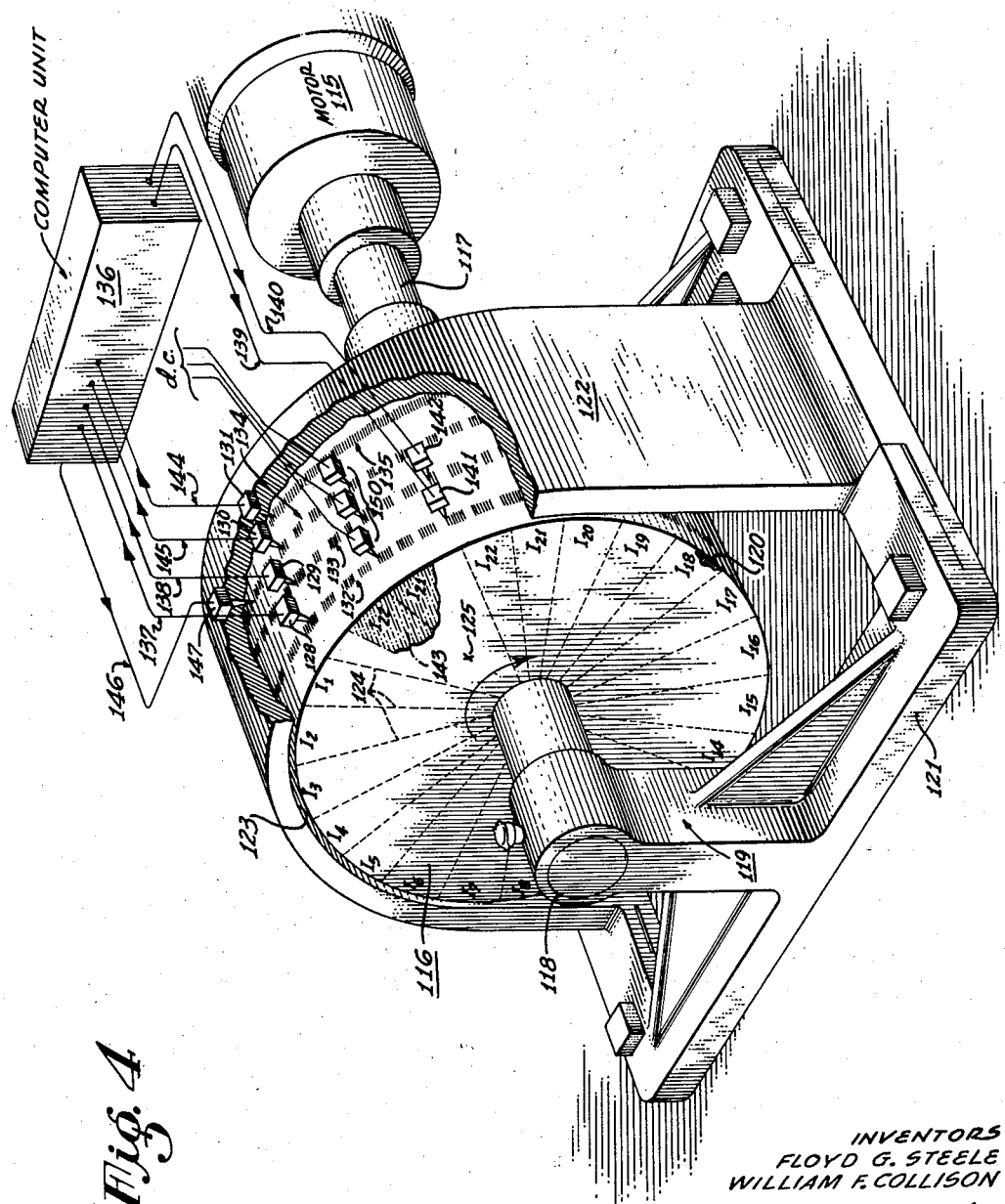

Aug. 18, 1959 — F. G. STEELE ET AL — 2,900,134
DIGITAL DIFFERENTIAL ANALYZER
Filed March 26, 1951

INVENTORS:
FLOYD G. STEELE
WILLIAM F. COLLISON
By Herbert E. Metcalf
THEIR PATENT ATTORNEY

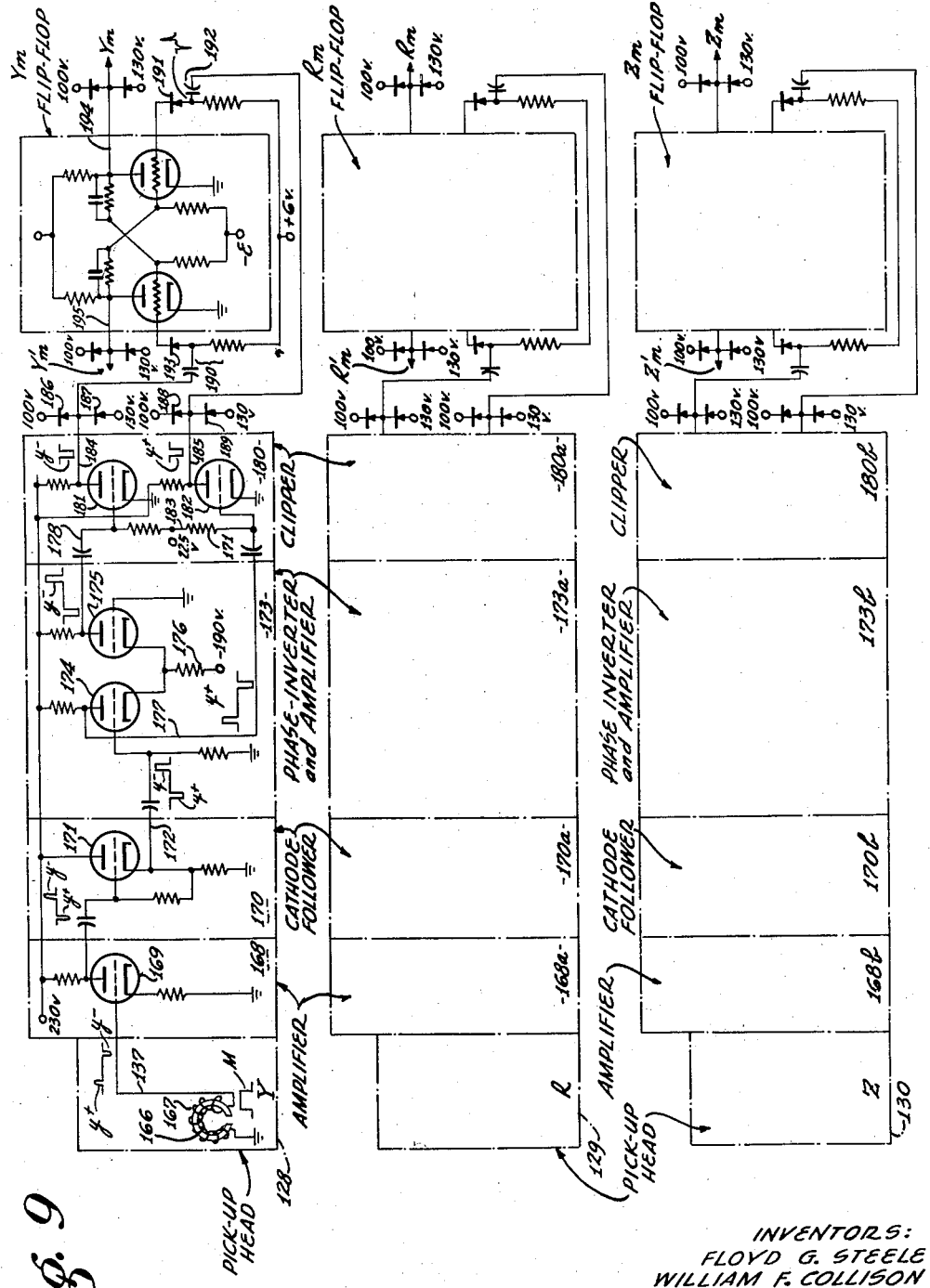

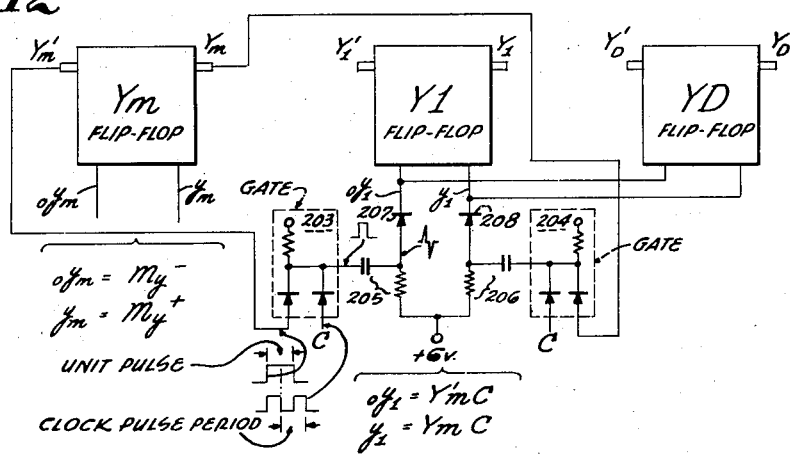
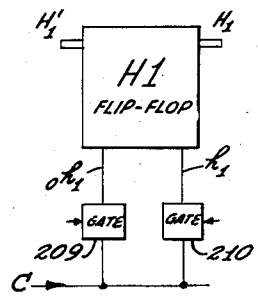
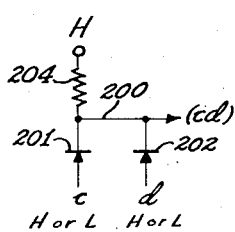
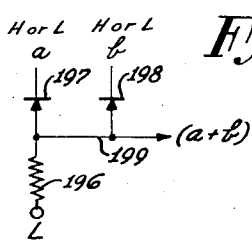

Aug. 18, 1959   F. G. STEELE ET AL   2,900,134
DIGITAL DIFFERENTIAL ANALYZER
Filed March 26, 1951   32 Sheets-Sheet 10
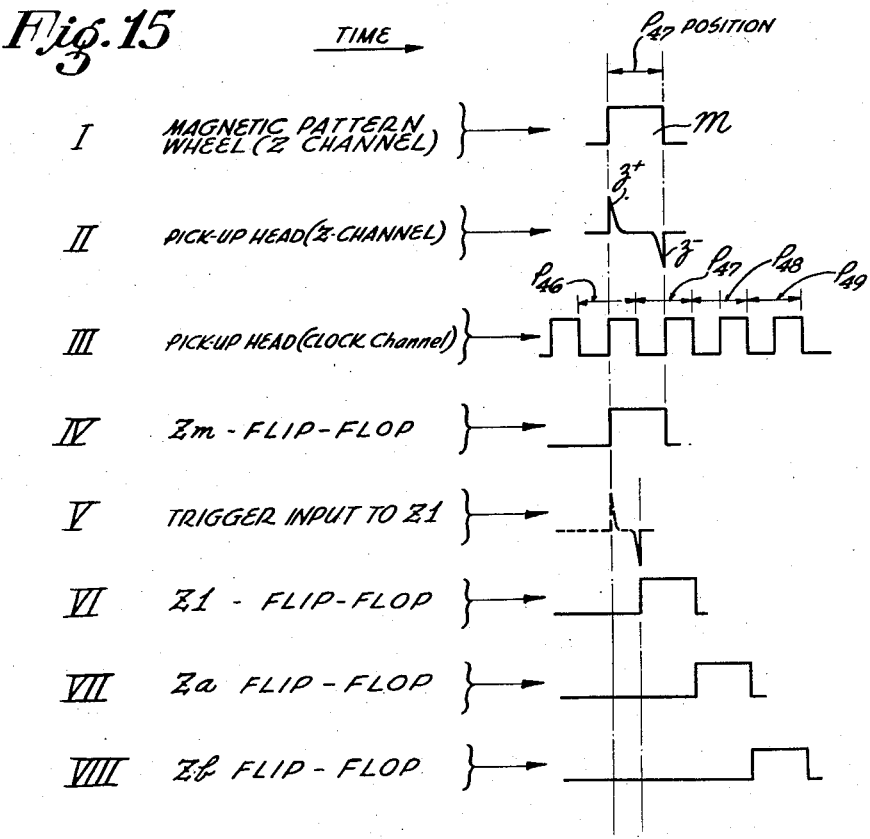
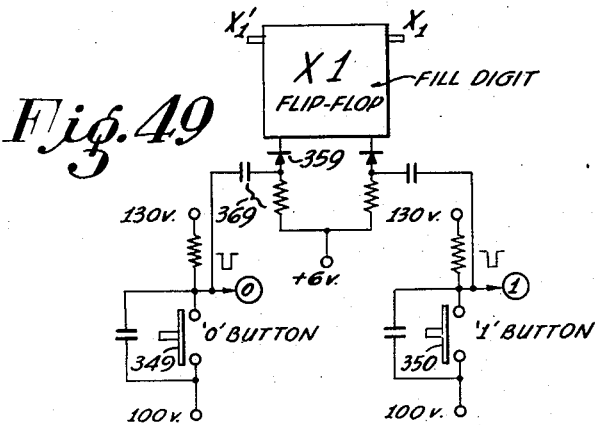
INVENTORS:
FLOYD G. STEELE
WILLIAM F. COLLISON
THEIR PATENT ATTORNEY

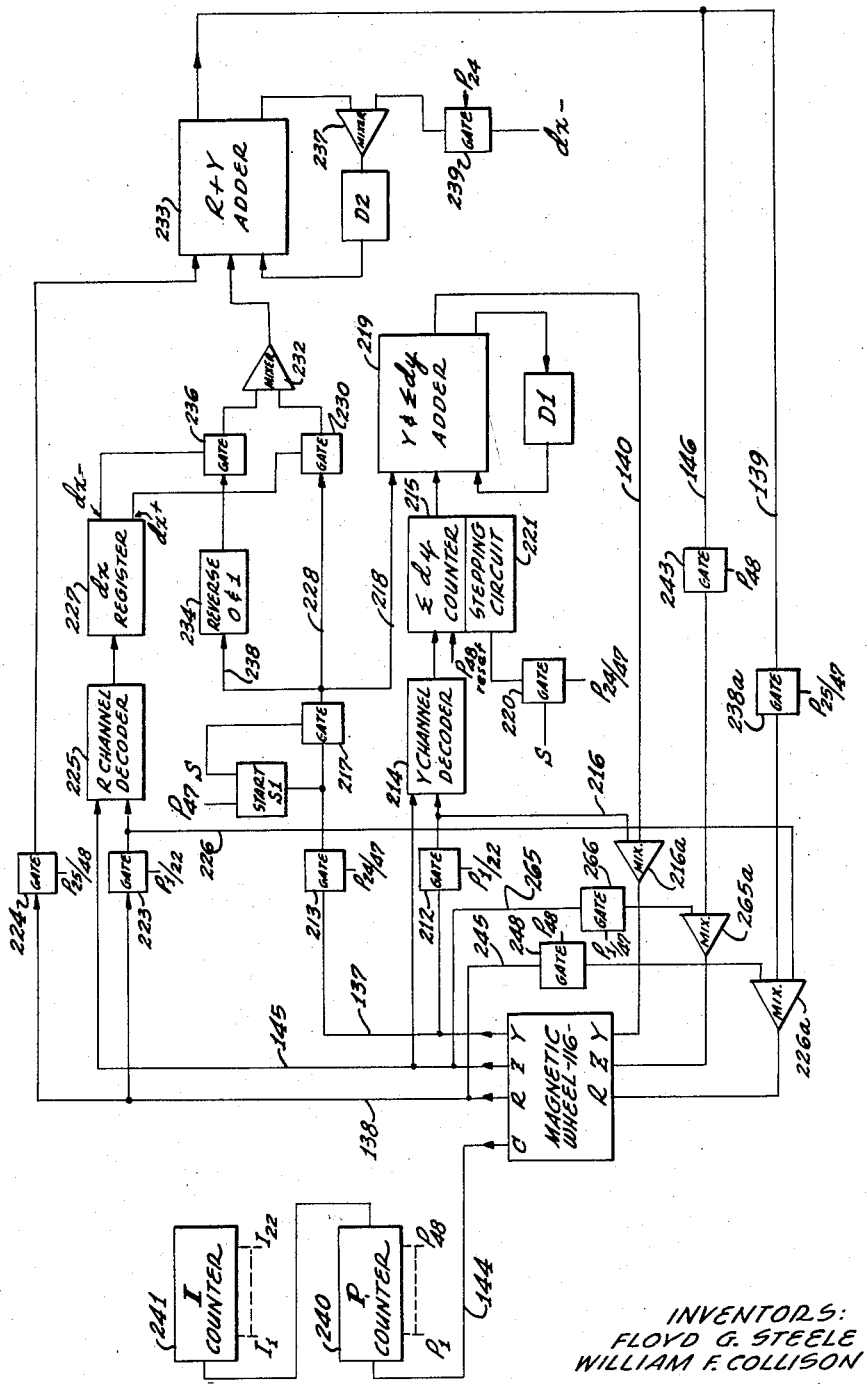

Fig. 18

| # | F1 | F2 | F3 | F4 | F5 | F6 |
|---|----|----|----|----|----|----|
| 1 | 0 | 0 | 0 | 1 | 0 | 0 |
| 2 | 1 | 0 | 0 | 1 | 0 | 0 |
| 3 | 0 | 1 | 0 | 1 | 0 | 0 |
| 4 | 1 | 1 | 0 | 1 | 0 | 0 |
| 5 | 0 | 0 | 1 | 1 | 0 | 0 |
| 6 | 1 | 0 | 1 | 1 | 0 | 0 |
| 7 | 0 | 1 | 1 | 1 | 0 | 0 |
| 8 | 1 | 1 | 1 | 1 | 0 | 0 |
| 9 | 0 | 0 | 0 | 0 | 1 | 0 |
| 10 | 1 | 0 | 0 | 0 | 1 | 0 |
| 11 | 0 | 1 | 0 | 0 | 1 | 0 |
| 12 | 1 | 1 | 0 | 0 | 1 | 0 |
| 13 | 0 | 0 | 1 | 0 | 1 | 0 |
| 14 | 1 | 0 | 1 | 0 | 1 | 0 |
| 15 | 0 | 1 | 1 | 0 | 1 | 0 |
| 16 | 1 | 1 | 1 | 0 | 1 | 0 |
| 17 | 0 | 0 | 0 | 1 | 1 | 0 |
| 18 | 1 | 0 | 0 | 1 | 1 | 0 |
| 19 | 0 | 1 | 0 | 1 | 1 | 0 |
| 20 | 1 | 1 | 0 | 1 | 1 | 0 |
| 21 | 0 | 0 | 1 | 1 | 1 | 0 |
| 22 | 1 | 0 | 1 | 1 | 1 | 0 |
| 23 | 0 | 1 | 1 | 1 | 1 | 0 |
| 24 | 1 | 1 | 1 | 1 | 1 | 0 |
| 25 | 0 | 0 | 0 | 1 | 0 | 1 |
| 26 | 1 | 0 | 0 | 1 | 0 | 1 |
| 27 | 0 | 1 | 0 | 1 | 0 | 1 |
| 28 | 1 | 1 | 0 | 1 | 0 | 1 |
| 29 | 0 | 0 | 1 | 1 | 0 | 1 |
| 30 | 1 | 0 | 1 | 1 | 0 | 1 |
| 31 | 0 | 1 | 1 | 1 | 0 | 1 |
| 32 | 1 | 1 | 1 | 1 | 0 | 1 |
| 33 | 0 | 0 | 0 | 0 | 1 | 1 |
| 34 | 1 | 0 | 0 | 0 | 1 | 1 |
| 35 | 0 | 1 | 0 | 0 | 1 | 1 |
| 36 | 1 | 1 | 0 | 0 | 1 | 1 |
| 37 | 0 | 0 | 1 | 0 | 1 | 1 |
| 38 | 1 | 0 | 1 | 0 | 1 | 1 |
| 39 | 0 | 1 | 1 | 0 | 1 | 1 |
| 40 | 1 | 1 | 1 | 0 | 1 | 1 |
| 41 | 0 | 0 | 0 | 1 | 1 | 1 |
| 42 | 1 | 0 | 0 | 1 | 1 | 1 |
| 43 | 0 | 1 | 0 | 1 | 1 | 1 |
| 44 | 1 | 1 | 0 | 1 | 1 | 1 |
| 45 | 0 | 0 | 1 | 1 | 1 | 1 |
| 46 | 1 | 0 | 1 | 1 | 1 | 1 |
| 47 | 0 | 1 | 1 | 1 | 1 | 1 |
| 48 | 1 | 1 | 1 | 1 | 1 | 1 |

P - PULSES $P_{1/22} = F_6'(F_2' + F_3' + F_4' + F_5')$
$P_{1/22}' = F_6 + F_2 F_3 F_4 F_5$ $P_{24} = F_1 F_2 F_3 F_4 F_5 F_6'$
$P_{24}' = F_1' + F_2' + F_3' + F_4' + F_5' + F_6$ $P_{24/48} = F_6 + F_1 F_2 F_3 F_4 F_5$ $P_{47} = F_1' F_2 F_3 F_4 F_5 F_6$
$P_{48} = F_1 F_2 F_3 F_4 F_5 F_6$
$P_{48}' = F_1' + F_2' + F_3' + F_4' + F_5' + F_6'$

INVENTORS:
FLOYD G. STEELE
WILLIAM F. COLLISON

By Herbert E. Metcalf

THEIR PATENT ATTORNEY

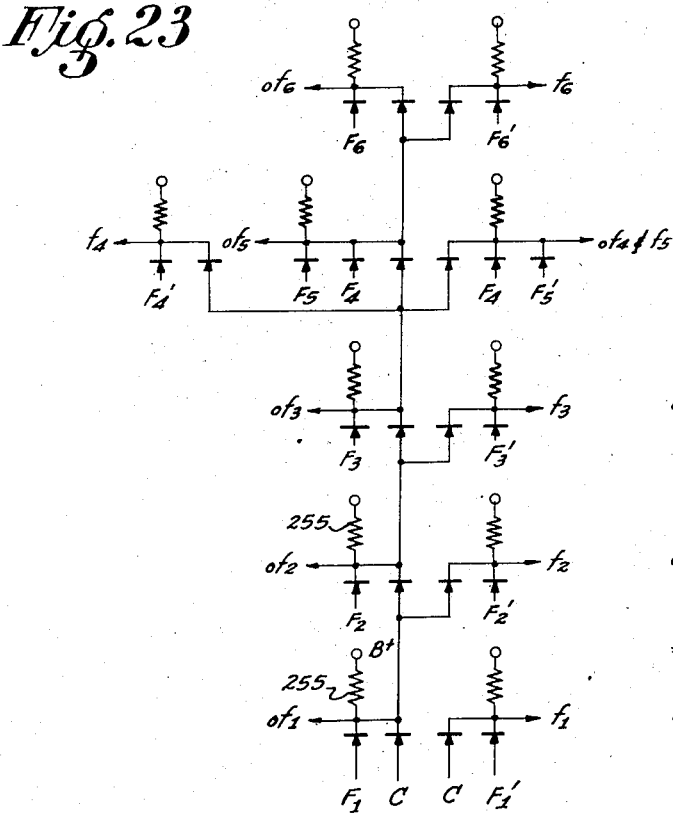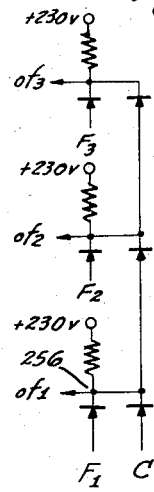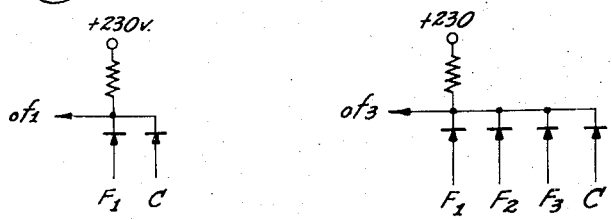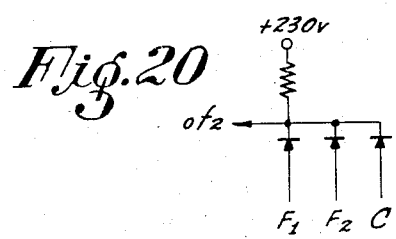

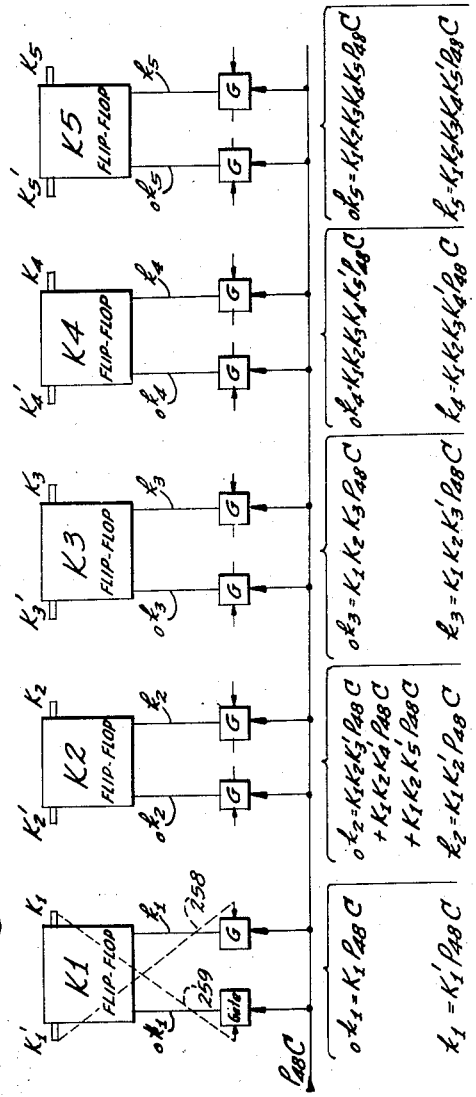

Aug. 18, 1959   F. G. STEELE ET AL   2,900,134
DIGITAL DIFFERENTIAL ANALYZER

INVENTORS:
FLOYD G. STEELE
WILLIAM F. COLLISON

THEIR PATENT ATTORNEY

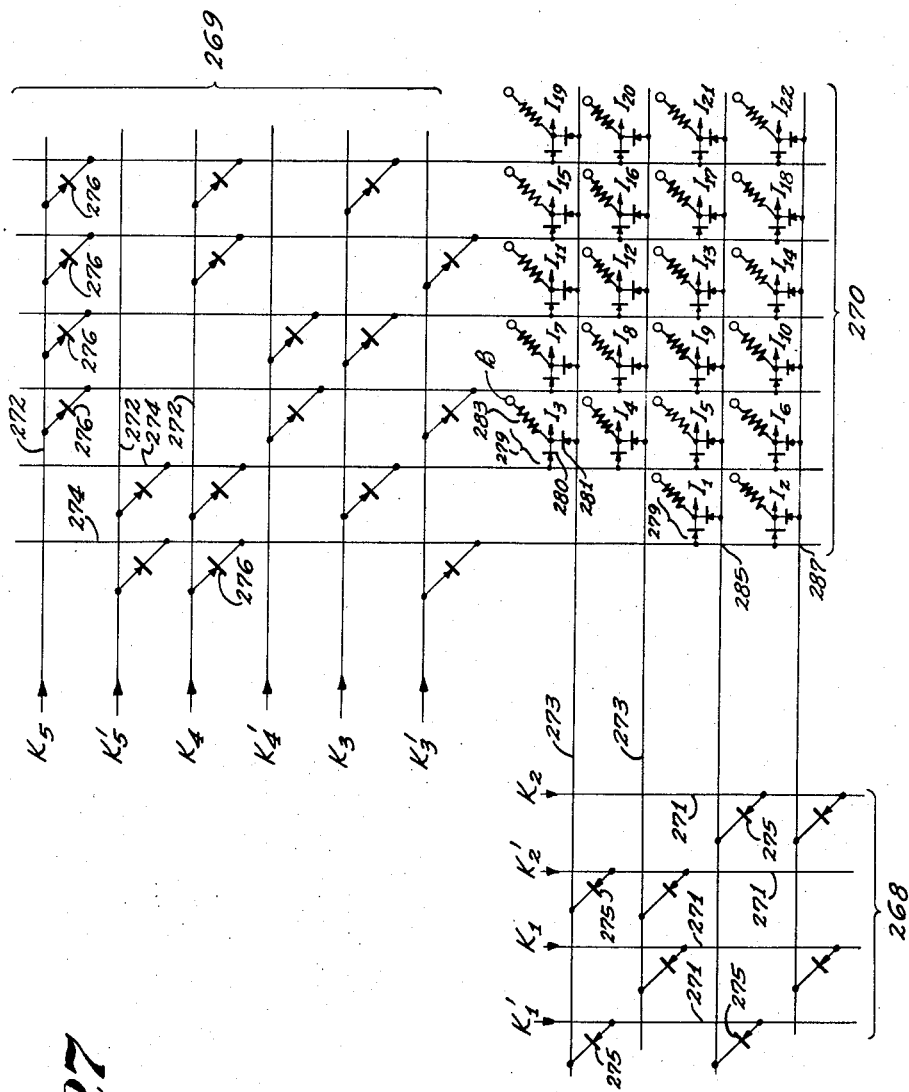

Aug. 18, 1959   F. G. STEELE ET AL   2,900,134
DIGITAL DIFFERENTIAL ANALYZER
Filed March 26, 1951   32 Sheets-Sheet 17
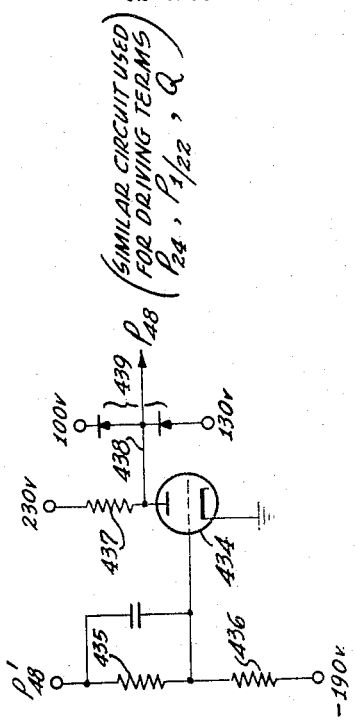
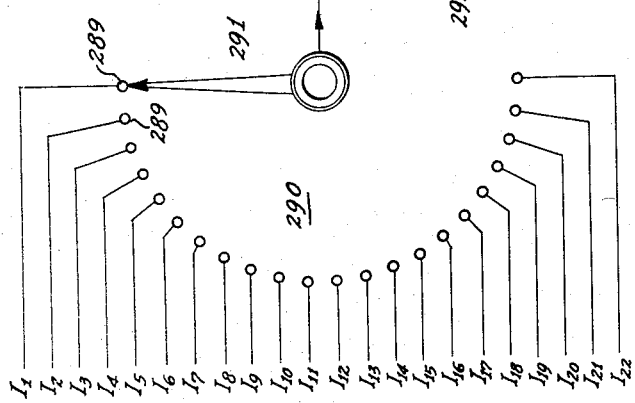
*Fig. 28*
*Fig. 52*
INVENTORS:
FLOYD G. STEELE
WILLIAM F. COLLISON
THEIR PATENT ATTORNEY Aug. 18, 1959   F. G. STEELE ET AL   2,900,134
DIGITAL DIFFERENTIAL ANALYZER Filed March 26, 1951   32 Sheets-Sheet 19

Fig.30

Σdy COUNTER

| DECIMAL EQUIVALENT | A1 | A2 | A3 | SIGN A4 |
|---|---|---|---|---|
| +7 | 1 | 1 | 1 | 0 |
| +6 | 0 | 1 | 1 | 0 |
| +5 | 1 | 0 | 1 | 0 |
| +4 | 0 | 0 | 1 | 0 |
| +3 | 1 | 1 | 0 | 0 |
| +2 | 0 | 1 | 0 | 0 |
| +1 | 1 | 0 | 0 | 0 |
| +0 | 0 | 0 | 0 | 0 |
| -1 | 1 | 1 | 1 | 1 |
| -2 | 0 | 1 | 1 | 1 |
| -3 | 1 | 0 | 1 | 1 |
| -4 | 0 | 0 | 1 | 1 |
| -5 | 1 | 1 | 0 | 1 |
| -6 | 0 | 1 | 0 | 1 |
| -7 | 1 | 0 | 0 | 1 |

Fig.36

| | PULSE POSITION | $P_{25}$ | $P_{26}$ | $P_{27}$ | $P_{28}$ | Y NUMBER | SIGN POSITION $P_{46}$ | $P_{47}$ | $P_{48}$ |
|---|---|---|---|---|---|---|---|---|---|
| | STAGE | $2^0$ | $2^1$ | $2^2$ | $2^3$ | | $2^{21}$ | - | - |
| | n | - | - | - | - | | - | - | - |
| | | - | - | - | - | | - | - | - |
| | | - | - | - | - | | - | - | - |
| | | - | - | - | - | | - | - | - |
| DECIMAL EQUIVALENT | +7 | 1 | 1 | 1 | 0 | | 0 | 1 | |
| | +6 | 0 | 1 | 1 | 0 | | 0 | 1 | |
| | +5 | 1 | 0 | 1 | 0 | | 0 | 1 | |
| | +4 | 0 | 0 | 1 | 0 | | 0 | 1 | |
| | +3 | 1 | 1 | 0 | 0 | | 0 | 1 | |
| | +2 | 0 | 1 | 0 | 0 | | 0 | 1 | K |
| | +1 | 1 | 0 | 0 | 0 | | 0 | 1 | N |
| | +0 | 0 | 0 | 0 | 0 | | 0 | 1 | A |
| | -1 | 1 | 1 | 1 | 1 | | 1 | 0 | L |
| | -2 | 0 | 1 | 1 | 1 | | 1 | 0 | B |
| | -3 | 1 | 0 | 1 | 1 | | 1 | 0 | |
| | -4 | 0 | 0 | 1 | 1 | | 1 | 0 | |
| | -5 | 1 | 1 | 0 | 1 | | 1 | 0 | |
| | -6 | 0 | 1 | 0 | 1 | | 1 | 0 | |
| | -7 | 1 | 0 | 0 | 1 | | 1 | 0 | |
| | n | - | - | - | - | | - | - | - |

Fig.32

Σdy COUNTER

| | A1 | A2 | A3 | A4 |
|---|---|---|---|---|
| | 0 | 1 | 0 | 1 |
| 1ST STEP | 1 | 0 | 1 | 1 |
| 2ND STEP | 0 | 1 | 1 | 1 |
| 3RD STEP | 1 | 1 | 1 | 1 |

DIRECTION OF STEPPING
←

INVENTORS:
FLOYD G. STEELE
WILLIAM F. COLLISON

By Herbert E. Metcalf
THEIR PATENT ATTORNEY

Aug. 18, 1959   F. G. STEELE ET AL   2,900,134
DIGITAL DIFFERENTIAL ANALYZER
Filed March 26, 1951   32 Sheets-Sheet 20

Fig. 38

Y & Σdy ADDER
FLIP-FLOP INPUTS   328  329  330  331

| $Y_1$ | $A_1$ | $D_1$ | sum | carry | $\Delta_{0 \to 1}$ | $\Delta_{1 \to 0}$ |
|---|---|---|---|---|---|---|
| 0 | 0 | 0 | 0 | 0 | 0 | 0 |
| 0 | 0 | 1 | 1 | 0 | 0 | 1 |
| 0 | 1 | 0 | 1 | 0 | 0 | 0 |
| 0 | 1 | 1 | 0 | 1 | 0 | 0 |
| 1 | 0 | 0 | 1 | 0 | 0 | 0 |
| 1 | 0 | 1 | 0 | 1 | 0 | 0 |
| 1 | 1 | 0 | 0 | 1 | 1 | 0 |
| 1 | 1 | 1 | 1 | 1 | 0 | 0 |

$$\begin{cases} \Delta_{0 \to 1} = Y_1 A_1 D_1' \\ \Delta_{1 \to 0} = Y_1' A_1' D_1 \\ sum = Y_1' A_1' D_1 + Y_1' A_1 D_1' + Y_1 A_1' D_1' + Y_1 A_1 D_1 \end{cases}$$

Fig. 39

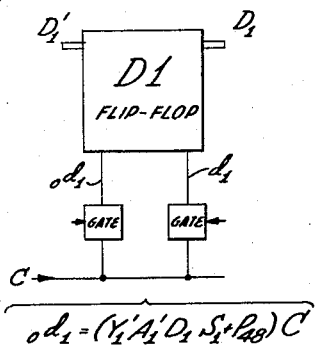

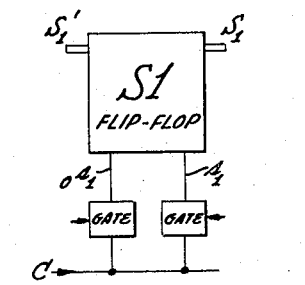

$_0A_1 = F_1' F_2 F_3 F_4 F_5 F_6 C$
$= P_{47} C$
$A_1 = Y_1 S_1' (F_6 + F_1 F_2 F_3 F_4 F_5) P_{48}' C$
$Y_1 S_1' P_{24/48} P_{48}' C$
$Y_1 S_1' P_{24/47} C$

INVENTORS:
FLOYD G. STEELE
WILLIAM F. COLLISON
By Hubert E. Metcalf
THEIR PATENT ATTORNEY Aug. 18, 1959    F. G. STEELE ET AL    2,900,134
DIGITAL DIFFERENTIAL ANALYZER
Filed March 26, 1951    32 Sheets—Sheet 22

INVENTORS:
FLOYD G. STEELE
WILLIAM F. COLLISON
BY Herbert E. Metcalf
THEIR PATENT ATTORNEY Aug. 18, 1959     F. G. STEELE ET AL     2,900,134
DIGITAL DIFFERENTIAL ANALYZER

*Fig. 45*   (Y+R) ADDER INPUTS

| $Y_a$ | $R_1$ | $D_2$ | $Q$ (SUM) 341 | Carry 342 | $Q'$ 343 | $\Delta_{0\to 1}$ 344 | $\Delta_{1\to 0}$ 345 |
|---|---|---|---|---|---|---|---|
| 0 | 0 | 0 | 0 | 0 | 1 | 0 | 0 |
| 1 | 0 | 0 | 1 | 0 | 0 | 0 | 0 |
| 0 | 1 | 0 | 1 | 0 | 0 | 0 | 0 |
| 1 | 1 | 0 | 0 | 1 | 1 | 1 | 0 |
| 0 | 0 | 1 | 1 | 0 | 0 | 0 | 1 |
| 1 | 0 | 1 | 0 | 1 | 1 | 0 | 0 |
| 0 | 1 | 1 | 0 | 1 | 1 | 0 | 0 |
| 1 | 1 | 1 | 1 | 1 | 0 | 0 | 0 |

$$\begin{cases} \Delta_{0\to 1} = Y_a R D_2' \\ \Delta_{1\to 0} = Y_a' R' D_2 \\ Q' = Y_a' R' D_2' + Y_a R D_2' + Y_a R' D_2 + Y_a' R D_2 \end{cases}$$

*Fig. 46*

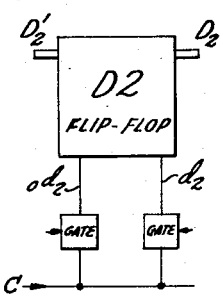

$\overline{od_2} = (Y_a' R_1' D_2 S + P_{24} B_1)C$
$= [(Y_1' B_1 + Y_1 B_1') R_1' D_2 S_1 + P_{24} B_1]C$
$d_2 = (Y_a R_1 D_2' S + P_{24} B_1')C$
$[(Y_1 B_1 + Y_1' B_1') R_1 D_2' S_1 + P_{24} B_1']C$

*Fig. 40*

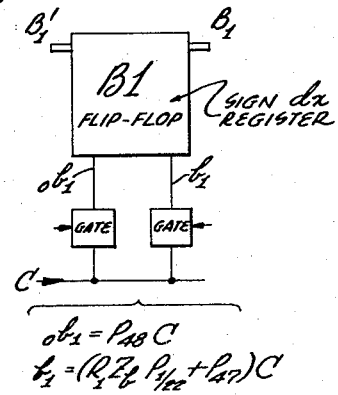

SIGN $dx$ REGISTER $\overline{ob_1} = P_{48} C$
$b_1 = (R_1 Z_1 P_{1/22} + P_{47})C$

INVENTORS:
FLOYD G. STEELE
WILLIAM F. COLLISON

By Herbert E. Metcalf
THEIR PATENT ATTORNEY

Aug. 18, 1959  F. G. STEELE ET AL  2,900,134
DIGITAL DIFFERENTIAL ANALYZER
Filed March 26, 1951  32 Sheets-Sheet 24

INVENTORS:
FLOYD G. STEELE
WILLIAM F. COLLISON
By Hubert E. Metcalf
THEIR PATENT ATTORNEY

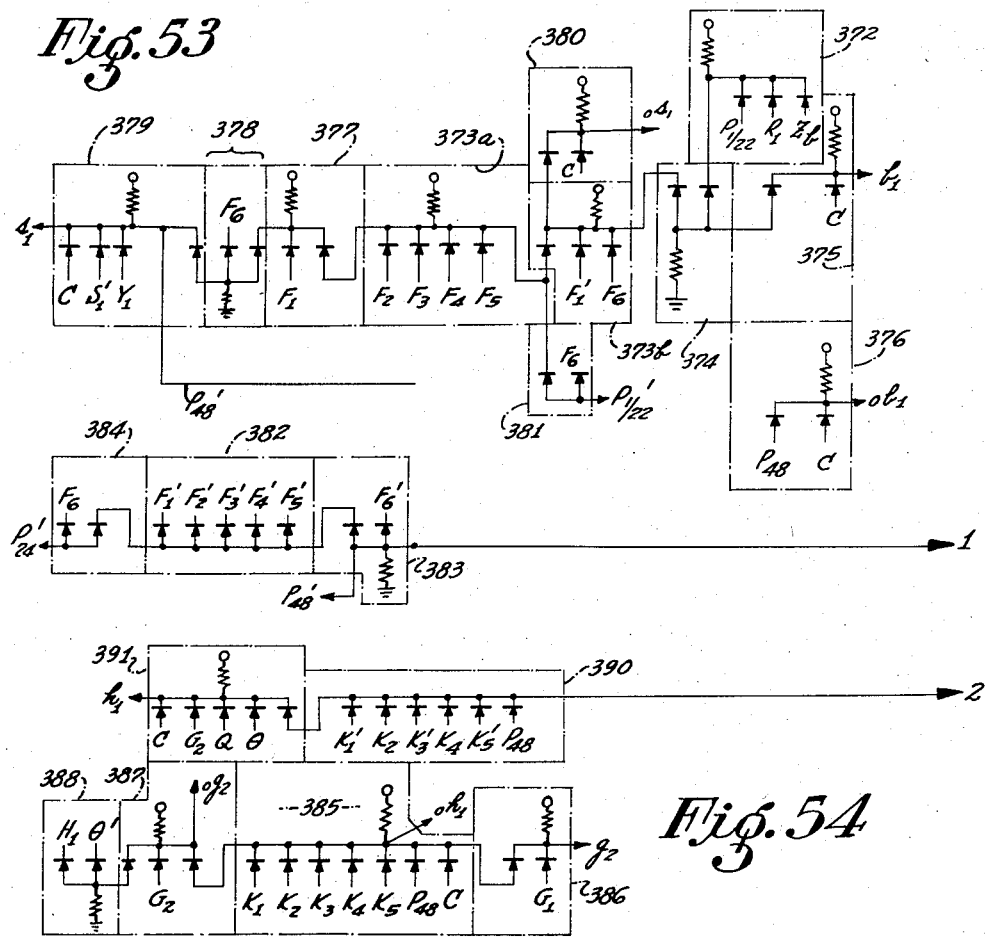
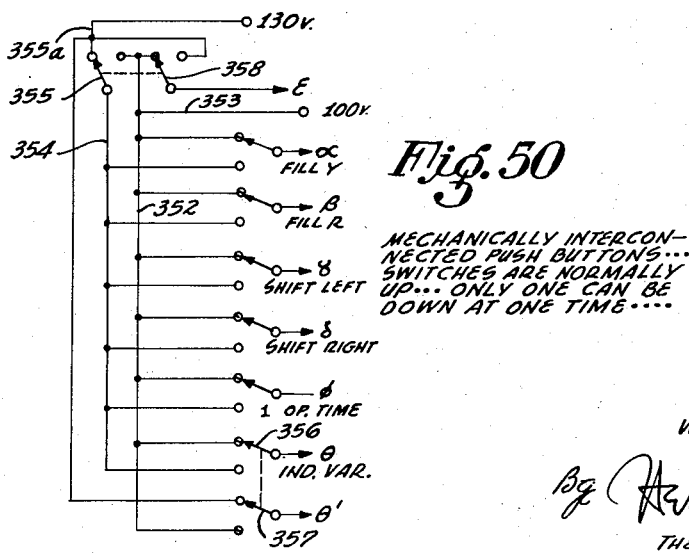

INVENTORS:
FLOYD G. STEELE
WILLIAM F. COLLISON
THEIR PATENT ATTORNEY

Aug. 18, 1959        F. G. STEELE ET AL        2,900,134
                DIGITAL DIFFERENTIAL ANALYZER
Filed March 26, 1951                    32 Sheets—Sheet 30

INVENTORS:
FLOYD G. STEELE
WILLIAM F. COLLISON
By Herbert E. Metcalf
THEIR PATENT ATTORNEY

INVENTORS:
FLOYD G. STEELE
WILLIAM F. COLLISON
THEIR PATENT ATTORNEY

United States Patent Office 2,900,134
Patented Aug. 18, 1959

2,900,134

DIGITAL DIFFERENTIAL ANALYZER

Floyd G. Steele, Manhattan Beach, and William F. Collison, Walteria, Calif., assignors to Northrop Corporation, a corporation of California Application March 26, 1951, Serial No. 217,478

32 Claims. (Cl. 235—152)

This invention relates to computers, and, more particularly to a novel means and method of performing the process of differential analysis.

A differential analyzer may be defined as a device which may be used for the solution of differential equations. Two types of differential analyzers have been in use up to the present time; the mechanical analogue differential analyzer and the electronic analogue differential analyzer. The present invention is a new generic type of differential analyzer, namely, the digital differential analyzer. The particular embodiment to be disclosed herein is more specifically an electronic digital differential analyzer; and still more specifically a magnetic drum digital differential analyzer. The specific embodiments, however, are illustrative only and do not in any way limit the broad invention therein disclosed of a new generic type of differential analyzer, namely the digital differential analyzer.

The embodiment disclosed herein operates in the binary (or base "two") number system. However, the invention can equally well be incorporated in the design of digital differential analyzers to operate in any desired number system.

The fundamental unit of any differential analyzer is the integrator. The mechanical analogue differential analyzer employs the well known "wheel and disc" integrator. The electronic analogue differential analyzer employs the well known "RC" (resistor-condenser) integrator made more satisfactory by the use of an operational amplifier. A watt meter and a feed-back servomechanism have both been satisfactorily used as analogue integrating devices, as well as other mechanisms. The digital differential analyzer employs the digital integrator which is included in the invention given in this disclosure. It should be noted that in the computer field the word "analogue" or "analog" can sometimes be ambiguous.

In certain branches of the computer field the word has approximately the same meaning that it does outside the computer field. In this sense an "analogue computer" or "analog computer" would be defined as a computer that may be set up to represent an electronic, mechanical, or even a computational analogy to the physical system being studied. In some instances such computers are called "simulators." In this usage the words "analogue" and "digital" are not mutually exclusive. In this usage "digital analogue computer" would mean a digital computer capable of being used as a computational analogy of a physical system being studied. In its other usage the word "analogue" refers to the method of representing information as physical magnitudes (e.g., voltage, shaft position, etc.) as contrasted to the word "digital" which refers to the method of representing information as numbers.

In the present disclosure, the word "analogue" is used in the second sense (i.e., as contrasted to the word "digital").

The digital computers have many advantageous features. They are inherently more accurate than the analogue computers. By representing magnitudes of variables by numbers coded by presence or absence of pulses, rather than by proportional voltages, rotations of shafts, etc., the digital computers have the property of working with numbers instead of magnitudes and the computations on them can proceed with all the rigorous accuracy associated with numbers.

Thus, it is an object of this invention to provide an integrating device which embodies the simplified, direct, logical approach to a differential equation employed in the analogue differential analyzer while also gaining the advantage of economy and accuracy associated with the digital computers.

In order for a differential analyzer to have these desirable features, it is advantageous that a single fundamental integrating unit satisfy certain specifications, although they are all inherent in a mechanical manner in the wheel and disc type; can be usefully incorporated in an electronic digital manner in the proposed device. These specifications for an integrating device are as follows:

(a) It is advantageous for it to receive two independent inputs of varying value and produce from them one output of varying value.

(b) If the time rates of change of the input magnitudes are called $$\frac{dx}{dt} \text{ and } \frac{dy}{dt}$$

the time rate of change of the output magnitude must be $$\frac{dz}{dt}$$

where the relation of the variables is such that $$\frac{dz}{dt} = Ky\frac{dx}{dt}$$

K being a constant which may be associated with the integrator.

(c) Both of the inputs, and the single output may to advantage be of like nature, just as the wheel-and-disc type represents magnitudes by shaft rotation, the present integrator may advantageously represent magnitudes by sums of eletcronic pulses.

(d) To simulate mathematical processes, it is advantageous if the magnitudes involved be capable of assuming values defined as positive or negative in sign (or the equivalent).

It is, therefore, another object of this invention to provide an electronic digital integrating device having the above specifications set forth as desirable.

It is well known that complex differential equations can be solved with the use of a plurality of mechanical integrators, by properly interconnecting the outputs of the integrators into the inputs of others or their own so as to form either an open or a closed loop system. In the mechanical analogue means for solving such complex problems, the integrating devices, composed of discs and wheels, are comparatively bulky. Likewise, the interconnections are composed of shafts, gears, differentials, etc., which are cumbersome and take time to change from one setting to another.

In operating this plurality of mechanical integrators to solve a problem, one of the shafts is usually designated as the independent variable "time." This time shaft is generally driven by a motor. Thus, the entire system, i.e., all the integrator devices, are simultaneously advanced in time in accordance with their shaft interconnections. In order to understand the analogy of the digital integration method of the present invention, the following concept is helpful. Assume that the independent variable "time" shaft of the mechanical integrator system, above described, is rotated intermittently such that each operation time or step is defined by a fixed incremental rotation of this shaft. As a result of each one of these steps all of the individual integrator devices are re-adjusted, i.e., their input and output shafts are rotated various discrete amounts in accordance with their interconnection. It is further helpful to note that every time the independent variable shaft is stopped, after an incremental rotational step, the integrator shafts can be thought of as storing information, in the form of angular shaft positions, which is pertinent to the instantaneous "operation time" of the independent variable shaft. The shafts can thus be considered to be memory elements storing numbers which represent the integrator characteristic of each operation time.

Thus it is seen that, fundamentally, a useful differential analyzer consists of a number of interconnected integrating mechanisms, arranged normally in a closed loop system, which are driven by a single independent variable shaft. In other words, a mechanical differential analyzer consists generally, of a device which carries on several simultaneous integration processes.

The present invention is highly advantageous in that it overcomes this need for a plurality of integrating mechanisms. What is provided, instead, is a single highly flexible computer unit which is approximately a digital counterpart of one mechanical integrator. This single computer unit is used, successively, to advance by one step each of the individual integration processes, normally carried out simultaneously by many integrators in a mechanical differential analyzer in one step or operation time. To accomplish this, in accordance with the present invention, a memory is provided in place of each of the mechanical integrators of the above described system. Information, pertinent to a digital counterpart of a mechanical integrator condition or set-up, is then placed in each of these memories. To perform differential analysis, the information in each of these memories is serially fed into the single integrating computer unit which operates on this information to establish the proper new relationship of the variables normally assumed by a digital type integrator at any given operation time. This new information is then recorded back onto the memory, thus freeing the computer unit to operate on the successive memory information. By this serial use of a single integrating computer unit over and over again, the same results are ultimately achieved as would be obtained by simultaneously carrying on a plurality of integration processes; without, however, the need for a large number of integrating computing units.

It is, therefore, another object of this invention to provide a single, versatile, digital integrator computer unit which can be used in a serial manner to advance a plurality of digital integration set-ups one step at a time so as to perform differential analysis.

It is still another object of this invention to provide a novel memory arrangement for the information required to perform serial digital integration.

It is still another object of this invention to provide a novel, simple, compact electronic means and method for performing digital integration whose size contrasts sharply with that of an analogue machine of similar capacity.

In addition to the new method of performing digital integration employed in the present invention, a novel method of designing digital computers is presented. This method involves a unique use of symbolic logic and logical algebra as applied to electronic digital computer circuit design. Symbolic logic is defined as the science concerned with the validity of systems of thought. A "system of thought" is defined as a set of rules, instructions, or limitations of a procedure, for manipulating a given set of logical information. By expressing these rules, instructions, etc., in logical algebra, a new and useful manner of presenting the "system of thought" is provided.

Since a given computer has a defined system of thought, a novel application of symbolic logic is employed in the design of the present invention.

Another object of this invention is thus to eliminate the trial and error methods of design generally associated with digital computers and replace them by more simple, direct and logical methods.

Briefly, one particular apparatus embodiment of the present invention comprises a magnetic wheel functioning as a dynamic storage. The numerical and instructional data required for each digital integrator set-up is initially stored on this wheel. A single integrating computer circuit is provided for cooperating with this dynamic storage. This computer circuit provides means for performing integration by a digital process which may be called the serial additive transfer method. In general, the computer circuit is composed of a plurality of flip-flops representing logical propositions needed to accomplish counting, simple arithmetical operations, and commands. These flip-flops have their inputs and outputs interconnected by diode nets which represent means for physically obtaining logical "and" and "inclusive or" connections or combinations of these. Since several actions can occur simultaneously while others only for certain intervals of time, a clock pulse is continuously generated by a recording placed on the magnetic wheel. A change of clock state from high to low is needed at the input of the computer proposition flip-flops to enable them to change their state. Furthermore, counting circuits are provided to enable indexing of the intervals of time to be supplied, as will be more fully described later.

More specifically, the data on each arc of the dynamic storage is fed out at the proper time to the integrating computer circuit which operates on this data to advance the particular integrator set-up a given step. The resulting altered integrator set-up is then re-recorded in the memory, and data from the next integrator set-up is picked up and fed through the computer unit. By this means several integrator set-ups can be processed in a serial fashion through the computer unit. Each of the integrator outputs resulting from a particular integrator computation is fed into an auxiliary memory loop which acts as a precessing line serving as a central file. These integrator outputs can be extracted into either of the inputs of any integrator or integrators (up to 7) in a prearranged manner in accordance with instructions initially set-up and associated with each of the integrator memories.

In order to introduce the instructions and initial numerical conditions into each integrator set-up, a read-in circuit is provided comprised primarily of a control board which enables information to be placed into predetermined positions of the memory provided for each of the integrator set-ups. A read-out device is also provided. This read-out device can take the form of a counter or an oscilloscope, fr example, for visually reading a $y$ number appearing in one of the integrator set-ups, this $y$ number representing some value of the desired solution. However, the output can also be provided in the form of a series of pulses or indications which can be used to actuate and control a mechanism in accordance with the solution of the differential equation being solved.

The present invention is a basically new type of the mathematical machines that are widely used because they can perform certain calculations more swiftly than any human calculator could by use of brain and hand. Mathematical machines can be defined as mechanisms which provide information concerning the relationships which exist between a specific set of mathematical or logical equations. It is to be kept in mind that mathematical machines, such as described herein, can only practice methods which are capable of being performed by hand, given sufficient time and man-power. It is mainly for conservation of time and man-power that the methods involved are incorporated in specific apparatus that produces results equivalent to those which might be produced by a laborious and time consuming hand system.

The present invention will be made more fully apparent by reference to the ensuing description of one illustrative manner by which the present invention may be practiced, as shown in the appended drawings, in which:

Figure 4 is a perspective drawing showing, in particular, a magnetic wheel memory suitable for use in practicing the present invention.

Figuer 9 shows the electrical circuits provided in the Y, R and Z channels for transferring the information from the magnetic wheel to their respective memory flip-flops.

Figure 10 shows the basic circuit provided for accomplishing the "inclusive or" logical algebra operation, i.e., logical summation.

Figure 11 shows the basic circuit provided for accomplishing the "and" logical algebra operation, i.e., logical multiplication.

Figure 12 shows a schematic diagram of the Y channel flip-flops together with the logical algebra equations of their inputs.

Figure 13:
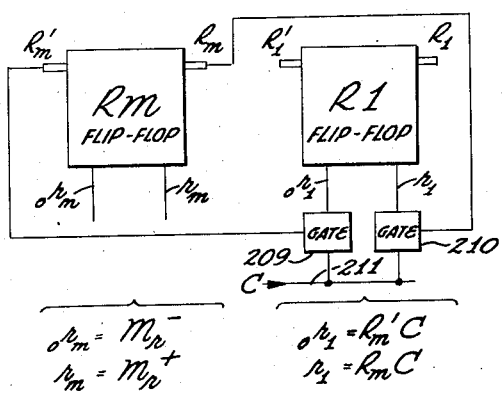

Figure 13 shows a schematic diagram of the R channel flip-flops and the logical algebra equations of their inputs.

Figure 14:
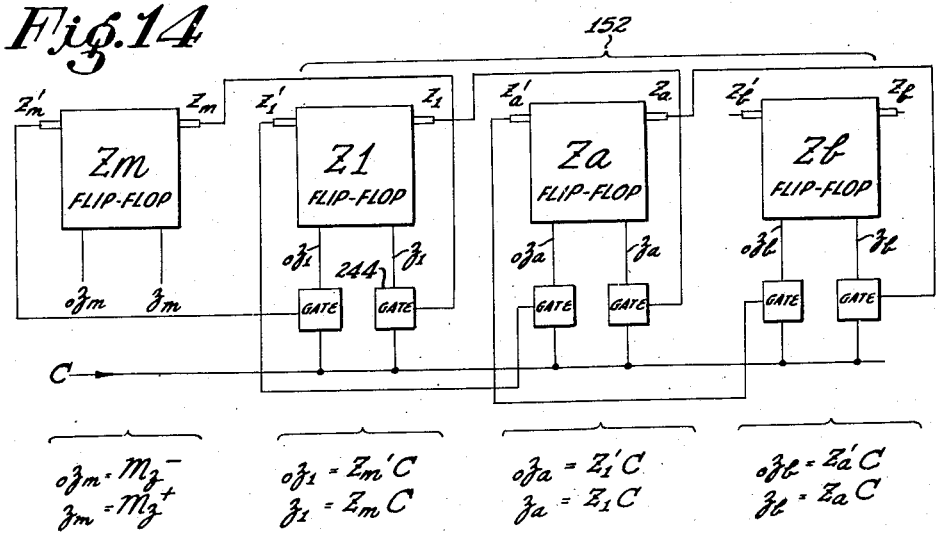

Figure 14 shows a schematic diagram of the Z channel flip-flops and the logical algebra equations of their inputs.

Figure 15 shows the time-wise relationships of the waveforms at various points in the Z channel.

Figure 16 is a simplified general functional diagram of the present computer.

Figures 8, 17:
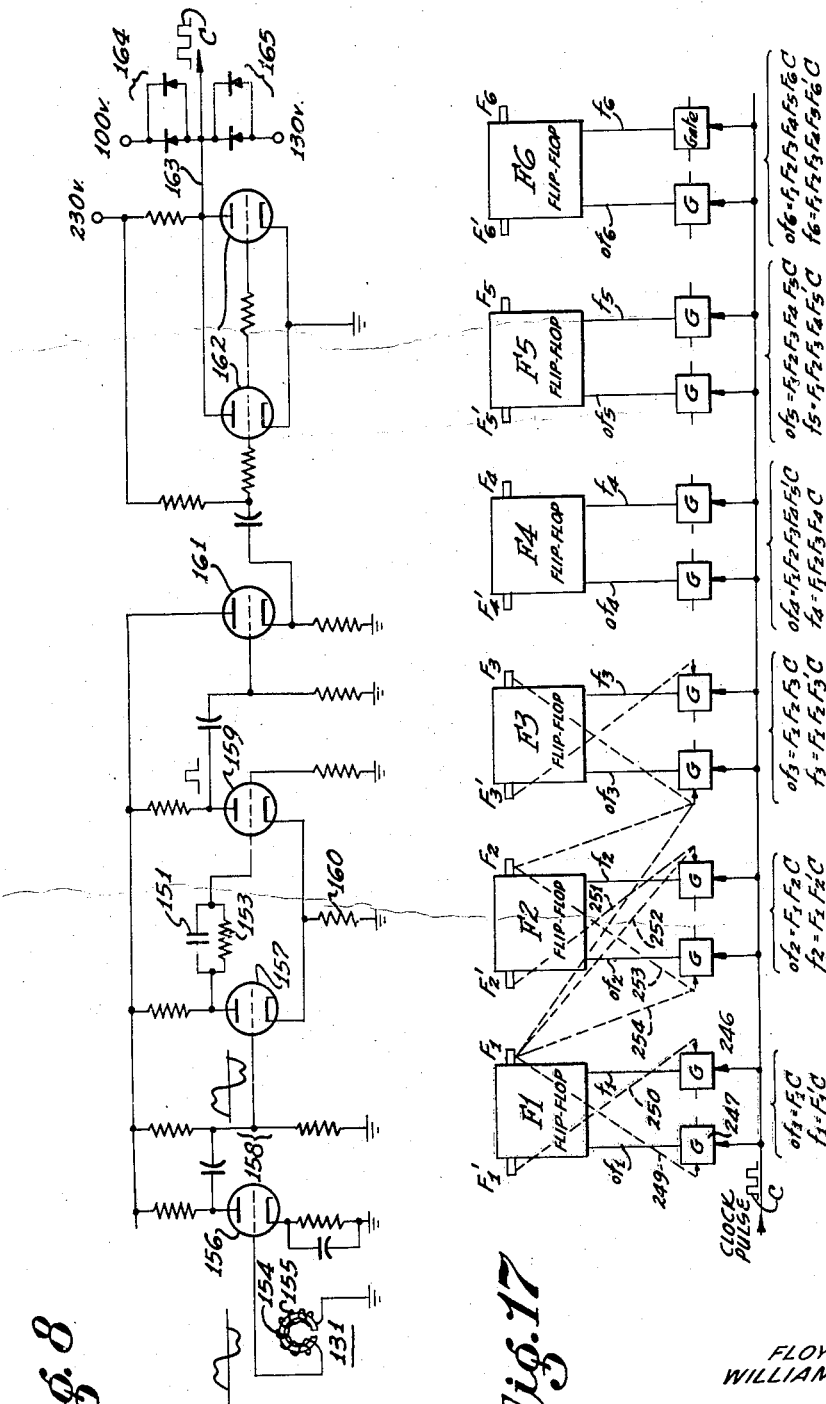
Figure 8 shows the electrical circuit provided in the clock channel for transferring and generating the clock pulses.

Figure 17 is a diagram of the P counter flip-flops together with the input equations for each of the stages.

Figure 18 is a table showing the states of the flip-flop stages for counting in the P counter, together with logical algebra equations defining the required time propositions.

Figure 19 is an electrical diagram of the circuit used in the P counter for generating the logical product representing the false input to the first flip-flop stage.

Figure 20 is an electrical diagram of the circuit used in the P counter for generating the logical product representing the false input to the second flip-flop stage.

Figure 21 is an electrical diagram of the circuit which can be employed in the P counter for generating the logical product representing the false input to the third flip-flop stage.

Figure 22 is a simplified tree circuit diagram for obtaining the products shown in Figures 19, 20 and 21.

Figure 23 is a circuit diagram of the entire counting diode net used for interconnecting the flip-flop stages of the P counter.

Figure 24 is a diagram of the I counter flip-flops together with the input equations for each of the stages.

Figure 25 is a table showing the states of the flip-flop stages for counting in the I counter.

Figures 26, 37:
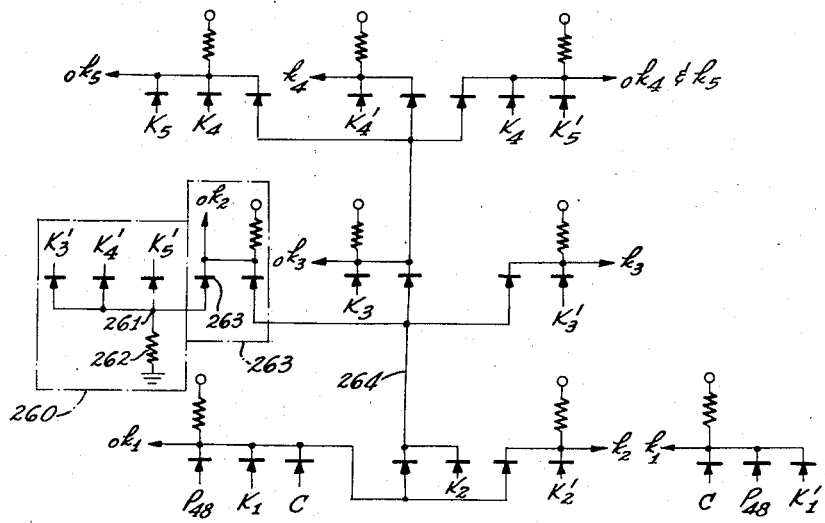

Figure 26 is a circuit diagram of the counting diode net used for interconnecting the flip-flops of the I counter.

Figure 27 is a matrix showing how the flip-flop outputs of the I counter are interconnected to enable each integrator interval to be sensed on a separate line.

Figure 28 is a diagram of the selector switch and output circuits for the I counter matrix shown in Figure 27.

Figure 29:
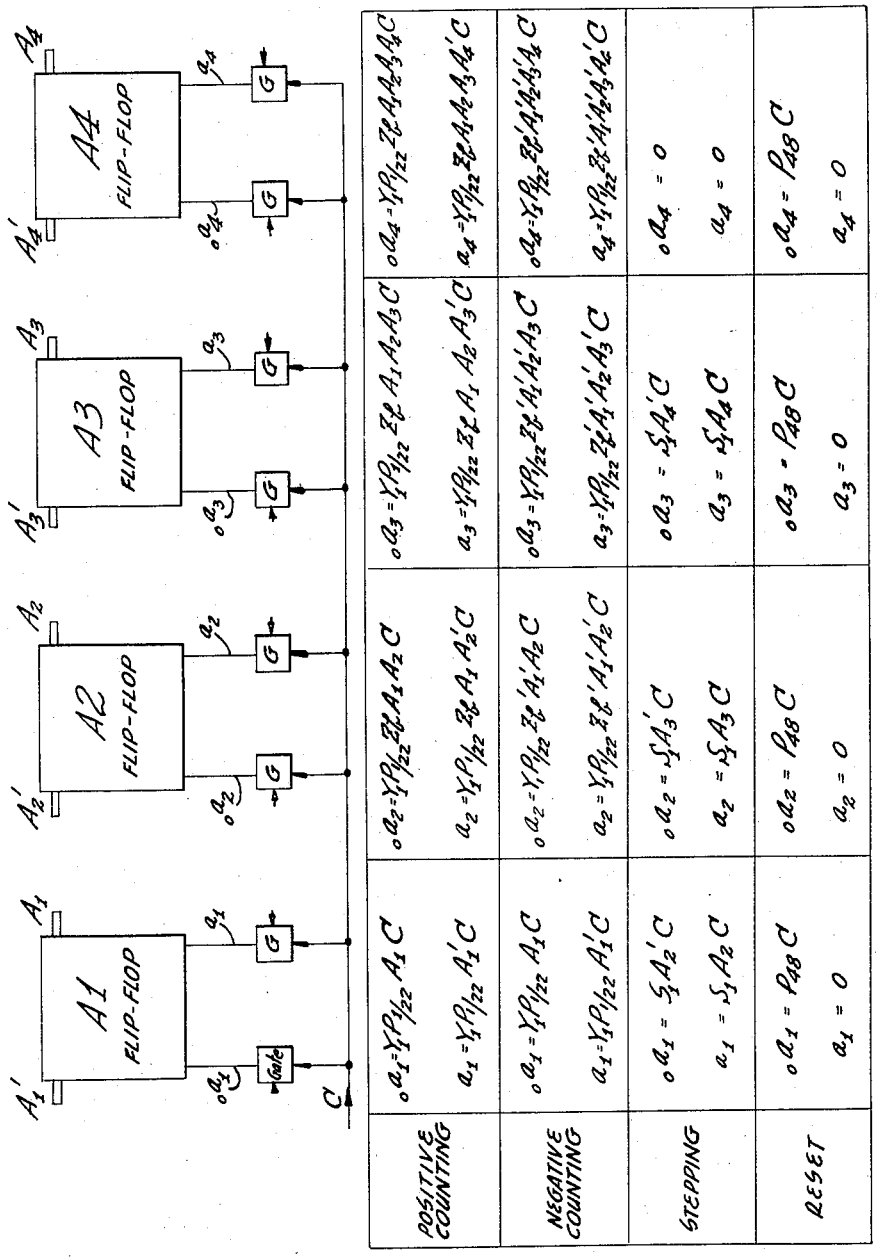

Figure 29 is a diagram of the $\Sigma dy$ counter flip-flops together with the input equations for each of its stages.

Figure 30 is a table showing the state of the flip-flop stages for counting in the $\Sigma dy$ counter.

Figure 31 is a diagram of the start flip-flop together with the logical algebra equations of its inputs.

Figure 32 is a table showing how the $\Sigma dy$ counter performs the stepping out operation.

Figure 33:
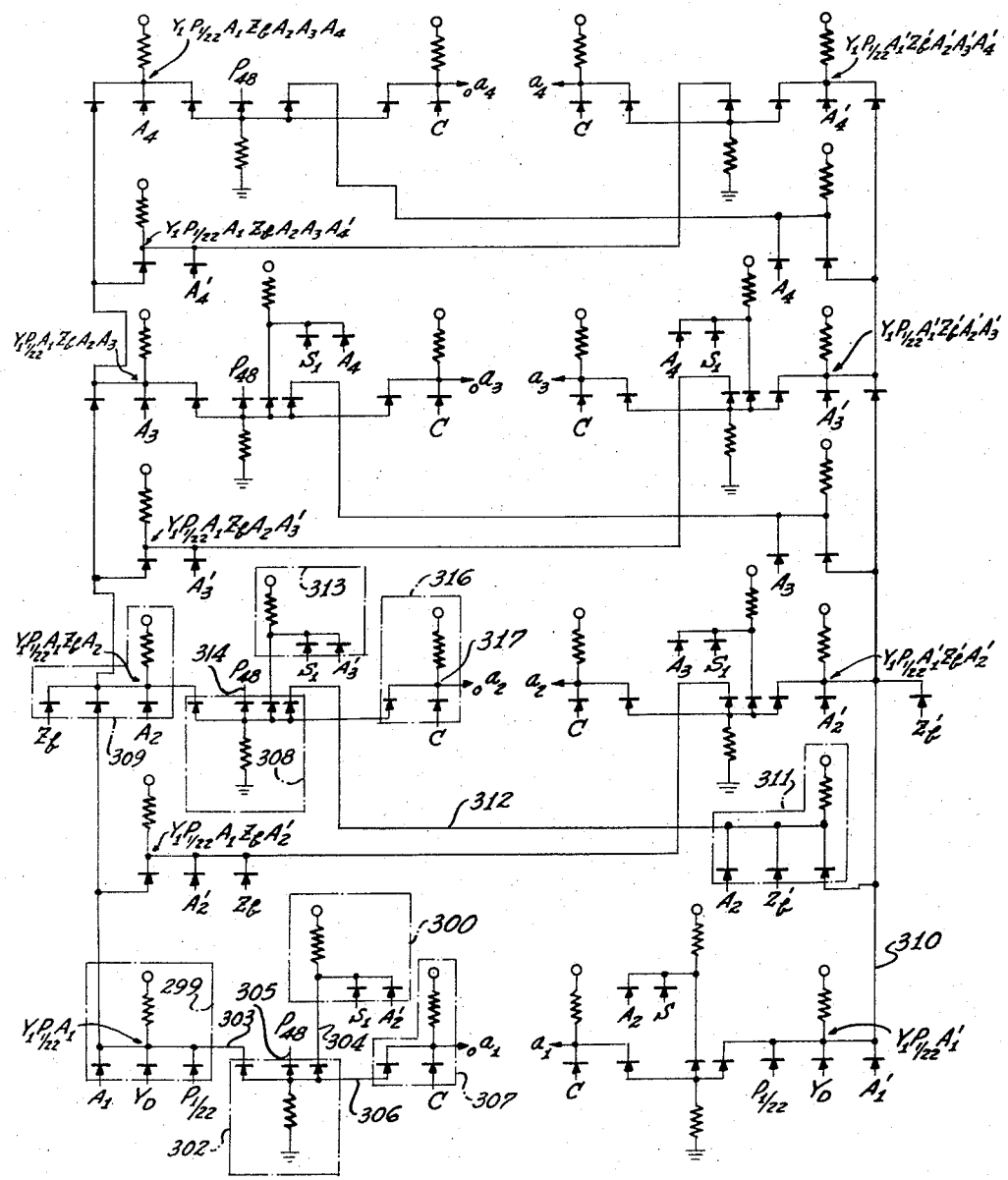

Figure 33 is a circuit diagram of the counting and stepping diode nets used for interconnecting the flip-flops of the $\Sigma dy$ counter.

Figure 34:
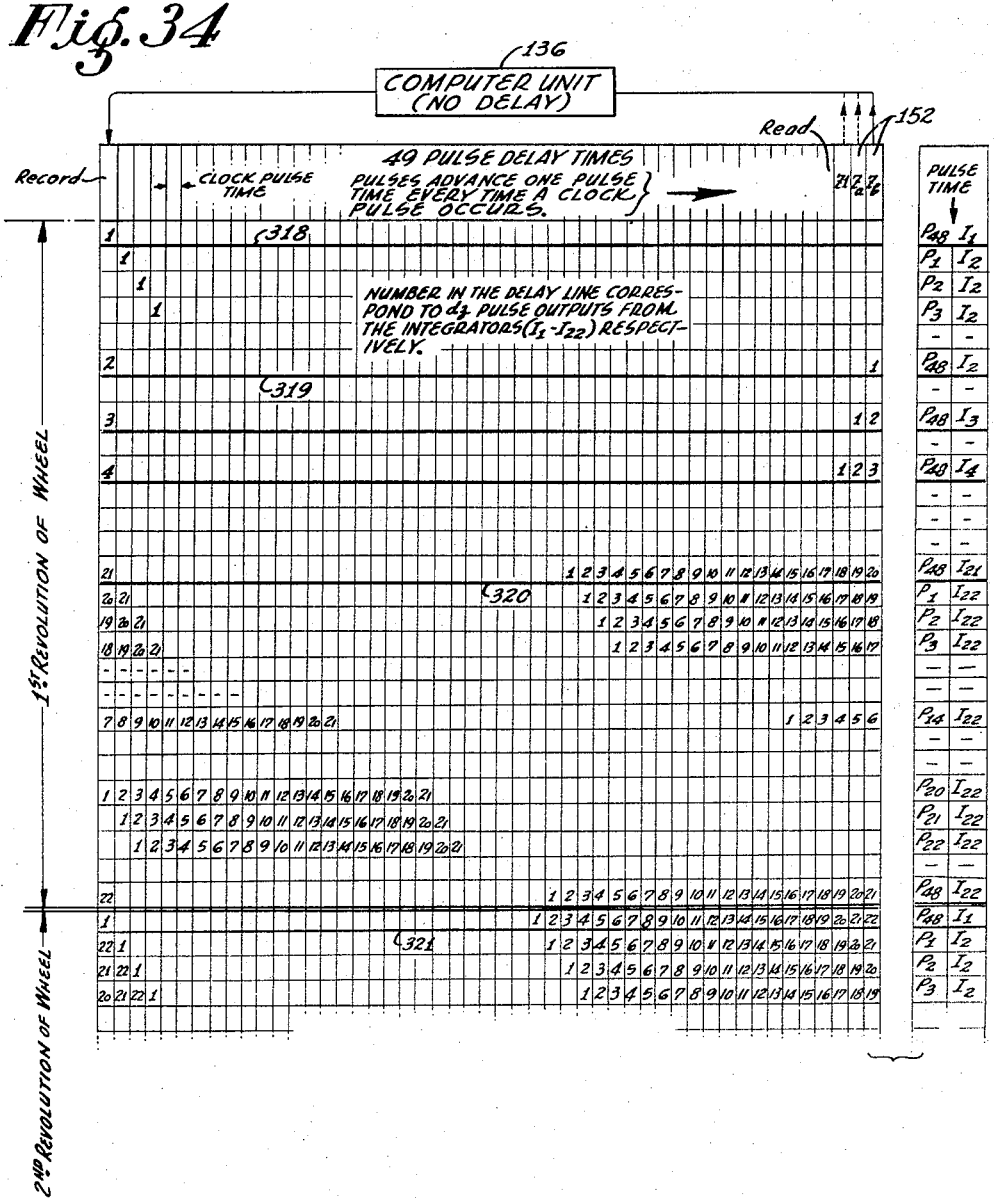

Figure 34 is chart explaining the operation of the $dz$ precession line.

Figure 35:
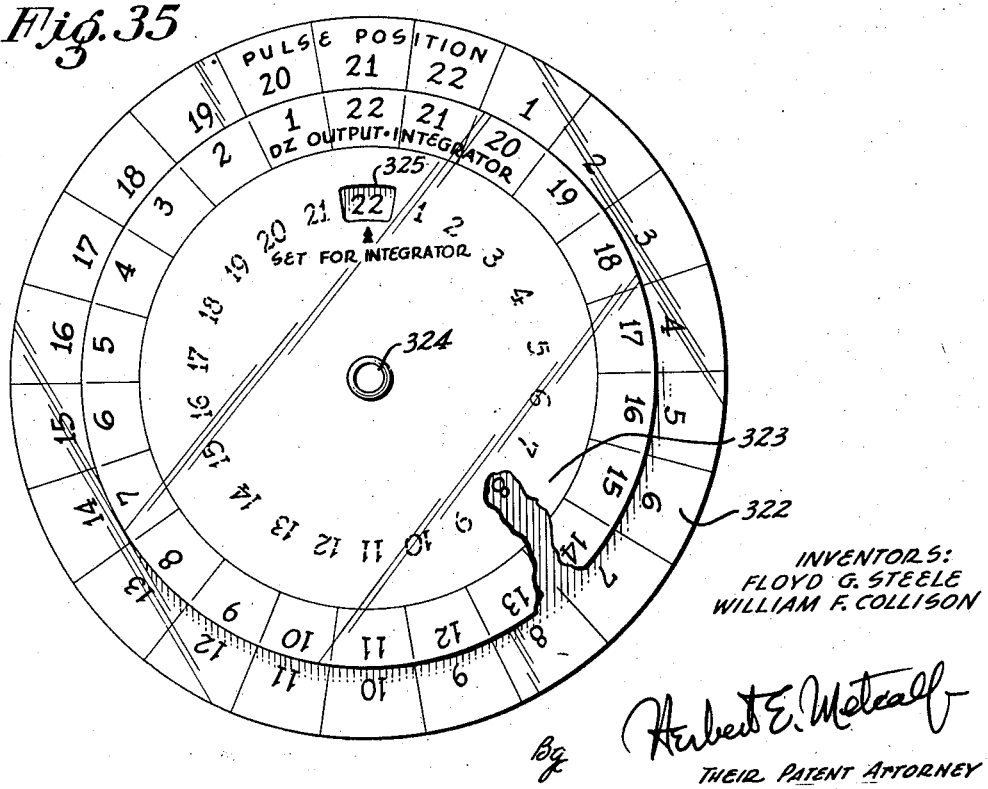

Figure 35 is a diagram of the circular slide rule that can be used for coding the computer.

Figure 36 is a table showing the binary numbering system used for denoting the $y$ number.

Figure 37 shows examples of how addition is performed in the $Y+\Sigma dy$ adder.

Figure 38 is a truth table of the $Y+\Sigma dy$ adder together with logical algebra equations derived therefrom.

Figure 39 is a schematic diagram of the carry delay flip-flop in the $Y+\Sigma dy$ adder together with the logical algebra equations of its input.

Figure 40 is a schematic diagram of the sign $dx$ register flip-flop.

Figure 41:
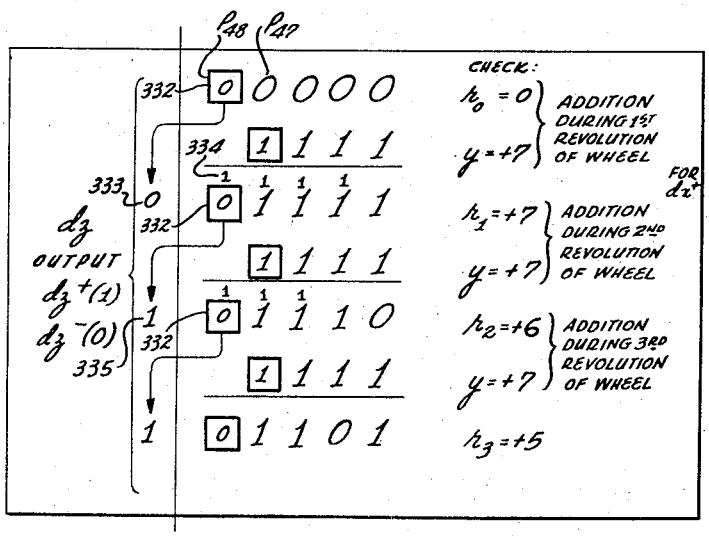

Figure 41 is an example of the operation of the $Y+R$ adder when the $dx$ unit is positive.

Figure 42:
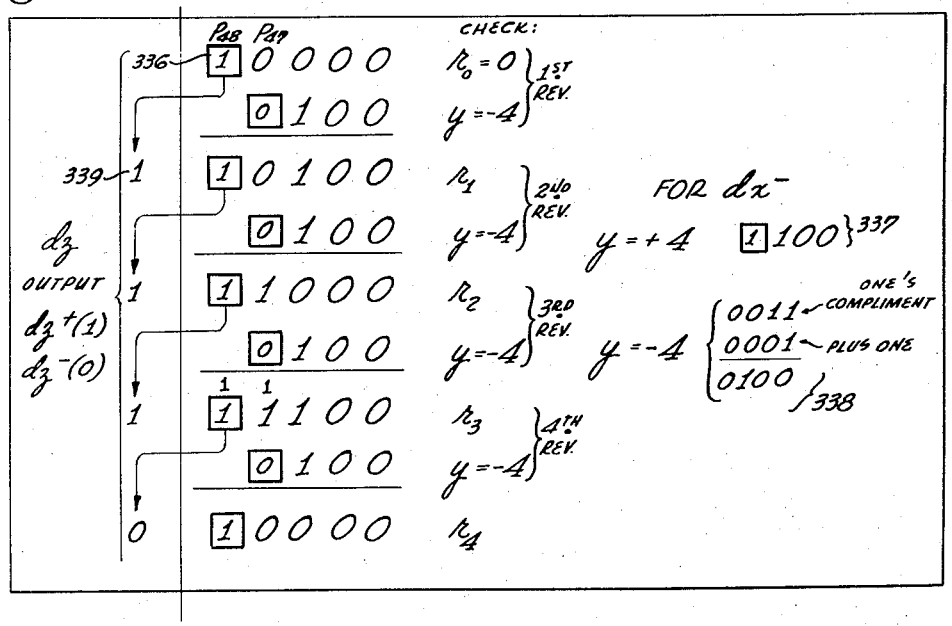

Figure 42 is an example of the operation of the $Y+R$ adder when the $dx$ unit is negative.

Figure 43:
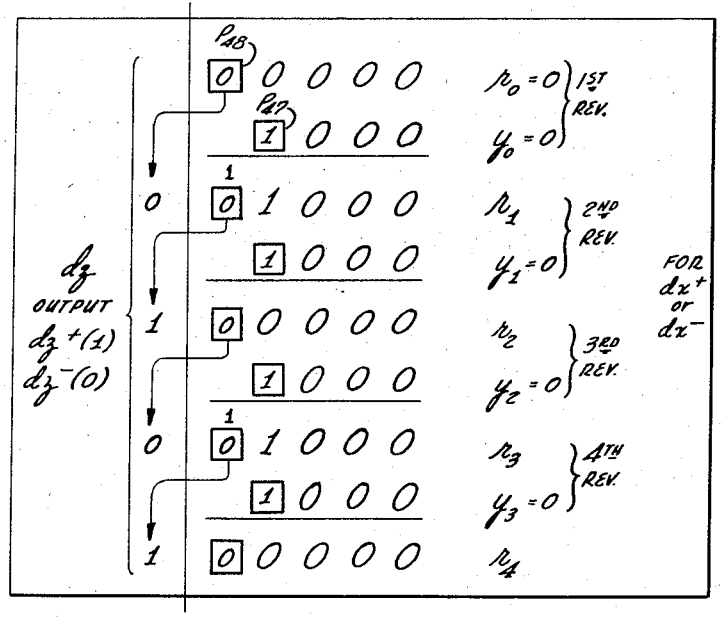

Figure 43 is an example of the operation of the $Y+R$ adder which explains the 1–0 system.

Figure 44:
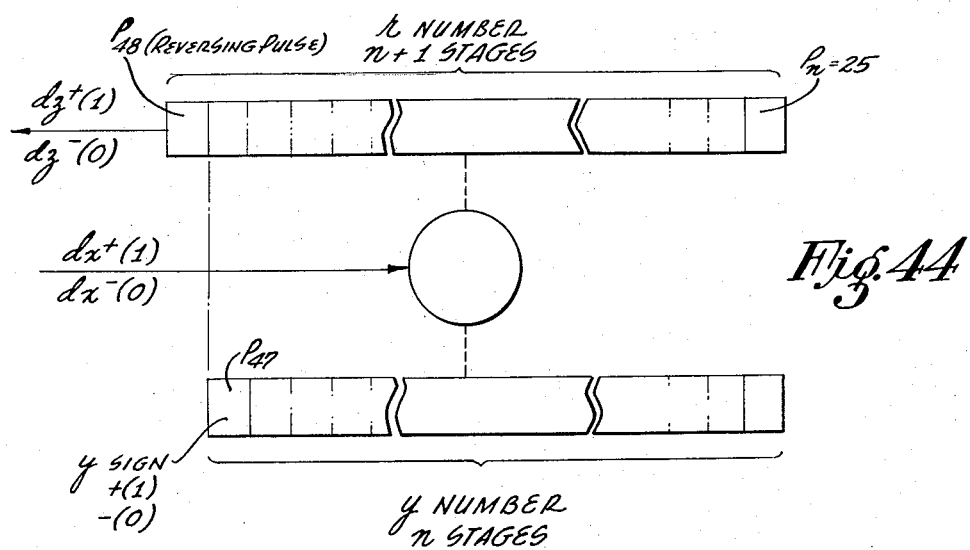

Figure 44 is a diagram depicting the general operation of the $(Y+R)$ adder.

Figure 45 is a truth table of the $(Y+R)$ adder together with logical algebra equations derived therefrom.

Figure 46 is a schematic diagram of the delay flip-flop in the $(Y+R)$ adder.

Figure 47:
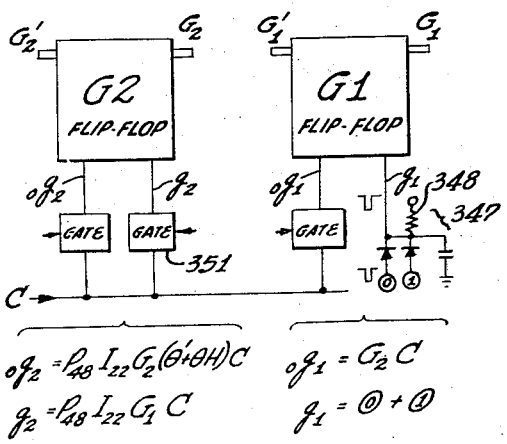

Figure 47 shows the two "go" flip-flops together with their logical algebra input equations.

Figure 48 shows the "halt" flip-flop and its logical algebra input equations.

Figure 49 is a diagram of the "fill digit" flip-flop X1 together with its associated input circuitry.

Figure 50 is a diagram of the push button switches for manually selecting the various operations that can be performed by the computer.

Figure 51:
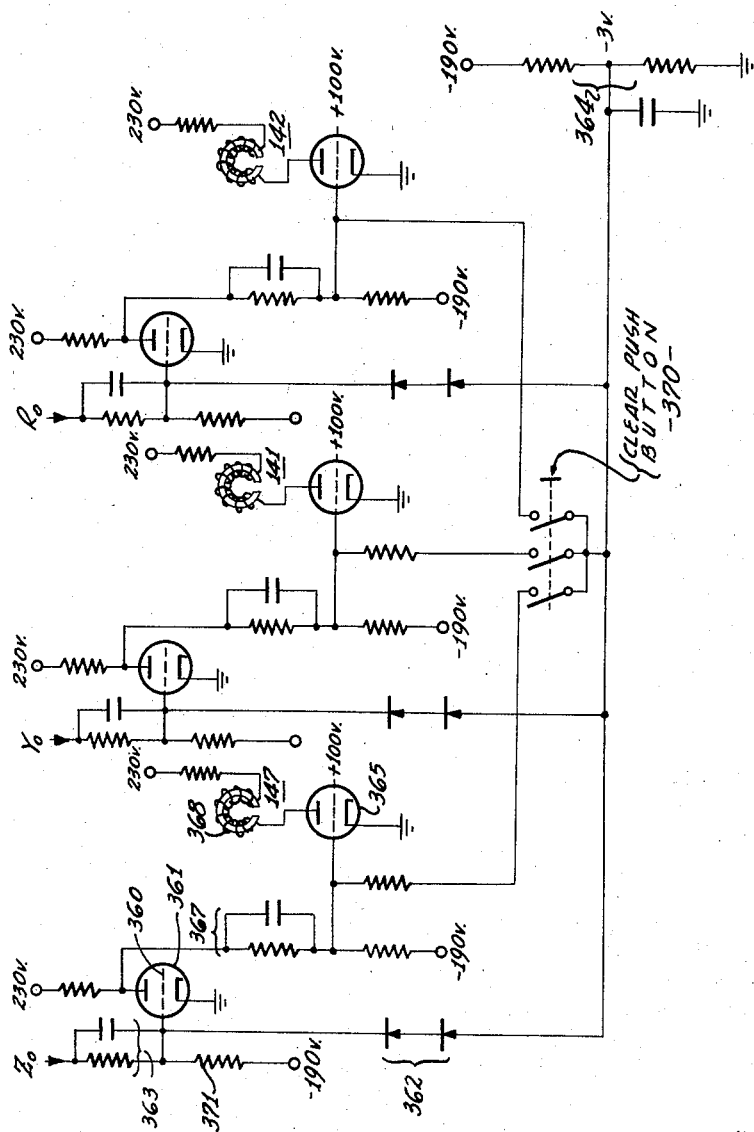

Figure 51 is a circuit diagram of the record heads and their associated circuits.

Figure 52 is a diagram of a driver circuit.

Figure 53 is the diode network for generating the inputs to the start flip-flop, the $dx$ register flip-flop, and the time propositions.

Figure 54 is the diode network for generating the inputs to the go and halt flip-flops.

Figure 55:
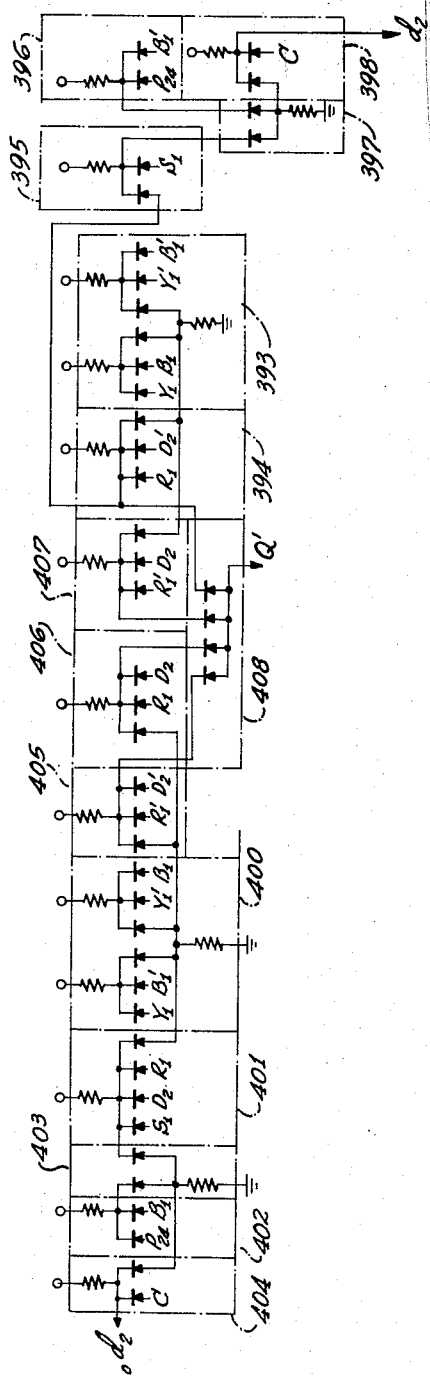

Figure 55 is the diode network for generating the inputs to the D2 delay flip-flop and the Q' proposition.

Figure 56:
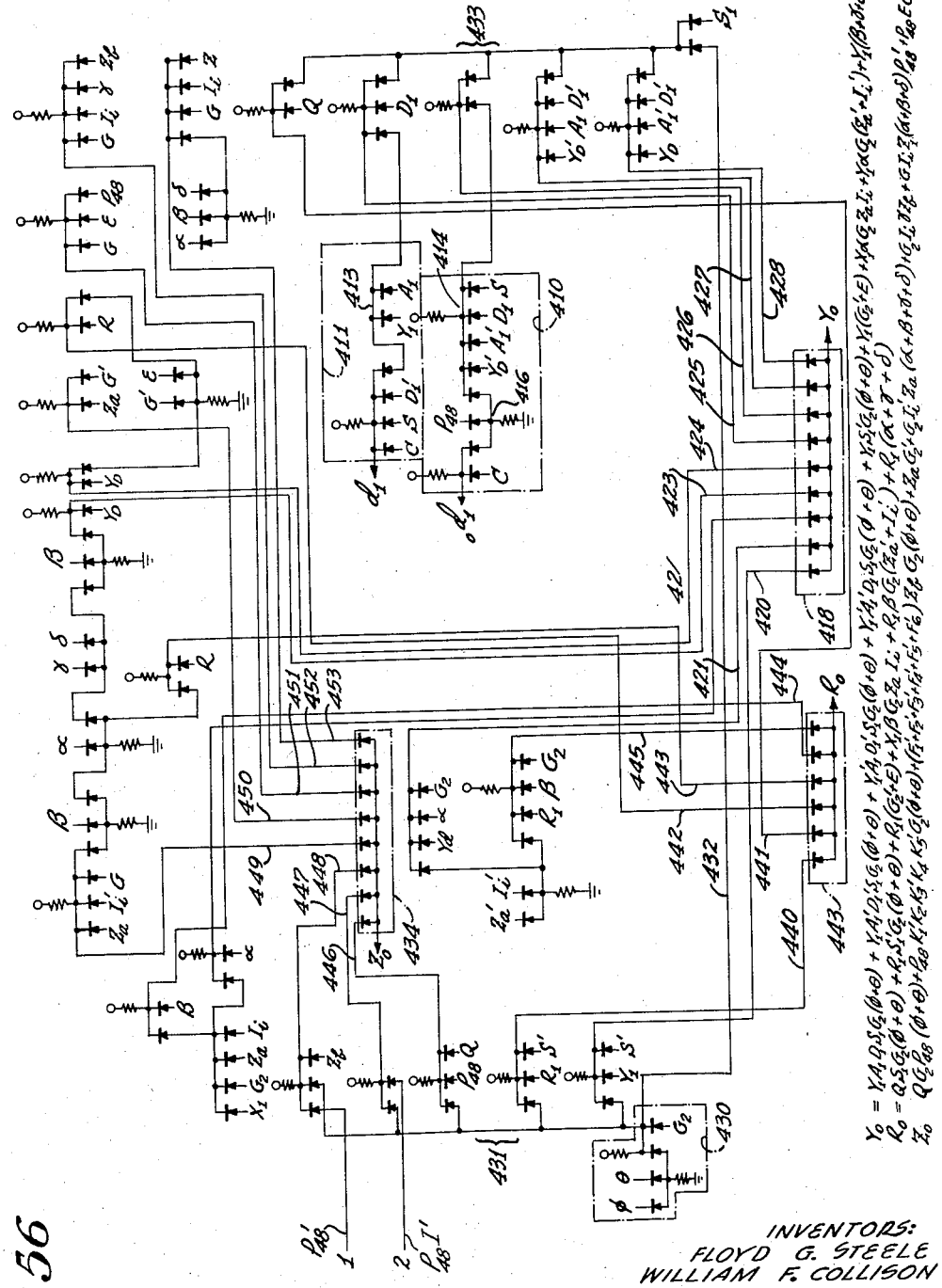

Figure 56 is the diode network for generating the computer output equations for the Y, R and Z channels together with the input equations for the D1 flip-flop.

Figure 57:
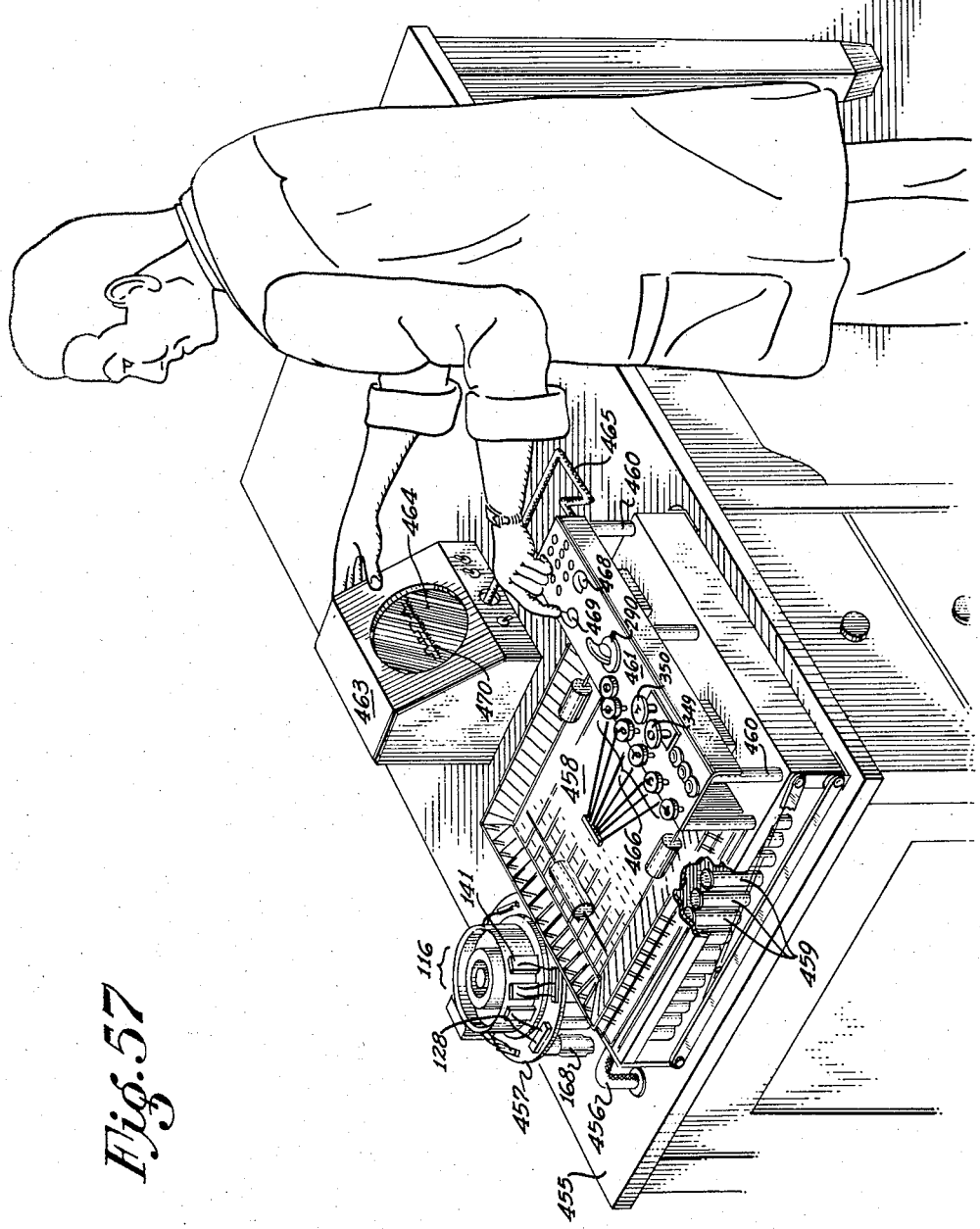

Figure 57 is an illustration of the preferred embodiment of the computer together with an operator.

Figure 58:
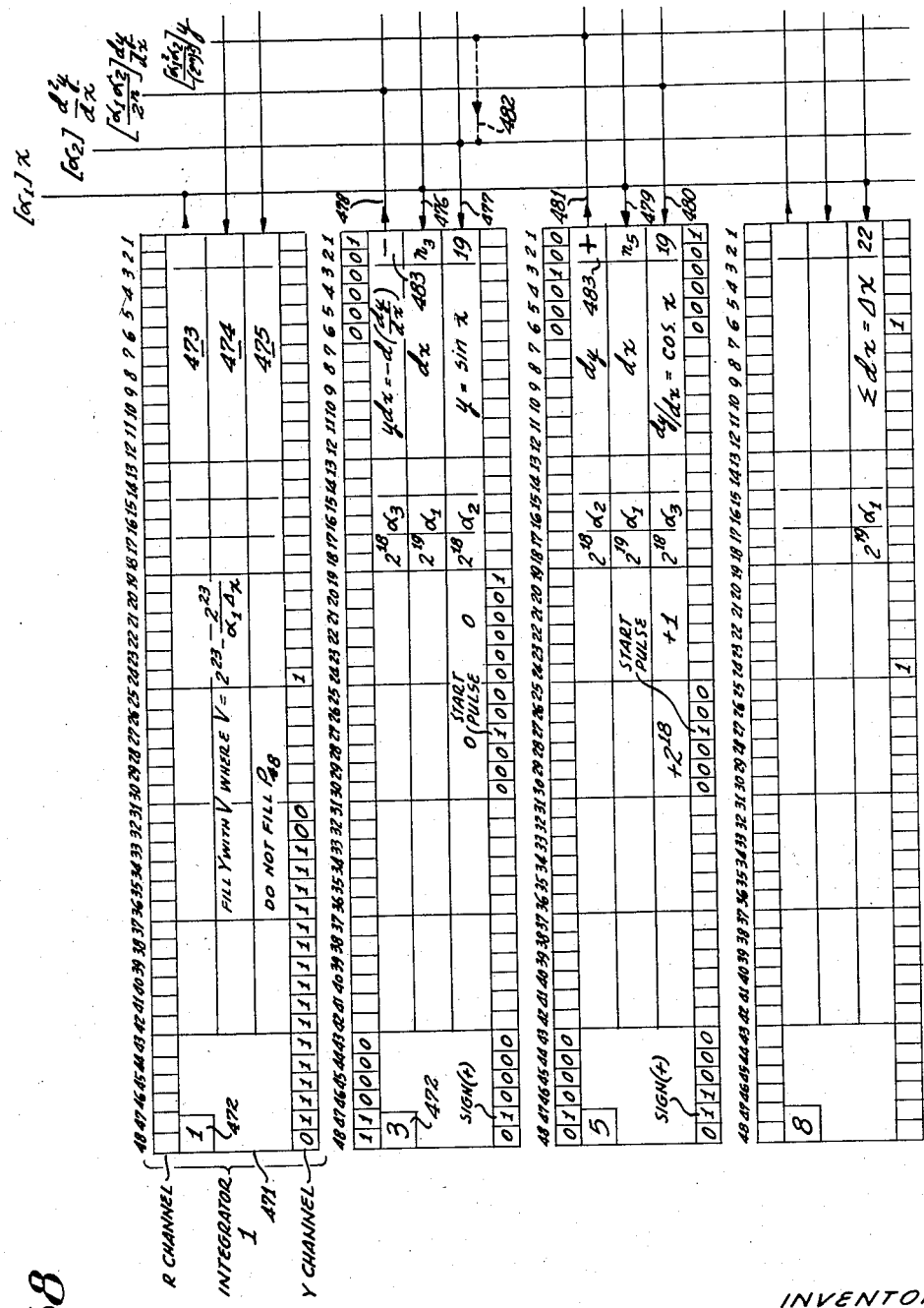

Figure 58 shows the arrangement of a work sheet for coding a problem for the machine.

Figure 59:
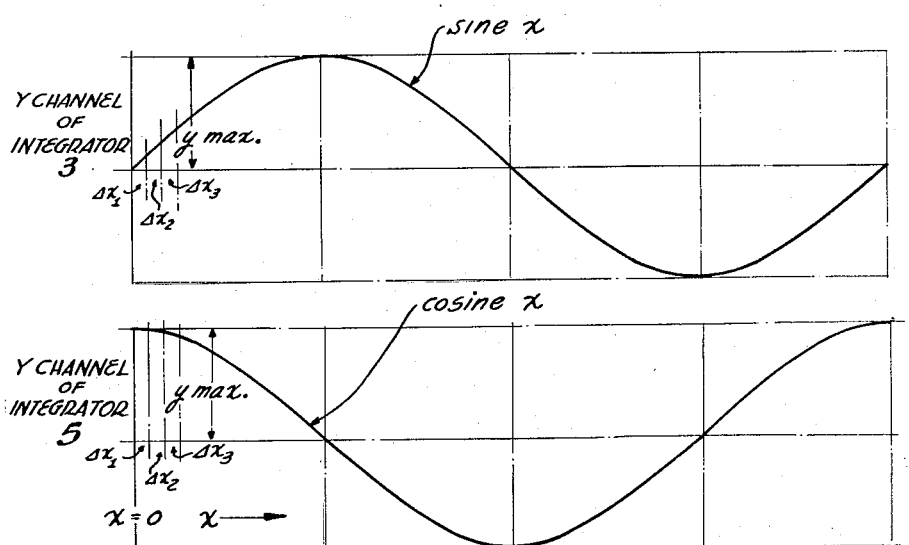

Figure 59 is a graph showing the solution of a problem solved by the machine.

Figure 60:
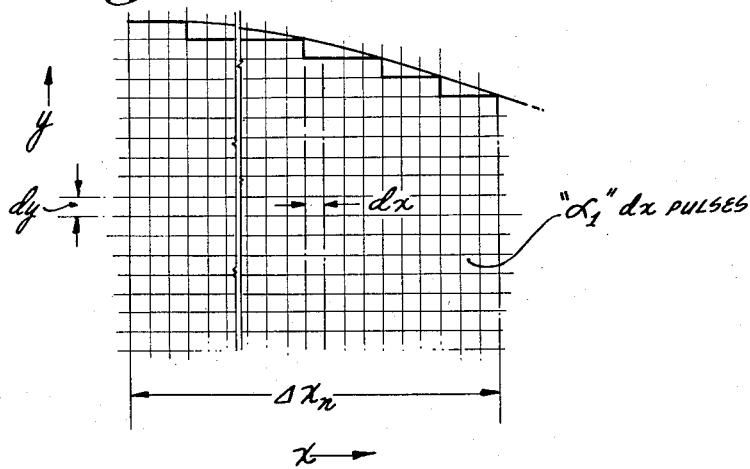

Figure 60 is a portion of the graph in Figure 59, showing the nature of the integration in each $\Delta X$ increment.

Figure 1:
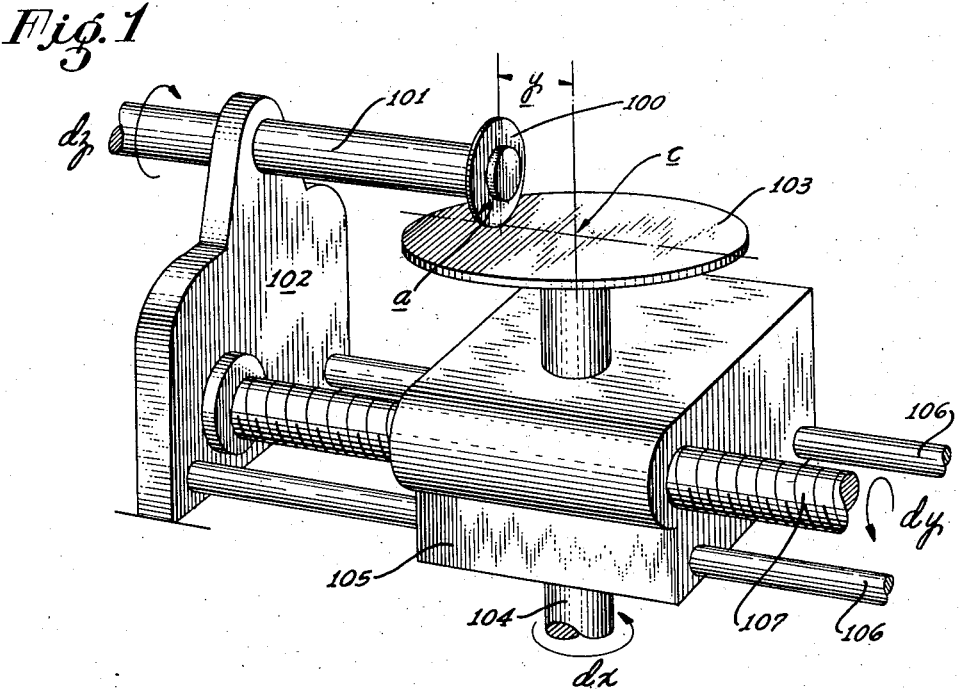
Figure 1 is an illustration for depicting the theory of operation of a wheel-and-disc type integrator.

Referring first to Figure 1, the well-known mechanical wheel-and-disc type analogue integrator is illustrated as an aid in explaining the theory of operation of the present invention. There a vertical wheel 100 has attached, at its center, one end of a horizontal shaft 101. Horizontal shaft 101 is cantilevered from a fixed bearing pedestal 102 in which it is rotatably mounted. It should be noted that the shaft 101 is carefully restrained from moving axially with respect to the pedestal 102. The periphery of vertical wheel 100, whose plane is thus fixed, rests on a horizontal disc 103 which can be rotated about the axis of a vertical shaft 104 extending downwardly from its center. Vertical shaft 104, in turn, is rotatably supported in a movable carriage 105 which is connected so that it can be driven along horizontal guide rails 106 by the rotation of a lead screw 107. This action enables the distance of the point of contact of the wheel 100 from the center C of the disc 103 to be varied; since the carriage 105 can be moved horizontally with respect to bearing pedestal 102, while the wheel 100 is always at a fixed distance with respect to the bearing pedestal 102.

Consider the point of contact of wheel 100 and disc 103 to be, at a given instant, a distance $y$ from the center C of disc 103. If the disc 103 rotates through a small fraction of a turn, say $dx$, due to a rotation on the vertical shaft 104, the wheel 100 will rotate through $ydx/a$ turns. This rotation of the wheel 100 is evidenced as an equivalent small fraction of a turn, say $dz$, on the horizontal shaft 101. In the above expression, $a$ is the radius of the wheel 100.

If the distance $y$ is now varied by a small fraction of a turn, say $dy$, on the lead screw 107 while the disc 103 is rotating, the total rotation of the wheel 100, and consequently the horizontal shaft 101, is the sum of each of the contributions $ydx/a$, that is, $\int ydx/a$ turns. It is to be noted here that $1/a$ can be taken outside of the integral sign, since it is a constant, and may be designated generally as the constant K.

This completes the description of the analogue integrator which enables one to produce solutions to differential equations mechanically and which has been presented herein to introduce the basis of the logic of the digital integrator of the present invention.

The proportionality characteristic common to all analogue devices exists in the wheel-and-disc integrator between shaft rotations and the variables of the differential equation. Each variable in the equation is represented somewhere in the machine by a rotating shaft. The total angle of rotation of a shaft from some reference position is proportional to the magnitude of the variable. The sign of the variable is denoted by clockwise or counter-clockwise rotation from the reference position. The rate of rotation of the shaft is proportional to the time derivative of the variable, and again, the direction the shaft is rotating determines the sign of the derivative. The independent variable shaft for one integrator, which in this case is vertical shaft 104, corresponds to the variable $x$ and is generally driven by a motor; and the ratio of the speed of rotation of any other shaft, say the lead screw 107 (which corresponds to the variable $y$) to the vertical shaft 104 is always proportional to $dy/dx$.

This operation may be further understood by considering derivatives and integrals separately. If the speed of rotation of the independent variable shaft 104 is, for example, defined as $dx/dt$ and it rotates for $t$ seconds through the range $x_1$ to $x_2$, its total rotation would be $$(x_2 - x_1) = \int_{x_1}^{x_2} dx$$

In other words, the speed of rotation of the shaft is proportional to the time derivative $$\frac{dx}{dt}$$

of the variable $x$; and the total rotation $(x_2 - x_1)$ of the shaft is proportional to the integral of $dx$.

In the mechanical integrator, as described, the lead screw 107 is connected in such a manner as to vary, at a $$\frac{dy}{dt}$$

rate, the position of the contact point of the wheel 100 with respect to the center C of the disc 103. The disc 103 is rotated by the independent variable shaft 104 at a speed $$\frac{dx}{dt}$$

The disc 103 "drives" the wheel 100 in such a manner that its speed $$\frac{dz}{dt}$$

is proportional to the product of the distance $y$ and the speed $$\frac{dx}{dt}$$

Regarded in this sense, the integrator is a multiplier. Since the output speed $$\frac{dz}{dt} = \frac{1}{a} y \frac{dx}{dt}$$

the total output rotation $$Z = \frac{1}{a} \int_{x_2}^{x_1} ydx$$

Because of these facts, the speeds of each of the shafts may be rightly defined as being proportional to the time derivative, or rate of change, of the variable it represents. It is also proper and proves to be advantageous in understanding the present invention to treat the speeds of the shafts as being proportional to the differentials of the variables, since the time term, though always implicit, cancels out.

Figure 2:
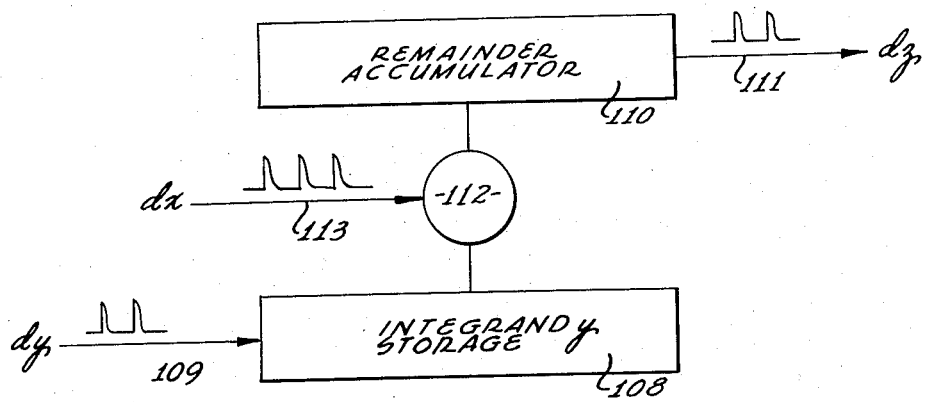
Figure 2 is a schematic diagram for depicting the theory of operation of the digital counter-part of the integrator in Figure 1.

Referring to Figure 2, the basic analogous digital integrating circuit of the present invention is schematically illustrated there and will now be generally described. This circuit is composed, in general, of three elements; a first counter functioning as an integrand storage 108 and having an input lead 109; a second counter functioning as a remainder accumulator 110 and having an output lead 111; and, a transfer device 112 which has a second input lead 113. Transfer device 112 serves the function of transferring the existing number $y$ from the integrand storage 108 into the remainder accumulator 110 each time a pulse input is received on second input lead 113.

Each electrical pulse, designated $dy$, received on the input lead 109 to the integrand storage 108, represents a small unit increase of the integrand $y$ and causes the integrand storage 108 content to increase by one. The nature of the transfer device 112 is such that as each input pulse, representing the variable of integration $dx$, is received on second input lead 113, the number $y$ existing in the integrand storage 108 is transferred in an additive manner to the number in the remainder accumulator 110, to thereby effect the differential combination of $y$ and $dx$, while the number $y$ is still being retained in the storage 108.

The remainder accumulator 110 has a given capacity, in this case of the same capacity as the integrand storage 108. As the existing $y$ number is continuously added into the remainder accumulator 110, as dictated by the $dx$ inputs, the accumulator 110 soon reaches its capacity and overflows. Its output lead 111 then emits an output pulse $dz$, and accumulator 110 starts to count from zero again.

It is to be noted tht the integrand storage 108 does not provide for an overflow output, its capacity limits the maximum value of $y$ which can be transferred into the remainder accumulator 110.

The nature of the transfer device 112 can take any one of several possible forms, in transferring the y number out of the integrand storage, such as serial or parallel additive transfer, for example. In the preferred embodiment of the present invention, which is to be described in detail in the ensuing discussion, a serial additive transfer is utilized. Reference is made to application Serial No. 147,862, March 6, 1950 (Steele et al.) now Patent No. 2,841,328.

The similarity of the digital integrator circuit of the present invention to the previously described wheel-and-disc integrator is now revealed in several aspects.

The basic idea of the present invention, in accordance with the foregoing, is in the representation of a variable by a count of electronic pulses instead of a shaft rotation.

The rate at which these electrical pulses are generated corresponds to the speed of rotation of a shaft on the wheel-and-disc integrator, i.e., is proportional to the derivative of the variable with respect to time. The total number of pulses in any interval is proportional to the change of magnitude of the variable.

Further, in the mechanical integrator, the relative position of the wheel 100 on the disc 103, which corresponds to the variable y, can be thought of as a memory device, i.e., it stores a single number y which is being changed in magnitude in accordance with the $$\frac{dy}{dt}$$

rate of rotation of the dependent variable lead screw 107. The integrand storage 108 of the digital integrator plays the same role, i.e., it sums the pulses received on the input lead 109 and stores the number y thus obtained.

Similarly, the radius a of the wheel 100 which appears as a constant $1/a$ in the output expression from the mechanical integrator may be thought of as a fixed rate changer, i.e., its magnitude reduces, or gears down, the speed of rotation $$\frac{dz}{dt}$$

of the output shaft 111. In the digital integrator, the remainder accumulator 110 functions in this same manner, its capacity expressed in binary notation as $2^n$, where n is the number of binary stages appears as a constant $$\frac{1}{2^n}$$

in the output expression and, as will be seen, reduces the rate of the dz pulses fed out on the output lead 111.

Figure 3:
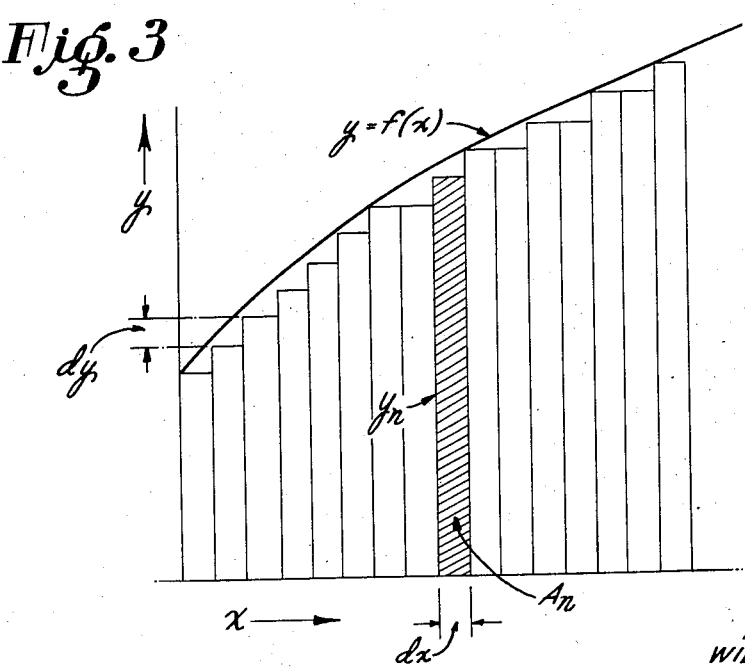
Figure 3 is a graph illustrating generally how the present invention performs the process of integration.

In order to further understand how the digital integrating circuit performs the integrating process, digital integration will be described as a process of finding an area under a curve $y=f(x)$ which is identified only as a set of numerical values of the ordinate corresponding to a set of successive values of the abscissa. As shown in Figure 3, this is accomplished by subdividing a given area into a succession of adjacent incremental rectangular sub-areas such as the cross-hatched area $A_n$. The height of each rectangular sub-area $A_n$ can vary in steps equivalent to fixed increments dy so that, for instance, its left ordinate $y_n$ tends to intersect the curve $f(x)$; the width of all the sub-areas is equal and is determined by the value fixed for the increment dx. The total area, which is the sum of the sub-areas, corresponds to the approximated integral. It is seen that this method of integration can be caused approximate to any degree of accuracy the desired area under $f(x)$ by decreasing the value of the increment assigned to each dx and, of course, dy which is of the same order.

In the present embodiment of the invention, making use of the fast acting electronic equipment, the value of dx, or the increment for any other variable, can be assigned very small values.

Thus, although the rate of change of a variable is, in fact, a discrete step, in the logic of the digital integrator, these steps are made as small as needed to obtain the required accuracy so that, for all practical purposes, the continuously variable rate of change of the variable, the essential feature of the calculus is, in effect, preserved.

Referring back to Figure 2, digital integration of the area under the curve $y=f(x)$ is performed by the device there presented, by summing the incremental variable rectangular sub-areas $A_n$ so determined in Figure 3. Since the incremental dx in determining each incremental sub-area, defined as $ydx$, is fixed throughout an integration, dx can be assumed to be dropped out of the notation by being assigned the value "one." This in no way effects the proportionality of an ordinate y to its corresponding sub-area.

Thus, each time a dx pulse is received on second input lead 113 to the integrator circuit, a digit "one" may be considered to be received.

Referring to Figure 3, it is noted that the change in height, of a sub-area $A_n$, i.e., the change in magnitude of the successive ordinates y, is to be made in very small fixed steps denoted as dy.

Since each dy pulse received on the input lead 109 of the digital integrator increases the number in the integrand storage 108 by one unit, it is, similarly to the dx input pulse, considered as a digit "one" input to the integrator circuit.

The digital integrator of Figure 2 can thus be considered to have two "one" inputs, one of which, dy, is proportional to the incremental change in height of the sub-area $A_n$, and the other of which, dx, is the instruction to cumulate.

As the sub-areas corresponding to the y ordinates are successively cumulated in the remainder accumulator 110 of Figure 2, each time the capacity of the accumulator 110 is reached, a carry out pulse dz is emitted on the output lead 111.

The carry out pulse dz, which is likewise to be considered as a digit "one" in the logic of the digital integrator, will be due to a pulse accumulation corresponding to a number N where N is one greater than the largest number which either the accumulator 110 or the storage 108 will hold. In other words, $N=2^n$, where $2^{n-1}$ is the number in a binary accumulator, say, when all of the stages contain the digit one. Anytime a carry out pulse dz is emitted as a "one" digit on output lead 111, a remainder term of $$\frac{r}{N}$$

which is always less than "one," is left in the accumulator 110. The next transfer of a y number from the storage 108 thus adds to the remainder $$\frac{r}{N}$$

in the accumulator 110 and may or may not, depending on the combined value, cause a single carry out pulse dz on output lead 111.

Thus the basic digital integrator circuit performs its function in a manner based upon summing rectangular incremental sub-areas.

In order to further understand the operation of the basic digital integrating circuit, first consider that the y number in the integrand storage 108 is fixed, i.e., no input pulses or "ones" appear on input lead 109.

Now then, in general, if a number x represents the total number of "ones," i.e., pulses, entering on second input lead 113 for a given time interval, the total number of carry out "ones," identified as z, will be exactly $$z = \frac{yx}{N} - \frac{r}{N}$$

where N, as before noted, is one greater than the largest number which either the accumulator 110 or storage 108 will hold, and $$\frac{r}{N}$$

is the remainder term always less than "one" which is herein defined as the round-off of the increment $dz$.

It is instructive to introduce here, still assuming that $y$ is held constant, the concept of the rate at which "ones" are entering on $dx$ second input lead 113 and leaving on $dz$ output lead 111. Thus, it is noted that within the accuracy of the accumulator 110, which contains the proportional part of a "one" not appearing on output lead 111, the rate of the "ones" output is fixed with respect to the rate of the "ones" input. This is because the input $x$, as seen in the above formula, is multiplied in this case by a constant $$\frac{y}{N}$$

to obtain the output $z$. In other words the rate of output pulses will be $$\frac{y}{N}$$

times the rate of input $dx$ pulses.

This result is what should be expected because of the analogy of the present circuit with the wheel-and-disc integrator which is, in reality, but a variable gear. If the position of the wheel 100 were to be fixed on the disc 103, the mechanical integrator wound function as a fixed gear and the change in speed of the independent variable shaft 104 to the output shaft 101 would be a constant.

Now then, consider the input rate of "ones" into the storage 108 as $$\frac{dy}{dt}$$

This can be done because a counter can be considered as a device which integrates the rate admitted to it with respect to time, i.e.

$$y = \int \frac{dy}{dt} dt = \int dy$$

Since $y$ now varies in magnitude, the previous equation no longer holds. Instead, the integral or the output rate of "ones" must be expressed as:

$$Z = \left( \int \frac{y \, dx}{N} \right) - \frac{r}{N} \text{ or, } \frac{dz}{dt} = \frac{y \, dx}{N \, dt} - \frac{dr}{dt N}$$

where the differentials $dz$ and $dx$ are not true differentials but the small discrete changes in the variable as previously described.

The above equation essentially states that the rate at which the accumulator 110 produces "ones" is proportional to the product of the variable $y$ and the input rate of "ones" into the transfer device 112. The last term $$\frac{dr}{dt N}$$

corresponds to the rate of change of the round-off of the increment $dz$.

Thus it can be seen that the output rate $$\frac{dz}{dt}$$

of "ones" on the $dz$ output lead 111 is now variable with respect to the input rate $$\frac{dx}{dt}$$

of "ones" on the $dx$ second input lead 113. This variableness in the rates of "ones" into and out of the integrator is directly proportional to the variable number $y$, within the accuracy of the remainder term $$\frac{dr}{dt N}$$

The concept of the rate at which "ones"

$$\left( \frac{dx}{dt} \text{ and } \frac{dz}{dt} \right)$$

are entering and leaving the integrator circuit, for the case of an input rate $$\frac{dy}{dt}$$

of "ones" also, will now be further clarified. Since neither of these operations $$\left( \frac{dx}{dt} \text{ and } \frac{dz}{dt} \right)$$

need repeat at constant intervals of times, it is necessary to define some continuity which establishes an equivalent rate of change. Assume that both $x$ and $z$ are plotted against real time as a succession of points, each point being located at that instant in which its value was just changed from the previous value by the admission or emission of "one" in the integrator circuit. Pass a smooth curve through these points, for example, a polynomial of higher order, and take the time derivatives $$\frac{dx}{dt} \text{ and } \frac{dz}{dt}$$

then, these instantaneous time rates at which "ones" enter the transfer device 112 of the integrator can be defined as equal to $$\frac{dx}{dt}$$

and the instantaneous time rates at which "ones" carry out the integrator from the accumulator 110 can be defined as equal to $$\frac{dz}{dt}$$

The concept of such rates is both useful and correct to the extent that the summation process duplicates the integrating process.

As explained in connection with the mechanical integrator, no substantial error is made in the digital integrator in considering the rate of change of a variable as being proportional to its differential instead of its derivative, since the time term, though always implicit, cancels out.

Thus, to preserve the similarity of the digital integrator to the mechanical one and to take advantage of the simple logic of the mechanical differential analyzer, inputs 109 and 113, and output 111 of the digital integrating circuit of Figure 2 have come to be known as the $dy$ and $dx$ inputs and the $dz$ output, respectively. This nomenclature persists throughout the remainder of this discussion and is adhered to both in developing the logic of the fundamental digital integrator circuit and in interconnecting several such integrator circuits to solve complex differential equations.

The numerical device just examined satisfies broadly the first three requirements as set forth for the integrator in that it combines two input rates into the specified output rate and produces the output in kind. For example, the $dz$ output of the device can be coupled back to form its own $dy$ input to produce an exponential function It will be noted that a "one" may serve either as an incremental "unit" or as an instruction.

Thus, the digital integrators may be considered broadly as a set of devices which communicate between themselves in the monary or unitary number system, and which operates upon the intercommunications by means of numbers internally stored and expressed in any numbering system convenient. Numbers may be looked upon here as the means of establishing and accurately controlling "streams of ones." These "ones" are, in turn counted to form other numbers.

The stored numbers act upon a received rate of "ones" by deleting units from it, and, therefore, have the nature of variable or fixed rate dividers.

The effect of an integrator is to transmit an effective unitary rate $dz$ which is equal to or less than the $dx$ input rate, never greater. If the value of a dependent variable, $z$, is to be found by counting the $dz$ or output rate, then for example, between $10^4$ and $10^5$ units or pulses must be counted in order to express $z$ as a five place decimal number. If the rate reduction of the integrator is nominal, this may, ordinarily, be accomplished by the admission of no more than $10^5$ $dx$ inputs. If the rate reduction of the integrator is excessive, the number of $dx$ inputs required to achieve the same accuracy of expression for $z$ must be greater. Since the time required to perform an addition cycle in the integrator will usually be fixed, the accuracy achievable in a limited time and with a limited amount of equipment will, therefore, depend, among other things, upon the extent of rate reduction in the integrators.

Returning to Figure 2 and equation $$\frac{dz}{dt} = \frac{y}{N}\frac{dx}{dt} - \frac{dr}{dtN}$$

it is evident that the rate reduction ratio $$\frac{dz}{dx}$$

is essentially established by the ratio of the variable $y$ to the constant $N$. Therefore, $y$ must be kept as large as possible consistent with the size of the storage 108. The maximum value which $y$ takes during a computation should fill the storage 108; that is, will have a digit represented in the highest stage. At no time, of course, can the capacity of the storage 108 be exceeded. In the binary system, if the average numerical value which $y$ takes in the storage 108 during computation is half its capacity, then the average rate out is one-half of the average $dx$ rate in. If this rate is allowed to cumulate in the storage 108 of another integrator, then that storage will receive enough units to fill half of its capacity. Since it will have an initial setting, however, which will occupy on the average half of its capacity, the storage will tend to be filled.

As a consequence, the rate reduction through a series of integrations need not exceed that of a single integrator providing the scale has been correctly chosen for each integrator. This principle will be demonstrated later in an example showing the hook up and describing the manner in which the preferred embodiment of the invention can be used for generating the sine and cosine functions.

Having thus broadly described the method and nature of performing digital integration in accordance with the present invention, the preferred embodiment of the computer will now be described in detail.

Referring to Figure 4, a perspective schematic diagram of a magnetic wheel, functioning as the dynamic memory, is shown. Here motor 115 rotates wheel 116 through a drive shaft 117, at substantially, although not necessarily, a constant speed. Shaft 117 is journalled in bearing 118 mounted on bearing supports 119 located at the sides of a bearing pedestal 121. The wheel 116 has a layer of magnetic material 120 bonded around its outer periphery.

Wheel 116 rotates in an outer housing 122 having an inner wall 123 that conforms to the curvature of the wheel. Since it is desired to have 22 integrator set-up memories or integrator storage section, available on the magnetic wheel, the wheel periphery is effectively divided into 22 adjacent memory arcs, each containing one integrator storage section which may comprise several channels, and each arc being of equal length. These arcs are defined by the dashed radial lines 124, which indicate sectors on the side of the magnetic wheel 116. These sectors are designated by the notation $l_1$ through $l_{22}$, consecutively, starting at arc $l_1$ and moving in a counter-clockwise direction around the wheel. The sides of two of the arcs, as for example $l_1$ and $l_{22}$ in the illustration shown, are contiguous but rather have a non-working arc 125 between them.

Rigidly mounted in the upper wall of housing 122 are four pick-up heads 128, 129, 130 and 131. These pick-up heads are positioned to cooperate with four magnetic circumferential information channels 132, 133, 134 and 135, respectively, appearing on the periphery of the wheel.

The first two information channels from the left, namely 132 and 133, are designated as the integrator set-up channels and will be referred to hereinafter as the Y channel and the R channel, respectively. Each of the memory arcs $l_1$, $l_2$, etc., as shown in Figure 4, thus includes a portion of the Y channel and the R channel. Furthermore, it is shown in Figure 4 that as the wheel 116 is rotated in a clockwise direction, the information picked up from the R and Y channels by the respective pick-up heads 128 and 129 is fed to the computer unit 136 via pickup lines 137 and 138, respectively. Information is then taken out of the computer unit 136 via record lines 139 and 140, and deposited back onto the R and Y channels of the memory track by means of record heads 141 and 142, respectively.

It is now made evident that the particular portions of the wheel 116, on which the memory arcs $l_1$, $l_2$, etc., are shown in Figure 4, do not always contain the particular integrator arcs as designated there. The location of the integrator memory arcs on the wheel 116 is rather of a dynamic nature in that during idling, for example, the information on each point of the integrator arc, as it comes up to the pick-up heads 128 and 129, is transferred to a new point of the wheel ahead of its previous position by an accurate distance (a given number of clock pulses) equal to the non-working arc 125. Thus, it is seen that $l_{22}$ and $l_{21}$ memory arcs could be located, for example, in the non-working arc zone 125 at some later operation time of the computer, as shown for example by the cross hatched sector area 143 on the side of wheel 116.

The circumferential channel 135, farthest to the right in Figure 4, is denoted the clock channel. On this channel 135 the magnetic pattern of a sine wave is impressed. The sine wave is substantially uniform and, for the present embodiment of the wheel, has 1160 cycles magnetically impressed around the wheel circumference in a closed loop. The clock pick-up head 131 has clock pulses continuously generated therein, at about 100 kc., all the while the wheel 116 is running. These clock pulses are fed on a clock line 144 to the computer unit 136 to synchronize the operations performed therein. It should be noted that the clock pick-up head 131 can be located anywhere along the circumferential clock channel 135.

Figures 5, 6:
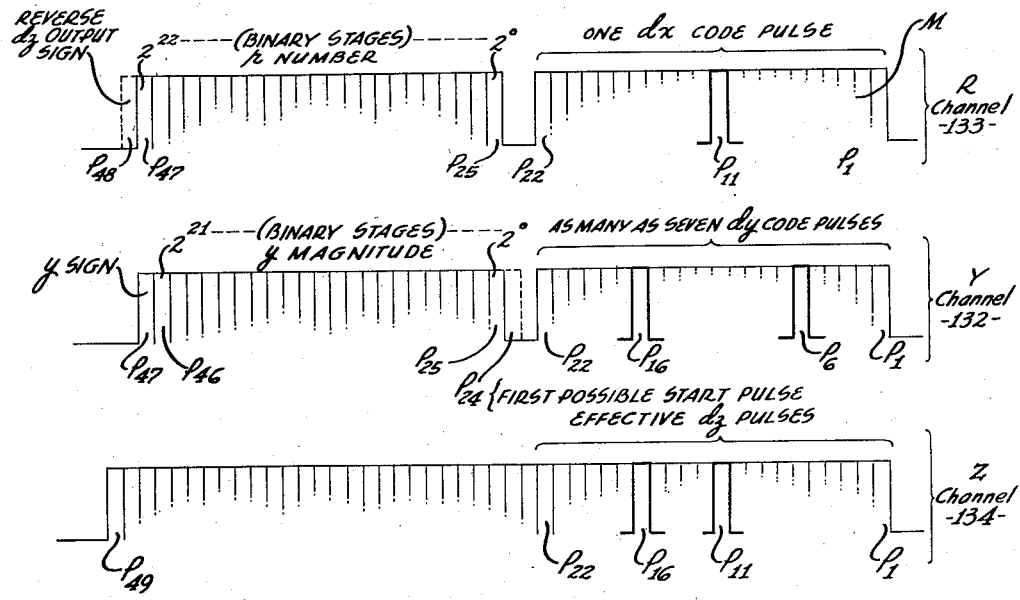
Figure 5 is a chart listing the word structure which appears in each integrator memory arc of the wheel.
Figure 6 is a diagram of one integrator memory arc showing how the word structure is arranged thereon.

The detail description of the Y and R channels, located on the memory track on the periphery of wheel 116, can now be best described by referring to Figures 5 and 6. This first drawing shows a table defining the word structure appearing in the Y and R channels; and the second drawing shows the layout of a single integrator memory set-up together with the relative time-wise location of the information in the Z channel.

As noted by Figure 5, each of the integrator memory set-ups is 48 clock units long. Each clock pulse time represents a spot on the wheel periphery on which a unit of information may be placed. This unit of information is binary in nature. It enters or leaves the memory in the form of either a high or low voltage state which endures statically during half of the clock interval and is changed during the other half. The information is not actually played back from the wheel in this high-low form but is converted to it in the output circuitry. In this disclosure, reference will of ten be made to the contents of the memory as consisting of "ones" and "zeroes" and, further, "one" will be defined as a high voltage level and "zero" as a low voltage level, even though this condition does not actually obtain in the physical recording. In other words, the memory contents are described according to the way they appear at the output flip-flop. Referring to Figure 5, it is seen that the word structure of the R channel 133 is divided in the main, into the $dx$ code section which includes clock time intervals $P_1$ through $P_{22}$, and the $r$ number section which includes clock time intervals $P_{25}$ through $P_{47}$. The word structure of the Y channel 132 is divided in a similar manner primarily into the $dy$ code section consisting of clock time intervals $P_1$ through $P_{22}$; and the $y$ magnitude section consisting of the clock time intervals $P_{25}$ through $P_{46}$. The intervals indicated by the clock time intervals $P_1$ through $P_{47}$ may thus be seen to indicate integrator storage sections which will provide the requisite storage capacity for each stage of integration, and thus for each integrator.

The scheme employed in the present invention and recording information on the wheel is shown by Figure 6. This information is recorded by the non return to zero, or "NRZ," method in which the constantly flowing recording current only changes its direction for a change in the value of binary digits to be recorded, rather than for each binary digit. For example, for a "word" consisting of all "1's" the recording current is positive and continuous for the duration of the word, thus uniformly magnetizing the medium over that portion of the wheel so as to provide a square wave magnetic pattern M (Figure 9). The resulting played back voltage from the wheel is then only a positive pulse at the beginning of a word and a negative pulse at the end of the word. This is because the pick-up head essentially differentiates the recorded current.

Taking up first the R channel 133, in Figure 6, clock time positions $P_1$ through $P_{22}$ therein are reserved for a $dx$ pick-up mark or "one." As seen by Figure 6, only one $dx$ code mark is placed in this section and it can be placed in any one of the clock positions $P_1$ through $P_{22}$. For this particular example, it is shown to be placed in clock position $P_{11}$. The $dx$ code mark enables a $dz$ output pulse from any specified integrator to be fed into the present integrator in a manner to be described later. Clock time positions $P_2$ and $P_{24}$ are always blank in the R channel. As for the numerical portion of the R channel, $P_{25}$ through $P_{47}$ is reserved for a train of high or low states corresponding to the digits of the $r$ number. Thus, the position $P_{25}$ corresponds to the $2^0$, $P_{26}$ to the $2^1$, up to $P_{47}$ which corresponds to $2^{22}$. The memory pattern in this numerical section of the integrator memory produces at its output high voltage state in a particular $P_n$ position to represent a digit "one" and a low voltage state to represent a digit "zero." Thus a 22 binary digit $r$ number together with sign can be stored in the R channel. The $P_{48}$ clock time position of the R channel of each integrator set-up is used for reversing the $dz$ output sign when a "one" is present. The significance of this $P_{48}$ clock position will be made clear in the ensuing discussion.

The word pattern in the Y channel 132 will next be discussed. As in the R channel 133, the clock time positions $P_1$ through $P_{22}$ are used for the pick-up code—this time the $dy$ pick-up code. As noted in Figure 6, from zero to seven $dy$ pick-up code marks can be placed in the $P_1$ through $P_{22}$ positions of the Y channel. For purposes of illustration, two $dy$ code pulses are shown in pulse positions $P_6$ and $P_{16}$. These $dy$ code marks are employed for picking up records of $dz$ outputs from the same and/or other integrators as will be explained more clearly later.

Position $P_{23}$ is always blank in the Y channel. $P_{24}$ is the first possible position in which a "start mark" can be recorded. This start mark is used for setting a start flip-flop S1 (shown in Figure 31) to the on state initiating a proposition in the computer unit 136 which controls, in essence, the scale factor of the integrator. It should be noted that the start pulse can be placed in $P_{24}$ or in any of the $y$ number positions, in which case, all the lower $y$ number positions are necessarily blank down through $P_{23}$. Referring next to the numerical section of the Y channel 132, pulse position $P_{25}$ can be normally designated as the $2^0$, $P_{26}$ the $2^1$, etc., of a pulse pattern in which $P_{46}$ is $2^{21}$. Thus a 22 binary digit $y$ number magnitude can be expressed. The $P_{47}$ pulse position corresponds to the $y$ sign stage. A "one" in this sign position indicates that the associated $y$ number is positive and a "zero" in this sign position indicates the $y$ number is negative. The $P_{48}$ position of the Y channel is always blank. This completes the detailed discussion of the word patterns appearing in the Y and R channels.

The Z channel will next be discussed. It should be understood that the Z channel is different from the other channels discussed in that it represents a central or common storage. A section of the R and Y channels is allocated to each integrator memory, twenty-two of which sections are provided in the preferred embodiment of the invention. However, there is only a single Z channel and it is used in conjunction with each of the integrator set-ups each time a computation takes place. Referring to Figure 4 again, it can be seen that the Z pick-up head 130 picks up the information on the Z channel 134 and conveys it on a Z pick-up line 145 to the computer unit 136. The computer unit feeds $dz$ indications back onto the Z channel on the wheel by connection 146 to the Z record head 147. The Z channel will be discussed further in the ensuing description. Suffice it to say, here, that the $dz$ overflow outputs, generated at the $P_{48}$ position of any integrator, as a result of each of the integrator set-ups passing through the computer unit, are temporarily stored in the $dz$ precession line which is constituted by the Z channel. The $dz$ precession line can be thought of as a memory through which all the $dz$ pulses are serially advanced one position each time a clock pulse occurs. However, due to the fact that the $dz$ precession line during computation is made 49 clock intervals long, while each integrator set-up is only 48 clock intervals long, the matching or coinciding positions between the $dz$ precession line and each integrator set-up are one clock pulse later for each successive integrator set-up. This precession is necessary in order that indications of $dz$ outputs from successive integrators shall not be recorded on top of each other in the Z channel, but rather be recorded in successive clock positions. This precession must be taken into consideration in recording the $dx$ code and $dy$ code pick-up marks.

Referring to Figure 6, it is noted that the only Z channel indications that are effective are the ones that occur in the $P_1$ through $P_{22}$ positions of any integrator set-up. The reason 22 positions are required is because there are 22 possible integrator set-ups in the present computer and each of the effective 22 positions in the precession line thus may hold a "one" or "zero" depending upon whether the output from its generating integrator set-up was a 1 or a 0.

It is now also made clear why there are 22 pulse positions, $P_1$ through $P_{22}$ to be exact, in the code sections of the Y channel and the R channel, since it is the coincidence of a mark in the code sections with a "one" or "zero" indication in the precession line which enables the outputs of other integrator computations, to be fed as inputs into the integrator presently being entered into computation. For example, in the present illustration, a $dz$ "one" appears in the $P_{11}$ of the R channel enables this $dz$ "one" to be fed as a "positive" $dx$ input into the present integrator. The $P_{16}$ dy pick-up code mark similarly coincides with the dz "one" in $P_{16}$ of the dz channel, this dz coincidence results in a "positive" dy input. However, the $P_6$ dy pick-up code mark finds no dz "zero" in the corresponding position of the dz channel. This results in a "negative" dy input being fed into the present integrator.

Figure 7:
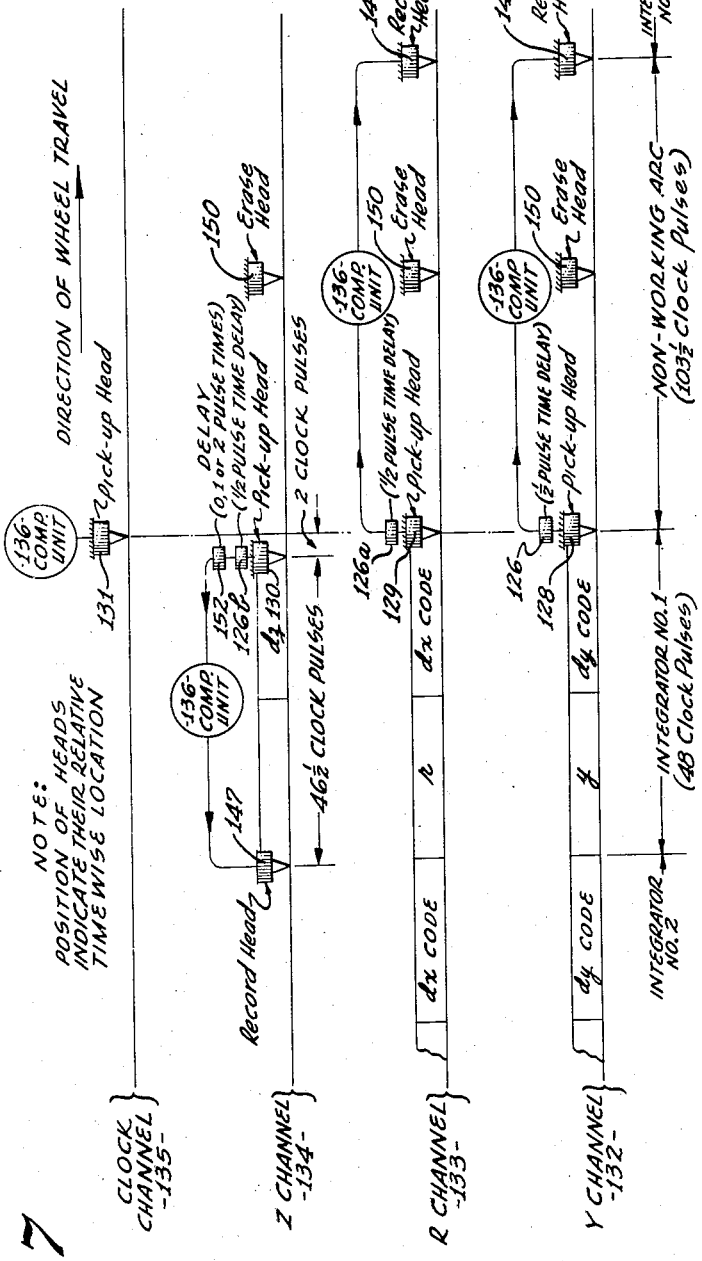
Figure 7 is a view of a portion of the memory track showing, in particular, the time-wise location of the pick-up and record heads.

The detailed description of the relative locations of the pick-up heads will now be described by referring to Figure 7 showing the plan view of a portion of the magnetic memory track. The upper channel 135 there shown is the clock channel previously described. As has been stated, the clock pick-up head 131 can be located anywhere along the clock channel 135 recording. The relative time-wise location of the clock pick-up head in its clock pulse interval is important, however, as is also the relative spacing of the other heads along their respective channels with respect to each other is important.

In Figure 7 the heads are all shown to be stationary and the memory track of the magnetic wheel 116 is assumed to travel from left to right past the heads.

The Y channel pick-up head 128 is shown to be positioned at a given instant of time, to pick up the information in the $P_1$ position of the $l_1$ integrator memory arc. This Y pick-up head 128, after approximately a one-half pulse time delay in synchronizing circuit 126, transfers digits picked up from consecutive clock time positions of the Y channel 132 in a serial fashion, i.e., one at a time, into the computer unit 136. The computer unit 136 is such, as will be explained later, that every time data from a particular position of an integrator set-up is fed therein, the computer unit automatically generates, without significant delay, the new data required for the corresponding position of the integrator set-up being modified by computation. This new data is re-recorded by Y record head 141 on the memory track at a point spaced 104 clock intervals ahead of the clock point on the wheel 116 at which it was picked up. Since there is a one-half clock pulse delay between pick-up and record of a particular pulse position, the heads 128 and 141 are spaced 103½ clock pulses apart.

Referring next to the R channel 133, the position of R pick-up head 129 is seen to be synchronized in time with the Y pick-up head 128. Thus the data on both the R and Y channels of the $l_1$ integrator set-up which is picked up first is the $P_1$ position. As before, after a one-half clock interval time delay in synchronizing circuit 126a, the information is fed into the computer unit 136 which immediately generates the corresponding position data for the revised integrator set-up. This data is deposited by the R record head 142 onto a point of the wheel 104 clock intervals ahead of where it was picked up. Thus the heads 129 and 142 are, likewise, spaced 103½ clock pulses apart.

The relative location of the dz channel pick-up and record heads 130 and 147 will next be described. The dz pick-up head 130 for the dz channel is located 2 clock intervals to the left or (or earlier in time than) the position corresponding to the time location of the Y and R pick-up heads 128 and 129, respectively. The reason for this is that by providing additional one or two interval delay times, a variable length delay line can be provided for the information picked up from the dz channel. The significance of these delay times will be explained in the ensuing discussion. During computation, the dz indications picked up or extracted from the dz channel, after their initial delay of about one-half a clock interval in synchronizing circuit 126b, are delayed the two additional clock intervals as dictated by the delay unit 152. Thus, the $P_1$ position digit of the dz channel, although picked up earlier, is fed into the computer unit 136 at the same time as the corresponding $P_1$ digit positions of the R and Y channels. The output from the computer unit 136 to the dz channel is recorded, in this case, onto the wheel memory by a dz channel record head 147 located physically 46½ clock positions to the rear of the dz channel pick-up head 130. Because of the initial one-half clock interval time delay plus the two clock interval time delays caused by circuit 152, for this case, this information is deposited on the wheel 49 clock positioned to the rear of the clock position from which it was picked up even though the heads are physically 46½ clock positions apart. It is thus seen that while the Y and R channel pick-up heads 128 and 129, respectively, always deposit their information at a point corresponding to 104 clock positions ahead of the respective point of pickup; the dz channel pick-up head 130, on the other hand can deposit information 47, 48 or 49 clock times in arrears of the clock time position at which it picked up information.

For convenience, the corresponding In integrator set-up information for the Y, R and Z channels has been shown to be physically located along the same radii of the memory wheel. Actually, corresponding positions on the R, Y and dz channels may have a temporal reference, only, so that the R, Y and dz channels can be physically staggered with respect to each other and still have the proper time-wise relationship. On the actual physical embodiment of the machine, this is, in fact, the existing condition since the size of the heads causes physical interference between the heads and thus they have to be staggered around the wheel.

This generally describes the manner of picking up and depositing the information in the R, Y and dz channels of the machine. It should be noted that erase heads 150 are provided in what has been defined as the non-working arc between the pick-up heads and the record heads of each of the Y, R and dz channels. These erase heads 150 remove all the magnetic information which has previously defined an integrator set-up and thus provide a clean portion on the magnetic wheel 116 on which to record the new integrator set-up information which has been established by the computer unit 136.

The circuitry associated with the clock pick-up head 131 and the Y, R and dz pick-up heads 128, 129 and 130, shown in Figure 7, for example, will next be described by reference to Figures 8 and 9. These heads pick up information previously recorded in the form of magnetic patterns M on the memory track of the wheel 116, and supply this information to memory flip-flops in the computing unit 136 of the machine.

The clock pick-up circuitry in Figure 8 comprises a pick-up head 131 having a split core 154 wound by a coil 155. The permanent magnetic recording on the clock channel 135 is substantially a sine wave. The voltage generated in the pick-up head by this wave is impressed on the grid of an amplifying tube 156. The plate output of amplifier 156 is coupled to the grid of a first tube 157 which has its plate coupled through parallel capacitor 151 and resistor 153 to the grid of a second tube 159 so as to form a well known Schmidt triggering circuit. The cathodes of both of these latter tubes are connected to ground through a common resistor 160. The grid of first tube 157 is held at a relatively high positive potential by voltage divider 158 so that tube 157 is normally conducting. The resulting low plate voltage of first tube 157, impressed on the grid of tube 159, prevents this latter tube from normally conducting. On applying the output waveform from amplifier 156 onto the grid of first tube 157, the positive portion of this wave has no appreciable effect on the Schmidt circuit; however, the negative portion of this applied wave tends to cut off tube 157. The resulting increased plate voltage of first tube 157 is impressed on the grid of tube 159. In addition, the decreased current flow through common resistor 160 decreases the cathode potential of second tube 159. These two effects cause second tube 159 to suddenly start conducting, causing a rapid rise in its plate output voltage. In a similar manner, the conduction of second tube 159 is cut off suddenly when the input waveform to the grid of first tube 157 becomes positive. The periodic square wave thus obtained is coupled to a cathode follower circuit 161 which feeds low impedance square waves to the grid of a pair of triodes 162 connected in parallel. The common plate output of triodes 162 represents the clock output line 163 which is clamped between 100 v. and 130 v. by upper parallel clamping diodes 164 and lower parallel clamping diodes 165, respectively. The parallel units of this circuit enable a large current source to be provided for driving the clock propositions required in the logical nets.

The pick-up head and circuitry shown in Figure 9 for the Y channel, the R channel, and the $dz$ channel are identical so that only the Y channel circuitry will be described in detail.

The Y pick-up head 128, similar to the clock pick-up head 131, is in the form of a split core 166 wound with a coil 167. As the head 128 passes the substantially square magnetized pattern M on the Y channel 132, this pattern is differentiated so that positive pulses $y^+$ are generated on the leading edges of the magnetic pattern M, and negative pulses $y^-$ are generated on the trailing edges of the magnetic pattern M. These positive and negative pulses are conveyed on pickup line 137 to the grid of tube 169 which comprises amplifier 168. The amplified reversed polarity pulses are then coupled into a conventional cathode follower 170 composed of a tube 171 which feeds low impedance pulses of corresponding polarity from its cathode to a phase inverter and amplifier circuit 173. Circuit 173 is composed of first and second triodes 174 and 175, respectively, having their cathodes joined and returned to a −190 v. potential through a bias resistor 176. Triodes 174 and 175 are normally both conducting a small amount.

Anytime a positive pulse is impressed on the grid of the first triode 174, that tube is caused to conduct heavily. The resulting momentarily potential drop on the plate of the first triode causes a negative polarity pulse to be emitted on the first plate output line 177. Simultaneously with this increase in current flow through the first triode 174, the potential drop through resistor 176 is increased. This momentarily raises the potential of the cathode of the second triode 175, decreases the current flow therethrough and thus causes a positive pulse to be emitted on the second plate output line 178.

A negative input pulse to the phase inverter and amplifier circuit 173 has an opposite effect on the output lines. That is, it generates a negative pulse on the second plate output line 178 and a positive pulse on the first plate output line 177. It should be noted that it is the positive pulses on the plate output lines which correspond to the desired signals.

The pulses on these latter two output lines 177 and 178 are fed into a clipper circuit 180 made up of upper and lower triodes 181 and 182, respectively. The grids of these triodes are biased by resistor 183, returned to a 22.5 v. source, such that the negative pulses fed thereon are clipped but the positive pulses effectively cause the triodes to conduct. These desired signals thus appear as narrow negative square pulses on upper output line 184 and lower output line 185, respectively. These latter output lines are clamped by separate diodes, such as diodes 186 and 187 for upper output line 184, and diodes 188 and 189 for lower output line 185, to a 100 v. and a 130 v. source, respectively. Hence the swing of the voltage on these output lines is maintained between these limits. The upper output line 184 is coupled through a first differentiating circuit 190 to the left grid of a $Ym$ flip-flop. The lower output line 185 is coupled through a second differentiating circuit 192 to the right grid of the $Ym$ flip-flop.

Flip-flop $Ym$ is a standard bistable circuit having its opposite grids and plates intercoupled by a resistor and capacity in parallel. The circuit is further characterized by its ability to be triggered by negative pulses applied at either of its grids. Diodes 191 and 193 feeding the right and left grids of flip-flop $Ym$, respectively, essentially attenuate the positive portion of the differentiated input wave fed therein and permit only the negative portion to trigger the $Ym$ flip-flop circuit.

The output lines 194 and 195 from the $Ym$ flip-flop are taken from the right and left plates, respectively. In order to maintain the swing of the plate voltage between 100 and 130 volts, clamping diodes, as previously described, connect the right and left output lines 194 and 195, respectively, to the 100 v. and 130 v. source.

This completes the description of the Y channel pick-up circuit which transfers the magnetic pattern M on the magnetic wheel into a true or false proposition indicated by the state of the $Ym$ flip-flop. It should be noted that the potentials on the $Ym$ flip-flop follow exactly the magnetic pattern impressed on the wheel memory track.

The R and $dz$ channel pick-up circuits, as noted before, are identical to the Y channel pick-up circuit and so intermediate circuit elements are given the same numerical notation with subscript "$a$" for the R channel and subscript "$b$" for the $dz$ channel. The R and $dz$ channel circuits transfer the magnetic pattern on the respective channels of the wheel into a true or false proposition indicated by the state of the $Rm$ and $Zm$ flip-flops.

Before going into a description of the computer unit 136, the convention which will be employed for presenting the present invention will be explained.

Propositions are represented in the present invention by flip-flop. When a given proposition is "true," the flip-flop is in one of its states, when "false" in the other state.

In accordance with the present invention, it is desired to have both the truth of the proposition or its prime "true" of each flip-flop sensed as a relatively high voltage and the falsity sensed as low voltage. Hence, output lines are connected to each of the plates of the flip-flops. Likewise, it is desirable to be able to trigger a proposition flip-flop to either its true or false state by separate input lines; hence, an input line is connected to each of its grids.

The flip-flops used in the present invention are all of a basic design as described in detail for the $Ym$ flip-flop (Figure 9) with two outputs and two inputs.

A standard convention is employed throughout the present specification for designating the proposition flip-flops and their outputs and inputs.

Combinations of capital letters and numbers or lower case letters are used for designating the proposition flip-flops themselves. The outputs of the flip-flops are characterized by corresponding capital letters with an appropriate subscript. Since one of the outputs corresponds to the proposition being true and the other corresponds to the proposition being false, the latter is distinguished from the former by an affixed "prime."

On the other hand, the inputs to a flip-flop are designated by corresponding lower case letters with an appropriate subscript. The input for rendering a flip-flop false being further characterized by a sub zero preceding the lower case letter.

Thus it can be seen that conventional notation and circuit means have been provided whereby propositions can be represented and information stored as to whether a proposition be true or false. Furthermore, circuit means have been provided for enabling the propositions to be changed from one state to the other in accordance with which input line a negative potential is fed into the flip-flop.

The general logical method of circuit design utilized in the present invention will next be described. This method utilizes the correspondence between propositions and methods of symbolic logic, and the two valued nature of electrical quantities in impulse work.

In general, when a voltage has two possible values, high or low, it resembles a proposition of symbolic logic which has two possible values, true or false, or zero and one. The operations by logic such as logical addition, logical multiplication, and negation may be accomplished, as will be shown, by means of diode networks.

Logical representation of a proposition may be made using the symbol 1 for a true proposition or a high voltage, and 0 for a false proposition on a low voltage. For example, addition may be defined logically by the following table:

$$\left.\begin{array}{l}1+1=1\\1+0=1\\0+1=1\\0+0=0\end{array}\right\} \text{ or in terms of high and low voltages } \left\{\begin{array}{l}H+H=H\\H+L=H\\L+H=H\\L+L=L\end{array}\right.$$

and multiplication by the following table:

$$\left.\begin{array}{l}1\times1=1\\1\times0=0\\0\times1=0\\0\times0=0\end{array}\right\} \text{ or } \left\{\begin{array}{l}H\times H=H\\H\times L=L\\L\times H=L\\L\times L=L\end{array}\right.$$

Negation may be represented by a prime symbol and is defined as follows:

$$\begin{array}{ll}1'=0 & H'=L\\0'=1 & L'=H\end{array}$$

The above tables for symbolic addition and multiplication can be similarly extended to apply to three or more input propositions. For this case, in symbolic addition, a low voltage output is sensed when, and only when, all the inputs are low; and in symbolic multiplication a high voltage output is sensed when, and only when, all inputs are high.

The necessary basic electronic circuits used in the present invention to physically produce the symbolic addition and multiplication operations, above described, may be readily constructed as shown in Figures 10 and 11.

Referring first to the circuit in Figure 10, a means for obtaining the symbolic sum $(a+b)$ is shown. High or low positive voltage levels corresponding to these terms are fed into crystal diodes 197 and 108, respectively. The plates of these diodes are joined to a common line 199. This line 199 is returned to the lower voltage level through a resistor 196. The extension of common line 199 represents the output and the voltage thereon is relatively low, i.e., substantially at L only when both inputs $a$ and $b$ are both at low potential. When either or both of the inputs $a$ and $b$ are at high potential, output line 199 is relatively high due to the diode current flowing through the resistor 196. It is assumed that the forward resistance of the diode is much less and the back resistance much greater than the resistance of 196 or 204. It is this high potential on output line 199 which represents the logical sum. In the present invention the high and low potentials applied on the inputs $a$ and $b$ are the 130 v. and 100 v. output swing of the flip-flops. Thus means have been provided for combining two voltages each of which may be high or low in such a way as to form a third voltage which takes high or low values corresponding to the logical sum of the two as defined by the table. It is to be noted that additional terms can be added by feeding the voltage representing each of these other terms to the common line 199 through separate diodes.

In the circuit shown in Figure 11, the symbolic product $(c \times d)$ is formed by multiplication of the terms $c$ and $d$ fed on separate lines through crystal diodes 201 and 202. The plate ends of the diodes 201 and 202 are joined together at junction 200. Junction 200 is then connected through a load resistor 204 to the high potential source. The output line from junction 200 is at a relatively high potential only when both inputs $c$ and $d$ are of a relatively high potential. If either one of the inputs is at the low potential, the output line from junction 200 is relatively low in potential because of diode current flowing through load resistor 204. This output voltage thus has a voltage state which corresponds to the logical product of the two input voltage states $c$ and $d$ as previously defined. This circuit can be extended to multiply any number of terms by feeding all the voltages representing these terms through individual diodes connected in the same manner to junction 200. In order for the output line from junction 200 to have a relatively high potential thereon, all of these inputs must be high in potential.

Thus circuitry has been provided for producing symbolic addition and symbolic multiplication. Further, the prime or negation of any flip-flop voltage state is available to the circuitry as the voltage state of the opposite plate.

Two generalizations can now be made: (1) Any possible third state can be made up from two states by using the operations of priming, logical addition and multiplication. (2) Any proposition which is a logical function of any number of propositions can be expressed in the form of sums of products of the propositions and their primes.

Since the output voltage states of either the summing or product, diode circuits are of the same nature as their inputs (either high or low), they can be used as inputs for other circuits, hence general sums of products of propositions and their primes may be formed as desired, so that any logical function whatsoever can be obtained.

The basic designation used for the logical nets for the computer unit can now be generally described.

As will be seen, each of the input leads to a proposition flip-flop can be represented by a logical algebra equation. This equation is made up of flip-flop propositions (either true or false) which logically govern this input.

The equation for the inputs to the proposition flip-flops are thus a key to how the outputs of the flip-flops are interconnected to the inputs.

Taking, for example, the equation which represents the input to a given proposition flip-flop to make it "true," the various terms which represent the true or false states of the governing propositions or their primes are related either by logical multiplication or logical summation operations. By use of diode networks, made up by using the basic circuits shown in Figures 10 and 11, these equations are physically solved. The solution is represented by a relatively high or low voltage level on a single wire. It will be seen that the logic is applied to the steady states of the flip-flops and not to pulses. The significance of the clock pulse is that it serves at the end of each interval to simultaneously switch or set all flip-flops into their next state. To accomplish this, it dynamically transfers the high or low state of the solution of the logical equation governing the input into that input. The manner of this will be discussed in greater detail later.

This use of symbolic logic for designing circuits will next be presented by describing further the manner in which the information is fed into the computer unit.

As the memory wheel 116 rotates it passes under stationary pick-up heads 128, 129 and 130 associated with the Y channel, the R channel and the $dz$ channel, respectively, as shown and described in connection with Figures 4 and 7. These pulses picked off the memory wheel set up a state which may not be exactly coincident with the clock intervals which are used for synchronizing the operation of the machine. This lack of exact coincidence will be caused by errors in physically positioning the clock sine wave upon the memory wheel.

Thus, in the present instance, in order to synchronize or align each of the memory "units of information" with a clock interval, the outputs from each of the memory flip-flops, $Ym$, $Rm$ and $Zm$, previously described in Figure 9 are transferred by logical diode networks to associated flip-flops designated Y$l$, R$l$ and Z$l$, respectively. Since this transfer is accomplished by the clock pulse, it would cause Y$l$, R$l$ and Z$l$ to take the same states as Y$m$, R$m$ and Z$m$, respectively, except that the former propositions will be synchronized with the clock intervals. Y$l$, R$l$ and Z$l$ can thus be treated in the circuit as containing the memory output states and will be in every way comparable to the other propositional states found in the machine.

Referring first to Figure 12, a schematic illustration is shown there of the Y$m$ flip-flop, the Y$l$ flip-flop, and the Y$d$ flip-flop. The Y$m$ flip-flop is made to exactly follow the magnetic pattern M on the memory as previously shown in Figure 9. Each time the magnetic pattern M falls, a negative triggering pulse designated $M_y^-$ is impressed on the $_0y_m$ input of the Y$m$ flip-flop. As noted before, energization of this input line renders the Y$m$ flip-flop to be false, i.e., the left output lean Y$m'$ is made to have a relatively high potential thereon. A negative triggering pulse is impressed on the Y$m$ input by a rise in the magnetic pattern M. This rise generates a positive pulse designated $M_y^+$ which is fed after inversion into the input Y$_m$ to make flip-flop proposition Y$m$ true, i.e., the right output Y$_m$ is made to have a relatively high potential.

The magnetic pulse pattern M taken from the wheel is not synchronized, as yet, with the clock interval being established by the clock channel; the Y$l$ flip-flop brings this synchronization about. As shown in Figure 12, the Y$l$ flip-flop is partially schematically illustrated in that a detailed circuit diagram is shown only of the input circuitry to the flip-flop. A right and left gating circuit 203 and 204 are used for feeding differentiating circuits 205 and 206 connected to the $y_1$ and $_0y_1$ input grids of the Y$l$ flip-flop through attenuating diodes 207 and 208, respectively.

The left output potential of flip-flop Y$m$ is connected to one input of the left gating circuit 203; the right output potential of flip-flop Y$m$, on the other hand, is connected to one of the inputs of the right gating circuit 204. Clock pulse C is then fed into the second inputs of each of the gating circuits 203 and 204.

These gating circuits 203 and 204 are logical product circuits, as shown in Figure 11, and will not be described in detail here. In this instance when both input leads to a gate are relatively high in potential, the output of the gate is made relatively high. As seen by the waveforms on the Y$_m'$ and C lines feeding into the left gating circuit 203, the rise in potential Y$_m'$, is not necessarily coincident with the rise in potential of the clock pulse C. However, these two terms are high for a portion of the clock period. As long as the trailing edge of a clock pulse determines the leading edge of the output pulse from the gating circuit, the signals are properly related. This gate output pulse is differentiated by circuit 205. The positive leading pulse thus obtained is attenuated in the back resistance of diode 207 and the negative trailing pulse passes through diode 207 to trigger the Y$l$ flip-flop to a false state.

Thus, by having the "falling" edge of a clock state positioned approximately in the middle of a magnetic output state, the latter state can be brought into coincidence with the clock period.

Below the Y$m$ and Y$l$ flip-flops, the symbolic equations which define the propositions that govern their inputs are presented. As has already been explained, the Y$m$ flip-flop is connected to the Y channel pick-up heads so that it will follow the magnetic pattern on the Y channel of the wheel 116. This is symbolically shown by the input equations. For example, the condition required to make the Y$m$ flip-flop "false" is a negative going change in the magnetic pattern. This is shown by the equation for the left input, $_0y_m = M_y^-$. Similarly to make the Y$m$ flip-flop "true" a positive going change is required in the magnetic pattern. Thus $y_m = M_y^+$ symbolically defines this condition. Referring next to the equations of the inputs to the Y$l$ flip-flop, the input equation required to make the Y$l$ flip-flop "false" is defined by the symbolic product $_0y_1 = Y'_mC$. This equation, as previously indicated, is interpreted as meaning when Y$_m'$ is of a high potential, during the first half of a clock interval, the Y$l$ flip-flop is made "false." The input equation required to make the Y$l$ flip-flop "true" is defined as $y_1 = Y_mC$, and its explanation follows from the above.

It must be remembered that the clocking potential is in reality a square wave, that the clock proposition C takes values of both 1 and 0 in a clock interval, and that a change in the gate proposition from high to low as the clock changes from 1 to 0 produces the negative pulse which effects the particular flip-flop.

As previously explained, the potential outputs taken from the plates of the proposition flip-flops are used for driving diode logical nets employed for solving logical equations which define the inputs to the proposition flip-flops. Since the Y$l$ flip-flop is required to drive so many logical nets, a YD flip-flop is provided in Figure 12. The grids of the Y$l$ and YD flip-flops are tied together; thus providing additional sources Y$_D'$ and Y$_D$ for driving the logical nets.

Figure 13 schematically shows the R$m$ flip-flop and the R$l$ flip-flop which is similarly employed for bringing the R channel magnetic pattern in coincidence with the clock pulse time. It should be noted that the gating devices to the inputs $_0r_1$ and $r_1$ of the R$l$ flip-flop are denoted by blocks 209 and 210, respectively. Further, the differentiating circuit and the attenuating diodes in the input circuits are omitted. This simplified gating device, together with a clock channel 211, with parallel connections to the gates, will be used throughout the remaining drawings for simplification of presentation. All flip-flops throughout the machine begin switching at the same time (except Y$m$, R$m$ and Z$m$); i.e., when C goes from 1 to 0. Each flip-flop may require a different amount of time to come to equilibrium after switching, since its load and characteristics are, in general, different from those of every other flip-flop. All flip-flops, however, must be capable of reaching equilibrium during the half interval in which $C=0$. This means that all new input propositions will have been formed among the diodes, but that the gate proportions will still have a value of 0, since the clock state is holding them down; i.e., all input propositions are multiplied by C and $C=0$. At the beginning of the next interval, C becomes 1 and those input propositions which have a 1 or high value without consideration of C now cause the input states to rise to 1. The positive pulse formed as a result of this action does not affect the associated grid because of the alternation diode (207, Figure 12, for example). As a consequence, no flip-flop can be altered during the half interval period in which $C=1$ but all input propositions must rise to equilibrium. The process then repeats itself.

It may be observed that a new and fundamental concept of electronic switching is here clearly embodied; i.e., all switching is done in two distinct steps. Each basic switching or clocking interval is divided into two parts by the clock square wave. In step (a), logical propositions are transferred from all diode junction points into all corresponding flip-flops, and at the same time all input propositions are blocked from changing; i.e., from introducing transient effect, by the simple expedient of making them all 0. In step (b), conversely, all diode input propositions are released to allow them to settle at their new values, and at the same time any action of the flip-flops is prevented. (All changes of the input propositions must be from zero to one, and the flip-flops are specifically made insensitive to the positive pulses which this action would tend to produce at their grids.)

It is evident that this embodiment is not in any wise a pulse machine, although pulses exist in the memory read-out circuits in the clock gates. The pulse, however, acts only as an agent for conveying information concerning steady states and thereby effecting flip-flops to produce changes in their states.

Logically this role of pulse as agent can be shown without loss of generality by the scheme of Figure 13 in which the gates 209 and 210 are set open or closed by the logical propositions and the clock "pulse" then passes through or not as the case may be to effect the flip-flop.

Below each of the R$m$ and R$l$ flip-flops the logical equations, representing the logical nets to their inputs, are presented. The understanding of these equations follow from the explanation associated with Figure 12 and will not be further discussed.

The proposition flip-flops in the $dz$ channel as shown in Figure 14 will next be discussed. The Z$m$ flip-flop is made to follow the magnetic pattern on the wheel. The Z$l$ flip-flop serves to bring this pattern into coincidence with the clock pulse; and Z$a$ and Z$b$ flip-flops represent additional delays obtained by the delay unit 152 shown in Figure 7.

The time-wise relationship of the Z channel flip-flops can best be explained by Figure 15 which shows the waveforms at various points in the Z channel. Line I shows the magnetic pattern M appearing in the $P_{47}$ position of the $dz$ channel. Line II is a pattern of the signals generated in the Z pick-up head 130. It is noted that the Z pick-up head differentiates the leading and trailing edges of the magnetic pattern M to form $z^+$ and $z^-$ pulses. The III line shows the time-wise location of the clock interval generated from the clock pick-up head 131. It is noted that the clock operation time interval $P_{47}$ is not coincident with the $P_{47}$ position of the magnetic pattern, being shifted slightly later in time. The Z$m$ flip-flop as shown by line IV, is triggered so as to follow the magnetic pattern M. It is thus seen by comparing lines III and IV that the trailing edge of the $P_{46}$ clock pulse (i.e. the beginning of the $P_{47}$ time interval) occurs at approximately the middle of the square wave representing the $P_{47}$ position of the Z$m$ flip-flop proposition. The common high potential of the Z$m$ flip-flop and the clock channel determines the width of the pulse which is fed, for example, through gate 244 (Figure 14) into the Z$l$ flip-flop. This pulse is then differentiated and the positive portion thereof attenuated by the input circuitry, such as diode 208, shown for example in Figure 12. These latter differentiated waveforms are shown by line V of Figure 15. It is thus seen that it is always the trailing edge of a clock state (i.e., a change from high to low or one to zero) which triggers a flip-flop. Thus the $P_{47}$ position of the Z$l$ flip-flop is shown now by line VI to be in coincidence with the $P_{47}$ clock interval. The Z$a$ and Z$b$ flip-flops are shown by respective lines VII and VIII to be triggered into a true state, in coincidence with the falling edges of the $P_{47}$ and $P_{48}$ clock states, respectively.

The connections of the inputs to the $dz$ channel flip-flops to cause them to be triggered in order, as above described, are represented by the logical equations appearing in Figure 14 below their respective flip-flops. The interpretation attached to these equations is evident from the description of the flip-flop circuits in Figures 12 and 14 and will not be further discussed.

It should be noted that the Z$l$, Z$a$ and Z$b$ flip-flops correspond to the delay 152 shown in Figure 7 in the $dz$ precession line. These latter flip-flops in effect give the $dz$ line a variable length. When outputs are taken from the $dz$ line, the $dz$ line is 47 clock intervals long. Since an integrator set-up is 48 pulses long, this causes positive precession of the $dz$ intervals. This output is used during the filling operation of the computer. When the outputs are taken from the Z$a$ flip-flop, the $dz$ line is 48 clock intervals long and no precession is evident in the $dz$ line, i.e., corresponding pulse positions remain the same in the $dz$ line and in all the integrator set-ups. Thus, the output from the Z$a$ flip-flop is used when the machine idles. When the outputs are taken from the Z$b$ flip-flop, the $dz$ states precess in a negative manner for each successive integrator set-up. It is this latter condition, negative precession, which is active when the computer is computing.

Referring to Figure 16, a functional diagram of the computer unit 136 will next be shown and described. This illustration explains broadly the particular "system of thought" by which the computer unit 136 of the present invention performs integration or effects the differential combination of numerical values.

The operation of the machine is actually carried on in a parallel manner in that during each operation time (clock interval time) the following occurs:

(a) Information from a given pulse position of the R, Y and Z channels is fed into the computer unit from the wheel. This action is initiated by C going from 1 to 0 and finishes while $C=0$.

(b) This input information along with the existing states of the computer flip-flops determines the information to be recorded in the corresponding pulse position of the R, Y and $dz$ channels of the wheel. The diode nets generate this information during the interval when $C=1$.

(c) The flip-flops, interconnected by logical nets, are caused to change their states in accordance with the inputs and the previous states of the flip-flops. This begins as C goes from 1 to 0, an action which also brings new information out of the memory as in (a).

In general there are two main loops shown in Figure 16 by which the information from the magnetic wheel is processed.

One of these loops is employed for obtaining the new $y$ number, i.e., it combines the $dy$ inputs, as obtained from the $dz$ precession line, to the old $y$ number taken from a previous integrator set-up recorded on the magnetic wheel. This new $y$ number is then recorded back onto the new integrator set-up on the wheel.

The other loop is used for performing digital integration in accordance with the method shown in Figure 2, i.e., adding the old $y$ number to the old $r$ number, in accordance with a $dx$ input. This information is all obtained from the wheel. The $dx$ input being obtained from the $dz$ precession line. As a result of the computation in the second loop, a new $r$ number is derived and a $dz$ output is obtained. The new $r$ number is deposited into the R channel and the $dz$ output is deposited onto the $dz$ channel of the wheel. These two main loops will now be discussed in greater detail.

The first main loop comprises feeding states from the Y channel of the magnetic wheel 116 by pickup line 137 into a first set of parallel gates 212 and 213. One of these gates 212 is open from interval $P_1$ through $P_{22}$, while the other gate 213 is open from $P_{24}$ through $P_{47}$. During the time gate 212 is open, anywhere from one to seven $dy$ code marks are picked up from the magnetic wheel by line 137 and fed into the Y channel decoder 214. Simultaneously, $dz$ units are picked up from the magnetic wheel by line 145 and fed into the Y channel decoder 214. A coincidence of a $dy$ code mark with a $dz$ "one" in decoder 214 causes a positive $dy$ one to be fed into the $\Sigma dy$ counter 215. This input increases the content of the $\Sigma dy$ counter one unit. Any time a $dy$ code mark is fed into the Y channel decoder 214 without a coincident $dz$ one; i.e., with a zero, a negative $dy$ one is fed into the $\Sigma dy$ counter 215, thus decreasing or rendering more negative its content by one unit. This action continues during the interval $P_1$ through $P_{22}$. In addition to feeding the $dy$ code marks into the Y channel decoder 214, these marks, since they are used without change throughout a computation, are fed by path 216 to first mixer 216a which records them back onto the Y channel of the memory wheel 116.

Starting with the $P_{24}$ interval, or any later clock time, dependent on the occurrence of the start mark in the Y channel, a pulse is fed through parallel gate 213. This first pulse cannot pass through a Y channel gate 217 in the line, but is rather used to trigger a start flip-flop $Sl$. The potential on the right output of start flip-flop $Sl$ then is used for opening Y channel gate 217, thus permitting the remaining states in the Y channel, representing the old $y$ number, to be fed on path 218 directly through Y channel gate 217 to a $Y+\Sigma dy$ adder 219.

Simultaneously with opening gate 217 in the $y$ number line, the right output potential of the start flip-flop $Sl$ is used for opening a stepping gate 220 which permits clock pulses $P_{24}$ through $P_{47}$ to pass therethrough into a stepping circuit 221.

Circuit 221 functions to step serially out the digits of the $\Sigma dy$ counter 215, stage by stage, so that they can be combiend with the $y$ number digits in the $Y+\Sigma dy$ adder 219. This process is carried on in fundamentally the same manner in which a human adder sums corresponding digits of two numbers. A carry state, as a result of each binary addition, is obtained by a delay unit $Dl$ associated with the $Y+\Sigma dy$ adder 219. This delay unit $Dl$ delays the carry state one clock time, and then feeds it into the $Y+\Sigma dy$ adder 219 along with the two next digits to be summed. As a result of each step of this addition, a digit is transferred back onto the wheel 116 by record line 140 feeding through first mixer 216a. Thus, the new $y$ number has been obtained as a result of adding the predetermined $dy$ inputs to the existing $y$ number in the memory. This completes the description of the first main loop comprising the computer unit 136.

The other main loop referred to performs the digital integration process and thus generates the $dy$ outputs of the integrating computations, and also provides the new $r$ number derived as a result of the integrating step.

Referring again to Figure 16, the R channel output digits and marks are fed from pickup line 138 through a second set of parallel gates 223 and 224. Gate 223 is opened during interval $P_1$ through $P_{22}$ and permits the one $dx$ code mark in the R channel to be fed at some time during this interval into the R channel decoder 225. In addition to feeding the $dz$ digits from the $dz$ channel via pickup line 145 into the Y channel decoder 214, a parallel connection feeds these pulses to the R channel decoder 225. Here, coincidence between a $dx$ code mark and a $dz$ "one" causes a positive $dx$ one to be fed into the $dx$ register 227. A $dx$ code mark matched with a zero in the coincident position of the $dz$ line causes a zero to be fed into the $dx$ register 227.

It should be noted that since the $dx$ code mark is to be used throughout a computation, in addition to being fed into the R channel decoder 225, it is fed by line 226 to a second mixer 226a by which it is re-recorded onto the R channel of the wheel 116.

Returning again to the output of Y channel gate 217, the $y$ digits or marks therefrom have three parallel "paths" available to them. The first "path" 218 is the one already described which "feeds" digits into the $Y+\Sigma dy$ adder 219. The second "path" 228 "feeds" the $y$ digits "through" a positive gate 230 and a mixer 232 to the $(R+Y)$ adder 233. The third path 238 feeds the $y$ digits through a reversing circuit 234 which reverses or primes the states represented by each digit, "passes" the output through a negative gate 236, and then finally "through" mixer 232 into the $R+Y$ adder 233.

"Positive" and "negative" gates 230 and 236, respectively, are controlled by the positive and negative states of the $dx$ register 227. Thus only one of these gates is open at a given time.

It is now made evident that during the $P_1$ through $P_{22}$ clock times, the R and $dz$ channel together supply a $dx$ state which is registered as to sign in the $dx$ register 227.

Then, during the period $P_{24}$ through $P_{47}$, the old $y$ number is fed from the Y channel gate 217, either through "positive" gate 230 as a normal number, or through "negative" gate 236 as a one's complement. In either case, the result is fed through mixer 232 into the $R+Y$ adder 233 to effect the summation of the differential combination, e.g. $ydx$.

Simultaneously with feeding the $y$ number from mixer 232 into the $R+Y$ adder 233, the gate 224 in the R channel opens and permits the $r$ number from the magnetic wheel to be fed stage by stage into the $R+Y$ adder 233. Thus, corresponding stages of the $y$ and $r$ numbers are added. As in the $Y+\Sigma dy$ adder 219, a carry state, as a result of the binary arithmetic, is obtained in the $R+Y$ adder 233 by feeding a carry state "through" a carry mixer 237 into a delay unit $D2$ which delays or stores the "carry," one clock time, and then feeds it into the $R+Y$ adder 233 with the two digits of the succeeding stages to be summed.

It should be noted that the circuitry of the second main loop provides for reversing the sign of the $y$ number when the $dx$ input is negative. In the present scheme, which will be more clearly explained in the ensuing discussion, changing the sign of a $y$ number is accomplished by reversing the zeros and ones in the $y$ word and adding a one. The reversal of the zeros and ones is accomplished by the reversing circuit 234. In order to obtain the additional positive one, which must be added to the least significant stage of the reversed $y$ word, to obtain the true complement, the $dx^-$ line from the $dx$ register 227 is fed into the carry mixer 237 feeding delay $D2$. A gate 239 is provided in this $dx^-$ line. Gate 239 is opened during the $P_{24}$ time period, thus permitting the $D2$ delay to have an initial "one" therein when $dx$ is negative. This initial one is thus made available at the beginning of the adding operation in the $(R+Y)$ adder 233 as an initial "carry-in."

The outputs from $(R+Y)$ adder 233 contains both the new $r$ number, obtained during the $P_{24/47}$ interval and the $dz$ output obtained at the $P_{48}$ clock time as a result of the integration. The new $r$ number is recorded onto the R channel of the magnetic wheel 116 on record line 139. This line 139 has a gate 238a therein which is open only during the $P_{25/47}$ clock times. The $dz$ output pulse is recorded onto the $dz$ channel of the wheel at pulse time $P_{48}$ by connection 146. A gate 243 in this latter line is open only during the $P_{48}$ clock interval.

It should be noted that the pickup line 138 which feeds in the R channel information has an additional by-pass line 245 connected through a by-pass gate 248 to the mixer 226a feeding the R channel of the memory. This by-pass gate 248 is open during the $P_{48}$ clock interval, thus enabling the information in the R channel to be recirculated without change. This information, either a one or a zero, is set into the computer as a part of the initial conditions prior to computation. Its function, as utilized in the $R+Y$ adder 233, is to pass the $dz$ output states as they are, or to reverse or prime them. Thus, as will be more clear in the ensuing discussion, a high $dz$ output represents a "plus" one, and a low $dz$ output represents a "minus" one in the scheme of the present invention. This method is generally referred to as the "plus one-minus one" system and will be described in detail in the ensuing description. It will also be made clear that a "one" in the $P_{48}$ position of $r$ causes a reversal of sign to take place at the output.

The information in the $dz$ channel of the wheel represents the $dz$ output values from previous integrator computations. Hence, the information in the $dz$ channel, in addition to being fed into R and Y channel decoders, must be recirculated by line 265, having a recirculating gate 266 therein, back onto the $dz$ channel of the wheel via a third mixer 265a. This recirculating gate 266 is open to re-record $dz$ digits during clock intervals $P_1$ through $P_{47}$, while at the $P_{48}$ time the new $dz$ output value is recorded on the $dz$ channel via gate 243 feeding third mixer 265$a$.

This completes the general description of the second main loop of the computer unit 136.

Referring again to Figure 16, in order to be able to define the clock time intervals $P_1$ throught $P_{48}$, which range defines one integrator set-up length, a P counter 240 is actuated by clock pulses generated in the clock channel of the wheel 116. The carry from the P counter 240 actuates the I counter 241. Every complete cycling of the P counter thus defines a new integrator interval $I_1$. In order to define a unit memory position for a particular integrator set-up on the wheel: the channel (R or Y); the interval position $P_n$ in the channel; and the integrator $l_1$ must be defined. The P and I counters 240 and 241, respectively, enable these unit positions to be made available as needed.

Referring to Figure 17, the P counter will next be described in detail. It is noted that the P counter is comprised of flip-flops F1 to F6, inclusive. The various combinations of bistable states of these flip-flops are used for defining 48 different consecutive patterns, thus enabling the P counter to count clock pulses (intervals) from $P_1$ through $P_{48}$ repeatedly. For each of the flip-flops, when the right plate is of a relatively high potential, the flip-flop is defined to indicate a "1," hence when the left plate is of a relatively high potential the flip-flop will indicate a "0." The 48 different patterns that the flip-flops assume can be obtained by referring to Figure 18, which, excluding the last column of digits on the right, is actually a table showing two cycles of binary numbers counting from the equivalent decimal number 8 through 31. By arbitrarily making the first binary number (decimal 8) equivalent to $P_1$, the counter counts intervals from $P_1$ through $P_{24}$ in the first cycle and from $P_{25}$ through $P_{48}$ in the second cycle. The flip-flop F6 is used for distinguishing the second cycle from the first. A "0" state of the flip-flop F6 indicates the first cycle counting and a "1" state of the flip-flop F6 indicates the second cycle counting.

The manner of interconnecting the flip-flops F1 through F6 to obtain this counting of clock pulses can now be explained in detail by reference to both Figures 17 and 18.

All of the flip-flops F1 through F6 have clock pulses C simultaneously fed into all of their inputs through right and left gating devices, such as 246 and 247 shown for flip-flop F1. These gating devices, as described, are such that they pass a pulse to an input of a flip-flop when and only when all lines feeding into the gating device are of a relatively high potential. As the consecutive clock pulses are fed into the P counter from the left, the flip-flops change their states, in order, in accordance with the table in Figure 18. This is generally accomplished by interconnecting the outputs of the flip-flops to the inputs according to a scheme best recognized by Figure 17. Here it is noted that the first flip-flop F1 changes from one of its states to the other state every time a clock pulse C appears, hence the right gating device 246, which feeds into the $f_1$ input of the flip-flop F1, is connected so as to be impressed by the potential of the left output $F_1'$; and the left gating device 247, which feeds into the $_0f_1$ input, is connected so as to be impressed by the potential of the right output $F_1$. For ease of illustration, these connections for flip-flop F1 are represented in Figure 17 by dashed diagonal lines 249 and 250, respectively.

Thus it is seen that each clock pulse C can only pass into that input of the flip-flop F1 which will change its state. (It will be remembered, of course, that in the actual circuitry, the two step switching is implied here as well as elsewhere.)

Referring to Figure 18, it is noted that in order to have each successive clock pulse C trigger the flip-flops to indicate the desired count, all of the flip-flops, after the first, change to a "1" state when and only when all the previous flip-flops are in a "1" state. That is to say, the condition required for enabling a flip-flop to change to a "1" state on the next clock pulse C is for all the previous flip-flops to be indicating a "1."

Likewise the condition required for enabling a flip-flop to change to a "0" state on the next clock pulse C is for all the previous flip-flops, plus the flip-flop in question, to be in a "1" state. Using these two conditions, it is possible to set up symbolic logic equations for each of the flip-flops which define the conditions needed to change a particular flip-flop to its opposite state.

For flip-flop F1, whose connections have already been described, the input equation for enabling flip-flop F1 to indicate a "1," i.e., to be made true on the next clock pulse C is defined by $f_1 = F_1'C$. The input equation for enabling the flip-flop F1 to indicate a "0," i.e., be made false on the next clock pulse C, is defined by $_0f_1 = F_1C$.

For the flip-flop F2, using the scheme above devised, the input equation $f_2 = F_1 F_2' C$, i.e., the $f_2$ input "looks" to both its own flip-flop state and the state of flip-flop F1. This is schematically illustrated in Figure 17 by dashed diagonal lines 251 and 252 connecting the $F_2'$ output and the $F_1$ output, respectively, to the right input gating device of flip-flop F2. Thus when flip-flop F2 is in a false state and flip-flop F1 is in a true state, the next clock pulse C is passed to make flip-flop F2 true. Using a similar line of reasoning, the input equation $_0f_2$ equals $F_1 F_2 C$. This is illustrated in Figure 17 by dashed diagonal lines 253 and 254, connecting output $F_2$ and output $F_1$, respectively, to the left input gating device of flip-flop F2.

The input equations $_0f_3$, $f_3$, $_0f_4$, $f_4$, etc., for all the other flip-flops can be easily obtained, as shown in Figure 17 by the extension of the above theory. There is one exception. It is noted that in order to make F4 false, the condition that its own plus all the previous flip-flops be in a "1" state is valid for changing the indication of the counter to count $P_9$ and $P_{33}$. However, when changing the indication of the counter from $P_{48}$ to $P_1$, the F4 flip-flop plus all the previous flip-flops are in a "1" state but it is desired, in this case, to maintain the F4 flip-flop in a "1" state. This discrepancy is overcome by adding the state of the F5 flip-flop into the $_0f_4$ equation. This F5 flip-flop is always in a "0" state ($F_5'$) when it is desired to change the flip-flop F4 to a "0" state, hence $_0f_4 = F_1 F_2 F_3 F_4 F_5' C$.

The logical net for the P counter, designed in accordance with the input equations above described, will next be explained.

In Figure 19, the input equation $_0f_1 = F_1 C$ is physically set-up by a diode network having terms $F_1$ and C fed therein on separate diode input lines. $F_1$ is obtained from the right output of flip-flop F1, and C is obtained from the clock channel on the wheel. This circuit corresponds to a logical product net as described in connection with Figure 11. The high potential output on $_0f_1$ corresponds to a logical product of the two input voltages as previously defined.

In Figure 20, the input of $_0f_2$ of flip-flop F2 is shown to be similarly formed by terms $F_1$, $F_2$ and C feeding in on separate lines to a three diode input logical product net.

Similarly $_0f_3$ is shown in Figure 21 to be formed by a similar gating circuit having four separate crystal diode inputs, $F_1$, $F_2$, $F_3$ and C.

Referring next to Figure 22, a family tree type of diode network is shown which, in effect, performs the multiplication of terms in equations $_0f_1$, $_0f_2$, $_0f_3$, in a simplified manner in a single circuit.

Here it is readily apparent that instead of having the C term, for example, fed into each gating circuit on a separate line, the C term is fed in only at the bottom of the circuit in Figure 22. Thus the result of each logical multiplication, which represents the solution to one of the simple equations, is made available to be combined with other terms to make up the more complex equations. Thus the high potential output of first junction 256 in Figure 22 is equal to $_0f_1$. This latter output, when combined with a single new input $F_2$, is then fed into another two input multiplier to form the new output $_0f_2$. Similarly this latter output $_0f_2$ and new term $F_3$ combine to produce $_0f_3$.

In Figure 23, the family tree of the entire diode network required to interconnect the flip-flops F1 through F6 to count the pulses $P_1$ through $P_{48}$ is shown. This family tree is constructed in accordance with the principles outlined together with Figures 17 to 22. Since the input $f_1$ is composed of terms C and $F_1'$, which do not appear in any of the other equations, it is located at the bottom of the tree and set up as a separate network.

It is noted that in this family tree each of the solution lines, such as $_0f_1$, $f_1$, $_0f_2$, etc., has a resistor such as resistor 255, associated therewith. Anytime all of the terms which make up the input equation to one of the flip-flops are of a high polarity, the diode current flowing from the positive source through the associated resistor, such as 255, is terminated thus bringing the solution line to the potential of the positive source called high or B+. This high potential, which is always only of a short duration due to the nature of the clock pulse C, represents a value 1 resulting from a solution of the equation.

In addition to indexing the consecutive positions $P_1$ through $P_{48}$ of each integrator, the P counter is used for generating five "time propositions" that are needed in the computer unit. Referring to Figure 18, the logical equations defining these propositions are shown. Two of these time propositions represent ranges of clock times and three of them represent unit intervals.

As has been pointed out, the integration time interval $P_{1/22}$ is useful in defining the period during which the $dx$ or $dy$ inputs can be picked up or decoded. This time proposition is determined by reference to the table in Figure 18. It is noted that the pulse time range $P_1$ through $P_{24}$ is uniquely characterized by a zero state of the F6 flip-flop. In order to eliminate the $P_{23}$ and $P_{24}$ pulse times, it is noted these latter pulse times have ones in the F2 through F6 stages, whereas all the desired pulse times $P_1$ through $P_{22}$ have a zero in at least one of these stages. Hence, the $P_{1/22}$ proposition is defined by the equation $$P_{1/22}=F_6'(F_2'+F_3'+F_4'+F_5')$$

As will be noted later, it proves to be advantageous to first generate the inverse proposition $P'_{1/22}$ and feed it into a driver circuit to obtain the desired $P_{1/22}$ time proposition. By means of the principles of logical algebra, it can be shown that $P'_{1/22}=F_6+F_2F_3F_4F_5$.

The second range of integrator clock times period desired is $P_{24/48}$, which, as previously explained, defines the number range of an integrator. This time proposition is characterized mainly by the term $F_6$ which sufficiently defines the period $P_{25/48}$. In order to include the $P_{24}$ pulse time, an additional term $(F_1F_2F_3F_4F_5)$ is required. It is noted that $P_{24}$ is the only time term, during the time when flip-flop F6 is false, that is distinguished by having all ones in the remaining flip-flops F1 through F5. Hence, the equation $P_{24/48}=F_6+F_1F_2F_3F_4F_5$.

The unit time propositions which are required for the computer unit are $P_{24}$, $P_{47}$ and $P_{48}$. The equations defining these pulse times are obtained by defining the logical product of the F flip-flop terms obtained by inspection of the table of Figure 18.

Thus:
$$P_{24}=F_1F_2F_3F_4F_5F_6'$$
$$P_{47}=F_1'F_2F_3F_4F_5F_6$$
$$P_{48}=F_1F_2F_3F_4F_5F_6$$

As with the $P_{1/22}$ time proposition, the terms $P_{24}$ and $P_{48}$ are used so often in the computer that they require a driver circuit. Hence, the inverses of these propositions $P_{24}'$ and $P_{48}'$ are first generated by logical nets and the outputs of the driver circuits, inverting their inputs, thus supply the desired propositions.

By use of Boolean algebra, these inverse propositions are:

$$P_{24}'=F_1'+F_2'+F_3'+F_4'+F_5'+F_6$$
$$P_{48}'=F_1'+F_2'+F_3'+F_4'+F_5'+F_6'$$

The integrator counter I will next be described. It is desired that this counter have a capacity of 22 since there are 22 integrators in series on the memory track. Five flip-flop stages, designated as K1, K2, K3, K4 and K5 in Figure 24, are provided for this counter. Since a binary counter having five stages has an overflow capacity of 32, the present counter, similar to the P counter, has an initial number, in this case a binary indication of the decimal number 10, set therein. This initial number is arbitrarily assigned the time interval $I_1$. The I counter flip-flops then switch in a normal manner to produce a binary count of incoming carries out of the P counter. The count continues through $I_{22}$ at which time this counter resets again to the initial binary number.

The I counter is supplied by overflow status, $P_{48}$, from the P counter. Hence, the P counter counts through 22 cycles before the I counter receives enough inputs to count through its cycle. It should be noted that the I counter remains at a particular count for a time interval corresponding to the length of an integrator. In all cases, the length of an integrator is 48 clock intervals.

As with the P counter, the scheme used for determining the equations of the inputs to the flip-flops K1 through K5 is revealed by the table of the binary indications of the flip-flops as shown in Figure 25. As before the K1 flip-flop reverses its state each time a $P_{48}C$ term is received from the P counter. This is accomplished by impressing the right and left gating devices of the flip-flop K1 by potentials from the opposite plates as indicated, for example, by diagonal lines 258 and 259, respectively. Thus the equation $k_1=K_1'P_{48}C$ is obtained for the right input which renders the flip-flop to indicate a "1" or a true state; and the equation $_0k_1=K_1'P_{48}C$ is obtained for the left input which renders the flip-flop to indicate a "0" or a false state.

On examining the conditions needed for making the particular flip-flop K2 false, as shown in Figure 24, it is noted that by "looking" at its own state and the state of the previous flip-flop K1 one ambiguity arises, this occurs when the counter goes from $I_{22}$ to $I_1$. At this instant, although K1 and K2 are true, K2 must remain true in order to reset to K1. Thus an additional term must be supplied to the input $_0k_2$. It is noted that either the K3, K4 or K5 flip-flops are false whenever K2 must go false. Thus $_0k_2$ is seen to be made up of three terms:

$$_0k_2=K_1K_2K_3'P_{48}C+K_1K_2K_4'P_{48}C+K_1K_2K_5'P_{48}C$$
$$=K_1K_2(K_3'+K_4'+K_5')P_{48}C$$

The plus (+) symbol in symbolic logic signifies an "inclusive or" operation; hence, if any one of the three flip-flops K3, K4 or K5 is false at the same time that K1 and K2 are true, the K2 flip-flop can be made false.

This same problem of suppressing the change of the flip-flop in order to return to the initial number in the counter is met by equation $_0k_4$, wherein the false state of flip-flop K5 is introduced to permit flip-flop K4 to be made false when going from $I_6$ to $I_7$, but preventing flip-flop K4 from going false when going from $I_{22}$ to $I_1$.

Figure 26 shows the diode network used for interconnecting the flip-flops of the integrator I counter. The family tree type of network is shown there to have three levels of diodes for physically setting up the symbolic equations of the inputs to the K flip-flop shown at the bottom of Figure 24. As before, all of the equations, except $k_1=K_1'P_{48}C$, have some of their terms supplied as the solutions of previous lower order equations.

The $_0k_2$ equation, as seen in Figure 24, is made up by symbolically adding three complex terms representing symbolic products. Referring back to Figure 10, the basic diode net used for performing symbolic addition is shown.

Similarly, the portion of the logical net employed in Figure 26 for adding the terms of the $_0k_2$ equation is shown in the block 260. Here the terms $K_3'$, $K_4'$, $K_5'$ are fed through individual diodes to a common junction 261 returned to ground through a resistor 262. Any time at least one of the input terms is of a relatively high potential, the voltage of junction 261 rises due to diode current flowing through resistor 262. This high voltage is then fed into one of the inputs of a logical product net defined by second block 263. The other input to the net 263 connects to line 264 which carries the high voltage corresponding to the logical product of the common terms, $K_1$, $K_2$, $P_{48}$ and C, appearing in each of the three terms of the $_0k_2$ equation. The rest of the logical net for the I counter is essentially a family tree made up of logical product nets and will not be further described.

Referring next to Figure 27, a matrix circuit is shown of how the outputs of the integrator flip-flops K1 through K5 can be interconnected such that a signal can be obtained on separate lines indicative of each of the integrator interval times $I_1$ through $I_{22}$. Referring to the table in Figure 25, the pattern of the states of the flip-flop stages for each integrator interval is used for setting up the matrices in Figure 27. For example, integrator $I_1$ interval is identified by a "0" or false state in stage K1, K3 and K5, and a "1" or true state in stages K2 and K4. Each of the other integrators $I_2$, $I_3$, etc., intervals are identified by the pattern of the flip-flop states in a like manner.

In order to obtain the simplest circuitry for sensing the unique conditions of the K flip-flops which define each of the integrator interval times, the outputs from the integrators are divided into two groups. The right and left outputs from flip-flops K1 and K2 make up a first group, and the right and left outputs from the remaining flip-flops K3, K4 and K5 comprise a second group. The matrix circuit is made up of three matrices, a first and second input matrix 268 and 269 for recieiving the outputs from the first and second group of flip-flops, respectively, and an output matrix 270. The first group of flip-flop outputs, $K_1'$, $K_1$, $K_2'$, $K_2$, feed into the vertical lines 271 of the first input matrix 268, and the second group of flip-flop outputs, $K_3'$, $K_3$, $K_4'$, $K_4$, $K_5'$, $K_5$, feed into the horizontal lines 272 of the second input matrix 269. The horizontal lines 273 of the first input matrix 268 are then extended to cross the extended vertical lines 274 of the second input matrix 269.

Referring to the table of Figure 25, it is noted that there are four sets of combinations of the states of the flip-flops K1 and K2 taken together, $K_1'K_2'$, $K_1K_2'$, $K_1'K_2$, $K_1K_2$. Hence, these four combinations are obtained in the first matrix 268 by connecting the respective inputs of each set to one of the four horizontal lines 273 of the first input matrix 268 through individual diodes, such as diode 275. Similarly, it is noted that there are six combinations of the states of the flip-flops K3, K4 and K5 taken together, namely, $K_5'K_4'K_3'$, $K_5'K_4'K_3$, $K_5K_4'K_3'$, $K_5K_4'K_3$, $K_5K_4K_3'$, and $K_5K_4K_3$. Each of these combinations of inputs is connected to one of the vertical lines 274 of the second input matrix 269 by individual diodes, such as diode 276.

At the junction of the extended vertical lines 274 and the extended horizontal lines 273, a two input logical product circuit such as circuit 279 is provided.

Each product circuit, such as 279, is made up of two diodes, such as diodes 280 and 281, whose plate ends are joined and connected through a resistor, such as resistor 283, to a high potential source B. Each of the other ends of the diodes, such as diodes 280 and 281, is then connected to the extended vertical and horizontal lines 274 and 273 which make up the junction. Taking matrix junction 285, for example, its horizontal line is connected to input $K_1'$ and $K_2$ through separate diodes, such as diode 275, and its vertical line is connected to input $K_3'$, $K_4$ and $K_5'$ through separate diodes, such as diode 276. Thus, when all these inputs are simultaneously of a high potential, a high potential is evident on the output $I_1$. The duration of this high potential is 48 clock intervals long and defines the $I_1$ interval of the integrator. In a similar manner the $I_2$ interval time is physically obtained at matrix junction 287 by feeding the high potential of inputs $K_1$ and $K_2$ to one input and feeding the high potential of inputs $K_3$, $K_4$ and $K_5$ to the other input of the logical product circuit associated with junction 287. Thus, a high polarity on output $I_2$ senses the $I_2$ interval time. Similarly all the other interval times $I_3$, $I_4$, etc. can be sensed as high potentials on respective outputs $I_3$, $I_4$, etc., from the output matrix 270.

Referring next to Figure 28, each of the outputs $I_1$, $I_2$, etc., from the matrix of Figure 27, is fed to one of the 22 terminals, such as terminal 289, of a selector switch 290. Switch arm 291 can be manually positioned on any one of the 22 terminals, thus enabling a particular integrator interval time $I_i$ to be derived. The high output from switch arm 291, representing an $I_i$ integrator interval, is impressed through a voltage divider circuit 292 to the grid of a triode 293. The capacitor 294, connected from the input to the voltage divider 292 to the grid of triode 293, applies an integrating effect on the input waveform, thus maintaining its shape. The plate output of triode 293 is clamped between 100 v. and 130 v. by a pair of clamping diodes 294. The plate output of triode 293 represents the proposition $I_i'$; that is, the inverse of $I_i$. This voltage is impressed on the grid of a second triode 296 through a second voltage divider circuit 297 to obtain the square waveform representing the time interval $I_i$. As before, a pair of diodes 298 connect the plate output of triode 296 to potential sources 100 v. and 130 v., respectively.

The $\Sigma dy$ counter 215 will next be described. This counter has four flip-flops, A1, A2, A3 and A4. However, only the first three flip-flops are in retality counting stages. The A4 flip-flop represents the sign of the number contained in the previous three flip-flops. As shown in Figure 30, a positive content of the $\Sigma dy$ counter is represented by a "0" in the A4 flip-flop, and a negative content of the $\Sigma dy$ counter is represented by a "1" in the A4 flip-flop. The zero content and the positive counting of the $\Sigma dy$ counter is represented in a conventional binary manner. However, minus one is represented by "1" in all the flip-flops. To obtain the additional minus counts, the flip-flops are such that they carry into the next flip-flop when they change from a "0" to a "1" state.

The four flip-flops which comprise the $\Sigma dy$ counter are shown in Figure 29. The equations of the inputs to the flip-flops are shown below their respective flip-flops. The operations accomplished by this $\Sigma dy$ counter can be separated into four groups. These are; positive counting, negative counting, stepping and resetting.

In addition to "looking" at its own flip-flop states, the $\Sigma dy$ counter has its operations controlled by several other proposition flip-flops. These latter will be referred to here and explained further in the ensuing description.

The main function of the $\Sigma dy$ counter is to sum the $\Sigma dy$ inputs to one of the integrators during a decoding time. These $dy$ inputs are obtained as the result of coincidences between the $dz$ precession line and the $dy$ code marks. In the $dz$ line, the $dz$ outputs from previous integrators are stored. Each integrator selects for itself as inputs those $dz$ outputs appropriate to the problem under solution. This selection is made for the integrator by its code marks or marks in the $dy$ code section and by its code mark in the $dx$ code section. These code marks, of course, are introduced as part of the initial set-up of the machine and remain unaltered as far as their positions are concerned during the entire computation. The $dy$ code pulses are recorded in the Y channel of an integrator memory during a $P_1$ through $P_{22}$ count of the P counter. This time interval is indicated in the present discussion by proposition $P_{1/22}$. Furthermore, whenever a digit "1" appears on the Y channel for a given P position the Y1 proposition flip-flop is made true, and whenever a digit "0" appears on the Y channel the Y1 proposition flip-flop is made false (see Figure 12). The $dz$ precession line has a flip-flop designated $Zb$ (see Figure 14) which is used for computing. This $Zb$ flip-flop is true when a $dz+1$ appears in the precession line at a given P time, and is false when a $dz-1$ is in the precession line.

In summary, the additional propositions needed for enabling the positive and negative counting operations of the $\Sigma dy$ counter to take place are the Y1 flip-flop, the $P_{1/22}$ pulse range time, the $Zb$ flip-flop, and, of course, the clock pulse C.

Referring first to the positive counting operation equations, in the table of Figure 30, it is noted that the A1 flip-flop changes states every time a $dy$ mark is received from the magnetic wheel regardless of the value of the corresponding $dz$ digit. The product term $Y_1P_{1/22}$ defines the time during which the $dy$ units are being fed into the computer unit and hence are necessary propositions for the input equations. Furthermore, as in all the other counters, the inputs to the A1 flip-flop look at their own flip-flop state to determine which state to change to when the next $dy$ unit is fed into the $\Sigma dy$ counter. Hence, the equation needed to make the A1 flip-flop true is $a_1 = Y_1P_{1/22}A_1'C$ and the equation needed to make the A1 flip-flop false is $_0a_1 = Y_1P_{1/22}A_1C$.

The input equations for the remaining A flip-flops are derived, in general, according to the scheme outlined for the P counter, i.e., by referring to the table of the binary indications of the A flip-flops as shown in Figure 30, and noting what the states are of the previous flip-flops and its own flip-flop.

The $dy$ input units to an integrator are determined by coincidence between $dy$ code marks and corresponding digits in the $dz$ line. Depending on whether there is a one or a zero in the $dz$ position, the sign of the $dy$ unit is positive or negative, respectively. If the $dz$ line contains a 1, the $Zb$ flip-flop will be in the "on" condition (the $Zb$ plate will be high), and conversely. Hence, to accomplish positive counting in the $\Sigma dy$ counter, a $Z_b$ term must be present in the input equations. It should be noted that the $Z_b$ term was omitted in the first flip-flop A1 because, for both positive and negative counting, the A1 flip-flop changes states every time a $dy$ unit is fed therein, regardless of whether it has a positive or negative sign.

The negative counting operation will next be described. The input equations to the A1 flip-flop for negative counting are similar to the inputs for positive counting as has already been described. The inputs for the A2 flip-flop during negative counting will next be noted. The notation which indicates that the $dz$ pulse is negative is a high or one value for the false state ($Z_b'$) of flip-flop $Zb$. Hence, this term appears in both the inputs to the A2, A3 and A4 flip-flops. Referring to Figure 30, it is noted that the necessary condition of the flip-flops for making A2 false is for A1 to be false and A2 to be true. Thus $_0a_2$ equals $Y_1P_{1/22}Z_b'A_1'A_2C$ and, by a similar reasoning, all the other input equations for negative counting follow.

The $\Sigma dy$ counter is thus seen to have a binary counting capacity from decimal equivalent plus 7 to minus 7. Furthermore, whether the $\Sigma dy$ counter has a positive or negative number content, a negative $dy$ unit fed therein will cause the counter content to be algebraically decreased by one unit.

One further important function required of the $\Sigma dy$ counter is the ability to have its content fed out in a serial manner so as to enable successive stages to be added, digit by digit, to the $y$ number binary train being picked up from the magnetic wheel.

This serial feeding out of the digits can be considered as a process initiated by the S1 flip-flop shown in Figure 31, for example. This S1 flip-flop is set on by a mark which is recorded on the magnetic wheel at a given time to initiate the start stepping operation for combining the contents of the $\Sigma dy$ counter to the $y$ number picked off the wheel. This mark is the first one which is recorded in the $y$ number interval and always occurs 1 place before the least significant digit of the $y$ number.

This stepping operation, as illustrated by Figure 32, causes the binary number contained in the $\Sigma dy$ counter flip-flops to "step" or shift bodily within the counter, stage by stage in the direction of the least significant end. Thus, each time the counter is stepped, each stage assumes the value of the previous stage, as noted in Figure 32. Since the $\Sigma dy$ counter contains three stages, it is shown that the counter must be stepped three times in order to place the digit of stage A4 into stage A1. It is the condition of flip-flop stage A1 at any pulse time which is used for the input equations defining the addition operation of the $y$ number digits to the $\Sigma dy$ counter digits.

The equations used for controlling the $\Sigma dy$ counter during the stepping operation are characterized mainly by including the $S_1$ term. Thus for example, if stage A2 has a digit one therein, stage A1 is made to have a digit one by equation $a_1 = S_1A_2C$. This notation means that the input which makes A1 true, as a result of a stepping operation, reflects the true condition of the flip-flop A2. The inputs $a_4$ and $_0a_4$ to the A4 flip-flop are both zero, for the stepping operation, and hence, its content does not change as a result thereof. Since the content of A4 continues to step into $A_3$, into $A_2$, into $A_1$, etc. it is evident that after the third clock interval following the start of the stepping process, all of the A flip-flops will have the value of the sign and that this value will continue to step out of the $dy$ counter and add to the old value of $y$ issuing from the $y$ memory channel. It will be seen that the values which have been assigned to negative numbers in the $dy$ register will combine with $y$ numbers as the zero's complement of the true binary number since the one corresponding to the negative sign will continue to add to $y$ throughout the process.

One other operation must be included in the input equations to the $\Sigma dy$ counter. In order to ensure that the content is zero, as each successive integrator set-up on the wheel comes up for computation, a $P_{48}C$ term is introduced in the input equation of each of the flip-flops which renders all the flip-flops to be initially false.

The foregoing describes the various operations which can be performed on the $\Sigma dy$ counter. The positive or negative counting operations occur during the $P_1$ through $P_{22}$ interval; the stepping operation starts sometimes during the $P_{24}$ through $P_{46}$ interval, ending on the $P_{47}$ interval, and the resetting operation occurs at the $P_{48}$ pulse time.

The logical net required for performing the above operations will next be described by reference to Figure 33.

Here the family tree type of logical net is shown. The outputs of the logical net which are connected to the inputs of each of the four flip-flops comprising the $\Sigma dy$ counter are designated by appropriate letters $_0a_1$, $a_1$, etc., at various levels in the mid portion of Figure 33. For example, referring to Figure 29, the solution of the $_0a_1$ input to the A1 flip-flop is made up of the combination of: A single counting equation common to positive and negative counting, a stepping equation, and a reset equation. As seen in the lower left corner of Figure 33, each of these equations, except for the common term C, is first solved independently, and the results then fed into a logical three input addition circuit 302. Thus the counting term $Y_1P_{1/22}A_1$ is obtained, by a first product circuit 299. The resulting high potential representing this product is fed on first line 303 into one of the inputs of addition circuit 302. The stepping equation terms $S_1$ and $A_2'$ are multiplied in a second product circuit 300 and the resulting product fed on second line 304 into a second input of addition circuit 302. The $P_{48}$ term needed for the reset equation is fed on a single line 305 into the third input of the addition circuit 302. Thus, whenever one of the inputs to addition circuit 302 is of a high polarity, a relatively high output is sensed on its output line 306. This output is combined with a clock pulse C in multiplication circuit 307 to obtain the desired output $_0a_1$.

The logical net for the solutions of the $_0a_2$ inputs to the A2 flip-flop will next be described. In this case four independent solutions are possible. Hence, a four input logical adder circuit 308 is provided. The positive counting term of the $_0a_2$ input is obtained by feeding the counting term of $_0a_1$ (generated in circuit 299), along with terms $Z_b$ and $A_2$, into product circuit 309. The output of product circuit 309 is then fed into one of the inputs of the logical adder circuit 308. The negative counting term of the $_0a_2$ input is noted to be made up of the positive counting term of the $a_1$ input $Y_1P_{1/22}A_1'$, as evidenced by a high polarity on connecting line 310 on the right of Figure 33, together with terms $A_2$ and $Z_b'$ which are all multiplied together in product circuit 311. The output of product circuit 311 is fed by line 312 to one of the inputs of logical adder circuit 308. The stepping term of the $_0a_2$ input is solved by stepping product circuit 313 whose output is fed into logical adder circuit 308. The reset term $P_{48}$, fed in on lead 314, constitutes the fourth input into logical adder circuit 308. Whenever one of the inputs to adder circuit 308 is of a relatively high polarity, a positive polarity is impressed on one of the inputs to the output product circuit 316. A clock pulse C, in coincidence with this positive polarity produces the substantially square wave output pulse at point 317 representing the $_0a_2$ output.

The remaining equations controlling the operation of $\Sigma dy$ counter flip-flops are physically solved in a similar manner by the logical net shown in Figure 33.

In all cases the false input positive counting equation for each flip-flop is solved by feeding the similar solution of the previous flip-flop into a product circuit together with the true output of its own flip-flop. Similarly, the false input negative counting equation for each flip-flop is solved by feeding the positive input solution of the previous flip-flop into a product circuit together with the true output of its own flip-flop. The characteristic proposition for positive counting is the $Z_b$, terms, and for negative counting the $Z_b'$ term. Since these terms are not important in the input of the first flip-flop, as previously noted, they are introduced in the respective inputs to flip-flop A2 and thus appear in all the remaining inputs.

The theory of the precessing line will next be described. As previously stated, the $dz$ precessing line is a general storage for the $dz$ output states representing the carry out or overflow of each of the integration processes. These pulses are generated at the $P_{48}$ time associated with each of the integrators. The scheme employed in Figure 34 for representing these $dz$ outputs is to use the number corresponding to integrators $I_1$ through $I_{22}$ in the position the $dz$ output takes in the delay line at any given clock time. The delay line is made up of two parts. The first part, which is substantially 47 clock intervals long, is obtained by the relative spacing of the Z channel record and pick-up heads along the magnetic wheel. The last part, which is 2 clock intervals long, is composed of flip-flops Za and Zb. The present discussion is mainly concerned with negative precession, i.e., utilization of the entire delay time available as required during computation. Thus the information is assumed to be fed into the computer unit 136 from the Zb flip-flop as contrasted to being fed from either the Z1 or Za flip-flops.

Assuming the computer unit is just beginning to compute, the position of the $dz$ outputs in the delay line during the first revolution of the wheel will be described. Then enough of the precession operation of the delay line during the second revolution of the wheel will be described to show that the operation is cyclical.

Referring to the $P_{48}I_1$ clock time, the $dz$ output of integrator $I_1$ is generated, i.e., set-up in the computer. This set-up causes the $dz$ output to be recorded on the magnetic wheel part of the delay line. This is represented on the first row 318 of Figure 34 (which is denoted in the right hand column as $P_{48}I_1$ pulse time) by the digit "1" located in the left end pulse position of the delay line. One pulse time later, as defined by $P_1I_2$, the integrator $I_1$ output advances through the delay one additional clock pulse time. The next pulse time, as defined by $P_2I_2$ advances the integrator $I_1$ output still another clock pulse time. Thus the general mode of operating the $dz$ delay line is revealed.

At $P_{48}I_2$ time, 48 clock intervals after $P_{48}I_1$, the output of integrator $I_2$ is set-up in the computing unit and recorded into the delay line as shown on row 319. At this time the $dz$ output of integrator $I_1$ is in the Zb flip-flop but is ready to be transferred, via the computer unit, onto the magnetic wheel at the next clock time.

Referring to the chart, it can now be seen that the output of integrator $I_3$ is set-up and recorded at $P_{48}I_3$ time, the output of integrator $I_4$ at $P_{48}I_4$ time, and so on to the output of integrator $I_{21}$ which occurs at $P_{48}I_{21}$ time.

At this point, the outputs of the previous integrators occur in descending order in the delay line, spaced one pulse time apart as shown on row 320 at $P_{48}I_{21}$ time, for example. Hence, at successive pulse times, such as $P_1I_{22}$, $P_2I_{22}$, etc., the outputs of the previous integrations, such as $I_{20}$, $I_{19}$, etc., respectively, are fed out of the Zb flip-flop end of the delay line and immediately re-entered into the front end with no delay.

At $P_{48}I_{22}$ time, the output of integrator $I_{22}$ is generated. This completes the first revolution of the wheel and defines what may be called the major cycle of the machine.

Commencing with the second revolution of the wheel, it is seen that at $P_{48}I_1$ time, as shown on row 321 of Figure 34, the output of integrator $I_1$ is again generated. This output as before advances one position through the delay with each clock interval. The pattern of the outputs through the delay is thus shown to repeat for each revolution. For the second revolution of the wheel, as shown in row 321, the integrator outputs from the previous revolution are still present.

This completes the description and operation of the $dz$ delay line during computation, i.e., when the delay line is 49 clock intervals long.

In order to set-up a problem on the present computer, it is necessary to know where to place the $dy$ and $dx$ code marks in the Y and R channels, respectively. Referring to the portion of the chart of Figure 34, representing the integrator $I_{22}$ period, a mark in $P_1$ picks up (coincides) with the recording of the output of the integrator 2 numbers behind; $P_2$ coincides with the output of the integrator 3 numbers behind; $P_3$ coincides with the output of the integrator 4 numbers behind, etc. In order to facilitate knowing where to place the $dx$ and $dy$ code marks in the $P_1$ through $P_{22}$ positions of each integrator set-up of the wheel, a circular slide rule shown in Figure 35 is used. This slide rule has a large back circular card 322 rotatable with respect to a smaller front circular card 323 about a common reinforced center 324. The periphery of the back circular card 322 is divided into 22 equal arcs numbered 1 to 22 in a clockwise direction. These numbers represent pulse positions $P_1$ through $P_{22}$ on the Y and R channels. The front card 323 has its periphery, likewise, divided into 22 equal arcs numbered 1 through 22 in a counter clockwise direction, and representing integrator $I_1$ through $I_{22}$. On an intermediate radius of the front circular card 323, a window 325 is cut to enable reading a third set of numbers 1 through 22 arranged on the back circular card 322 in a clockwise manner. This third set of numbers represents the particular integrators for which the circular slide rule is set. From the general information previously deduced from the chart of Figure 34, the $P_1$ position of any integrator picks up the $dz$ output of an integrator 2 numbers behind. Thus the third set of numbers is arranged so that the number viewed through the window 325 is two numbers greater than the number of the integrator on the front circular card 323 opposite the $P_1$ pulse position on the back circular card 322. The slide rule, as set in particular for integrator $I_{22}$ in Figure 35, thus gives the P positions in integrator $I_{22}$ at which all the other integrator outputs can be picked up. Referring to Figure 35 and Figure 6, for example, a $dx$ code "one" in position $P_{11}$ is seen to pick up the $dz$ output of integrator $I_{10}$, and the $dy$ code "one" in position $P_6$ and $P_{16}$ pick up the $dy$ output of integrators $I_{15}$ and $I_5$, respectively.

In the foregoing, the P counter and the I counter have been described in detail showing how the propositions representing various intervals of time are obtained. The manner of locating the $dx$ and $dy$ code "ones" in the R and Y channels of the memory wheel in order to pick up the $dz$ outputs in the $dz$ delay line has, likewise, been described. Furthermore, the operation of the $\Sigma dy$ counter has been described in detail. The prime function of this $\Sigma dy$ counter is to store temporarily the algebraic accumulation of the $dy$ inputs obtained from the $dz$ line. This, of course, allows several outputs to feed into the same $dy$ input, hence the $dy$ counter is analogous to the differential adders used in the mechanical analogue differential analyzer.

The detailed description of the manner in which the computer unit 136 accomplishes the first main loop, described in connection with Figure 16, will now be continued by describing in more detail the function of the start flip-flop S1, and the manner of operation of the $y+\Sigma dy$ adder 219.

The start flip-flop S1, referring to Figures 16 and 31, is set to the on state by the first mark occurring in the Y channel during the intervals $P_{24}$ through $P_{46}$. The first possible position of this start pulse is $P_{24}$. The location of this pulse is determined as part of the initial conditions required to set-up the machine and determines the scale factor associated with the integrator in question. This start mark accomplishes its purpose by setting on the S1 flip-flop. The true and false output potentials $S_1$ and $S_1'$, respectively, of this flip-flop are used as terms in the equations defining the logical nets of the remaining relevant circuitry.

Referring to Figure 31, it is seen that the input to $s_1$, the true or "on" input to the S$l$ flip-flop, is represented by a logical product made up of $Y_1 S_1' P_{24/47} C$. This can be interpreted as stating that the condition required at the $s_1$ input to make the S$l$ flip-flop true is that a "one" must occur in the Y channel, the clock interval must be one between $P_{24}$ and $P_{47}$ inclusively, and the S$l$ flip-flop must be in an "off" or false state. It must be noted that the first "one" or mark occurring in the $y$ number interval will suffice to turn the S$l$ flip-flop on, and that it will stay on thereafter regardless of the $y$ digit values until turned off at $P_{48}$. The false input $_0 s_1$ to the S$l$ flip-flop is defined by $P_{47} C$. When this latter product is true, the start flip-flop S$l$ goes false and prevents an "addition" operation from taking place in the adders during the $P_{48}$ interval.

The result of making the S$l$ flip-flop "true" starts the stepping operation of the $\Sigma dy$ counter. Each stage of the $\Sigma dy$ counter is bodily moved to the next lower stage. As a result, each $y$ number stage, picked from the wheel, can be added with the number content of the first stage $A_1$ of the $\Sigma dy$ counter to form the new $y$ number digit.

Figure 36 shows the numbering system employed for the $y$ number. The clock positions of an integrator delegated to the $y$ number are $P_{25}$ through $P_{47}$. In order to handle the scale of an integrator, its $y$ number can be, in effect, changed by a power of two by placing the first digit of the $y$ number in any of the pulse positions after $P_{25}$. The sign position of the $y$ number is always the $P_{47}$ pulse position. The $P_{48}$ position is always blank.

It should be noted that the positive and negative binary numbers in the $\Sigma dy$ counter are similar to that of the $y$ number taken from the wheel except for the fact that a positive $\Sigma dy$ content is denoted by a zero, and a negative $\Sigma dy$ content is denoted by a one in the sign position $A_4$. The $y$ number has the opposite designation for its positive and negative sign, i.e., a digit "one" in its $P_{47}$ position indicates a positive number and a digit "zero" in its $P_{47}$ position indicates a negative number. As seen in Figure 16, a flip-flop designated D$l$ is used for delaying the carry proposition which results from the addition at one binary place, so that it can be combined with the addition at the following place. This summating is carried on in a logical diode network which comprises the $Y+\Sigma dy$ adder and will now be explained in detail by reference to Figure 37. Figure 37 shows an example of how the addition of $y=+5$ and $\Sigma dy=-1$ is accomplished to obtain a $y_0=+4$. As noted previously, the $P_{47}$ position of the $y$ number represents its sign. A (1) therein signifies the $y$ number is positive and a (0) signifies the $y$ number is negative. For the simple example in Figure 37, $P_{42}$ position carries the start pulse (not shown), and $P_{43}$ through $P_{46}$ positions contain the $y$ number digits. The $y$ number is the binary $+5$. The $\Sigma dy$ count is $-1$ which is represented by 1's in all the stages including the sign stage A4 of the $\Sigma dy$ counter. This is because the sign convention of the $\Sigma dy$ counter is just opposite the sign convention of the $y$ number, i.e., a (1) in the A4 flip-flop signifies the $\Sigma dy$ content is negative and a (0) therein signifies the $\Sigma dy$ counter content is positive. Adding corresponding digits, it is seen that the result, $y_0$, is a binary $+4$. It is noted that the content 327 of the A4 stage of the $\Sigma dy$ counter is, in effect, carried along and added to all subsequent stages of the $y$ number. Thus the $P_{47}$ position of the new $y$ number ($y_0=+4$) is still positive as desired.

In order to further clarify the manner in which the $Y+\Sigma dy$ counter adds, Figure 37 shows how a $y=-6$ when added to a $\Sigma dy=+2$ gives a $y_0=-4$. In this case the binary word, representing $-6$, follows the convention for negative $y$ numbers. A zero in the $P_{47}$ position shows that the $y$ number is minus. The $\Sigma dy$ counter content is positive as shown by a zero in its fourth stage A4. On summing the binary number there shown, the binary number $-4$ is obtained. In this case, as before, the $P_{47}$ position is added as an ordinary digit to give a zero sum, indicating that the binary number is negative.

In order to physically accomplish the addition, as above indicated, the equations for the logical net which comprise the $Y+\Sigma dy$ adder 219 will be described by use of the truth table in Figure 38.

This truth table shows all the possible combinations of the states of the flip-flops Y1, A1 and D1. This is easily accomplished by setting up a table of all the binary numbers that can be represented by three stages. Each stage arbitrarily being designated by one of the three flip-flop propositions. The eight rows of binary digits thus obtained are summed and the resulting digit is placed in a column 328 designated 'sum." Any carry digit thus derived is placed in the adjacent column 329 designated "carry." Two more columns are provided in the table. One of these columns 330 is headed $$0 \xrightarrow{\Delta} 1$$

which is a proposition interpreted as being true when matched values of the D1 column and the "carry" column 329 change from zero to one. Similarly, the other column 331 is designated $$1 \xrightarrow{\Delta} 0$$

and is interpreted as a proposition which is true when matched values of the "D1" column and the "carry" column change from one to zero. It is seen that as a result of the above matching, only one true condition results in each of the latter two columns. These true conditions define when the D1 flip-flop, which is the carry flip-flop for the $Y+\Sigma dy$ counter, changes its state. The proposition $$0 \xrightarrow{\Delta} 1$$

indicates the state of the input proposition for rendering the D1 flip-flop to be made "true," and the proposition $$1 \xrightarrow{\Delta} 0$$

indicates the states of the input proposition for rendering the D1 flip-flop to be made false. These two inputs are defined by equations:

$$0 \xrightarrow{\Delta} 1 = Y_1 A_1 D_1'$$

$$1 \xrightarrow{\Delta} 0 = Y_1' A_1' D_1$$

Referring to Figure 39, the D1 flip-flop is schematically illustrated. The significant terms required for completely defining the inputs to the D1 flip-flop will now be described. In addition to the terms in the above product equations, the "true" state of the start flip-flop proposition $S_1$ and a clock pulse C must be included. The equation for $d_1$ as presented below the D1 flip-flop in Figure 39 equals $Y_1 A_1 D_1'SC$. At the end of each integrator computation, defined by pulse time $P_{48}$, it is always desired to reset the D1 flip-flop to a "false" state thus clearing it for the next computation. Hence, the $_0 d_1$ input equation defines this reset operation by a second product $P_{48}C$.

The summation process of the $Y+\Sigma dy$ adder is principally composed of the combination of the states of its three inputs which render the "sum" proposition to be true, as shown in column 328 in the table of Figure 39. As shown by the "sum column," four such combinations are present; these combinations are recognized to be $$Y_1' A_1' D_1 + Y_1' A_1 D_1' + Y_1 A_1' D_1' + Y_1 A_1 D_1$$

These combinations are symbolically added and hence when any one of them is true, a positive magnetization, representing a digit 1, is deposited onto the y number portion of the magnetic wheel. Actually, other propositions are necessarily included in order to define completely the generation of the new y number. These additional terms will be discussed in the ensuing discussion.

The second main loop of the computer unit, previously discussed in connection with Figure 16, will now be described in greater detail. During the $P_1$ through $P_{22}$ intervals a $dx$ code mark properly positioned in the R channel picks up a $dz$ output stored in the $dz$ channel by one of the previous intergrators. As before noted, this $dz$ output can have either a positive or negative sign in accordance with whether a one or a zero appears in the particular clock interval of the $dz$ line which is coincident with the $dx$ code marks. This $dx$ input is set into a $dx$ register represented here by the B1 flip-flop. Referring to Figure 40 a schematic illustration is shown of this B1 flip-flop. The input equations for controlling this proposition are shown below the illustration. The main solution of the $b_1$ input equation equals $R_1 Z_b P_{1/22} C$. The $R_1$ term therein indicates the R1 flip-flop is true, corresponding to a digit 1 on the R channel of the magnetic wheel; the $P_{1/22}$ time indicates that this digit 1 must be in the $dx$ code section of the channel; and the $Z_b$ terms indicates the $Zb$ flip-flop is true and consequently the $dz$ output is positive in sign. As a result of symbolically multiplying all these terms together, the B1 flip-flop is set to be true, indicating a positive $dx$ pulse. The other solution of the $b_1$ equation is $P_{47}C$. This portion is used for making the B1 flip-flop positive during the $P_{48}$ time (it is the end of the $P_{47}$ interval which set the flip-flop on). Since the $P_{48}$ position of the y number is normally blank, if the B1 flip-flop remained negative, this, in effect, would complement this blank into a one and cause it to be added into the $P_{48}$ digit of the r number. In order to avoid this, the B1 flip-flop is made true during the $P_{48}$ time and thus this blank position of y number is treated like a zero and consequently has no effect on the computation. In order to obtain a negative $dx$, for the next integrator computation, the B1 flip-flop is made false at the $P_{48}$ clock time, thus $_0 b_1 = P_{48}C$. Hence, if the $dx$ code mark picks up a negative $dz$ output, the B1 flip-flop remains in this initial negative state.

It should be noted that whereas normal addition in the $Y+\Sigma dy$ adder took care of the sign of the new y number due to the opposite nature of the sign conventions of y and $dy$ numbers; on the other hand, the $R+Y$ adder must be handled in a different manner. It should be noted that both y and $dx$ can have either a plus or a minus sign. This manner of adding will first be illustrated by reference to Figure 41. Here the r number is assumed to be zero initially. The y number taken from the wheel is (+7) and the sign of $dx$ is plus. Thus the y number is combined with the r number as dictated by each $dx$ input. One adition or subtraction takes place each revolution of the wheel. It should be noted that the $dz$ output unit is obtained by adding the carry from the $P_{47}$ pulse positions of the r and y numbers to the $P_{48}$ content 332 of the r number. For the first addition in Figure 41 no carry is obtained from the $P_{47}$ addition and hence the $dz$ output is the zero 333, since the $P_{48}$ content 332 of the r number is zero. This $P_{48}$ content 332, of the r number, is determined as a part of the initial set-up of a problem on the machine and never changes. After each computation, this same $P_{48}$ content is re-recorded, as was noted in Figure 16, with the new r number.

When adding $y=+7$ to the r number during the next revolution of the wheel, a carry 334 is obtained by summing the $P_{47}$ position digits. This carry 334, when added to the $P_{48}$ content 332 of the r number, causes a 1 digit output 335. When adding $y=+7$ a third time to the r number, again a carry from the $P_{47}$ time summation results in a 1 digit output when combined with the zero in the $P_{48}$ of the r number. The most important concept to grasp about the nature of this means of computation is that a $dz$ unit output is generated as a result of every integration process. A 1 digit output is considered a positive $dz$ output unit and is designated by $dz^+$; and a 0 digit output is considered a negative $dz$ output unit and is designated by $dz^-$.

Referring next to Figure 42 a set of computations is shown when $dx$ is negative and y is positive. Furthermore, the $P_{48}$ content 336 of the r number for this case has a pulse (1) therein. In this case the initial value of the r number is zero, the y number 337, as picked from the wheel, equals plus four. When $dx$ is negative, the y number 337 is complemented, i.e., ones and zeros are reversed; and an initial carry, a plus one, is introduced in the first stage summation as shown by way of the example 338. As a result of the complementation and the addition of plus one, the y number is made negative.

As before, the carry as the result of the $P_{47}$ summation is added to the $P_{48}$ value of the r number to obtain the $dz$ output one. As a result of the first addition, in Figure 42, there is no $P_{47}$ carry, but since $P_{48}$ of the r number contains a one, a $dy$ output one 339 is generated.

As a result of the computation during the second and third revolutions of the wheel, again there is no carry at $P_{47}$ time and hence the $dy$ output is a 1 digit. As a result of the fourth addition, a carry is generated at the $P_{47}$ clock time. This carry digit when combined with the one digit in $P_{48}$ of the $r$ number gives a "zero" digit $dz$ output.

Although it is not too evident, as yet, the present system of handling the signs of $dx$, $dy$ and $dz$ causes a possible one unit error in the $dz$ output. This system is herein defined as the "plus one-minus one" system. It is characterized mainly by the fact that the effective $dz$ output rate of an integrator is determined by summing the positive and negative $dz$ output unit rates, i.e., $$dz_e = dz^+ + dz^-$$

This concept can be best presented by Figure 43 which shows the $dz$ output obtained when a zero value of $y$ is added to a zero value of $r$. Obviously the $dz$ output should be zero whether $dx$ is positive or negative. As noted in Figure 43, the first additive transfer of $y=0$ into $r=0$ results in no carry at the $P_{47}$ pulse time and hence, since $P_{48}$ of $r$ is zero, the $dz$ output is a zero digit. The next addition results in a carry at $P_{47}$ time. This is because the sign digit of $y=0$ is a "one" in the $P_{47}$ pulse position, and the previous addition had placed this "one" in the $P_{47}$ pulse position of the $r$ number. This carry when added to the 0 digit in $P_{48}$ of the $r$ number results in a 1 digit $dz$ output digit. The third addition is the same as the first and the $dz$ output is again a zero digit. The fourth addition is the same as the second and results in a 1 digit $dz$ output. Thus consecutive $dz$ outputs oscillate between zero and one, but the sum of the $dz$ outputs, which represents the true output, is effectively zero as desired.

Figure 44 is a schematic illustration of the operation performed in the second main loop of the computer unit described in connection with Figure 16. Here the $y$ number taken from the wheel is added stage by stage to the $r$ number taken from the wheel. As noted, the $y$ number, the $dx$ unit input rate, and the $dz$ unit output rate can be either positive or negative in value. Using this diagram, an algebraic proof will next be presented of how the "plus one-minus one" system is able to accomplish the fourth requirement previously mentioned; i.e., to utilize the signed $dx$ rate and $y$ number inputs, and to attach a proper sign to the $dz$ unit output rate.

In the following equations, the positive rates of the variables are denoted by a plus superscript, and the negative rates of the variables are denoted by a negative superscript. Furthermore, by reference to Figure 44, the general expression for a positive $y$ number can be written as $y+2^n$, and the general expression for a negative $y$ number as $[2^{n+1}-(y+2^n)] = 2^n-y$.

The expression which is desired to be proved is that:

$$dz_e = \pm \frac{y\,dx_e}{2^n}$$

where $$dz_e = dz^+ - dz^-$$

and $$dx_e = dx^+ - dx^-$$

When performing digital integration, the $y$ number, in effect, is multiplied by the $dx$ input "unit." Hence, the normal sign rules of algebraic multiplication are employed for determining the sign to be attached to the $dz$ output "unit."

The proof will first be carried out for the cases where the $y$ number is positive in sign.

$$dz^+ = \frac{(y+2^n)dx^+}{2^n+1} + \frac{(2^n-y)dx^-}{2^n+1}$$

$$= \frac{y}{2\times 2^n}dx^+ + \frac{dx^+}{2} + \frac{dx^-}{2} - \frac{y\,dx^-}{2\times 2^n}$$

Since there is a $dx$ "unit" for every $dz$ "unit,"

$$dz^- = (dx^+ + dx^-) - dz^+$$

Substituting, $$dz_e = dz^+ - dx^+ - dx^- + dz^+$$
$$dz_e = 2dz^+ - dx^+ - dx^-$$

Substituting again, $$dz_e = \frac{y}{2^n}dx^+ + dx^+ + dx^- - \frac{y}{2^n}dx^- - dx^+ - dx^-$$

$$= \frac{y}{2^n}dx^+ - \frac{y}{2^n}dx^-$$

$$= \frac{y}{2^n}dx_e \quad \text{Q.E.D.}$$

The proof will now be carried out for the cases where the $y$ number is negative.

$$dz^- = \frac{(2^n-y)}{2^n+1}dx^+ + \frac{(y+2^n)}{2^n+1}dx^-$$

$$= \frac{dx^+}{2} - \frac{y}{2\times 2^n}dx^+ + \frac{y}{2\times 2^n}dx^- + \frac{dx^-}{2}$$

And remembering that $$dz_e = 2dz^+ - dx^+ - dx^-$$

$$dz_e = dx^+ - \frac{y}{2^n}dx^+ + dx^- + \frac{y}{2^n}dx^- - dx^+ - dx^-$$

$$= -\frac{y}{2^n}(dx^+ - dx^-)$$

$$= -\frac{y}{2^n}dx_e \quad \text{Q.E.D.}$$

This concludes the proof of the "plus one-minus one" system which is employed in the second main loop of the computer unit for deriving the $dz$ output rate. It will be seen that this system has the advantage of transmitting effectively signed output units without requiring a trinary indication. If $+1$, $0$, and $-1$ were transmitted, two $dz$ delays would be required.

The circuitry provided for accomplishing the addition of the $y$ number to the $r$ number will now be described. The B1 flip-flop has already been described. As for the $R+Y$ adder circuitry, it can best be explained by the truth table of Figure 45. This truth table, similarly to the one in Figure 38, shows all the possible combinations of the inputs from flip-flops R1 and D2 and a proposition $y_a$. The $y_a$ proposition input is defined as equal to $Y_1B_1 + Y_1'B_1'$, i.e., the two instances when the signs of the $y$ number and the $dx$ unit are the same. The D2 flip-flop proposition inputs control the carry into the $R+Y$ adder.

Referring to Figure 45, the possible combinations of $Ya$, R1 and D2 feeding the adder are shown by the binary numbers in the first three columns of the table. The sum of the binary digits in the rows thus obtained is placed in a column 341 designated Q, and the carry resulting from each addition is placed in a column 342 designated "carry." The inverse of the sum Q is recorded in the next column 343 designated Q'. The last two columns are obtained as the result of matching the digits in column D2 to the digits in the "carry" column 342. The $$0 \xrightarrow{\Delta} 1$$

column 344 is a proposition which is true when the digit change from the D2 to the "carry" column 342, goes from a zero to a one. The $$1 \xrightarrow{\Delta} 0$$

column 345 is a proposition which is true when the digit change between columns D2 and 342 goes from one to a zero. Below the table the logical equations defining the propositions in the last two columns 344 and 345 is as follows:

$$0 \xrightarrow{\Delta} 1 = Y_a R_1 D_2'$$

$$1 \xrightarrow{\Delta} 0 = Y_a' R_1 D_2$$

Instead of setting up a logical net for the sum Q, of the terms in the table of Figure 45, the inverse term Q' is obtained. The reason for generating the term Q' is because a driver circuit is needed for driving the Q term. This driver circuit inverts its input. Hence, when the term Q' is fed therein, the desired term Q is fed out.

Thus, the Q' equation is obtained from Figure 45. This proposition is true for the following combinations of the inputs:

$$Q' = Y_a'R_1'D_2' + Y_aR_1D_2' + Y_aR_1'D_2 + Y_a'R_1D_2$$

The D2 flip-flop for controlling the carry input in the $R+Y$ adder circuitry will next be described. The equations defining the conditions which control the inputs to this D2 flip-flop are presented below the schematic drawing of the flip-flop in Figure 46. In order to make the D2 flip-flop "true", i.e., go from 0 to 1, the terms $Y_aR_1D_2'$, together with the start term $S_1$ and the clock term C are needed, i.e., $d_2 = Y_aR_1D_2'S_1C$. As noted, the terms $Y_a$ equals $(Y_1B_1+Y_1'B')$. This latter expression is interpreted as a proposition which is "true" when the sign of the y number and the dx rate are both plus, or both minus. To obtain the term $Y_a'$, it is noted that $Y_a' = (YB_1+Y'B')' = Y'B_1+YB_1'$. This latter term indicates that when the y number and the dx rate have opposite signs, the proposition $Y_a'$ is "true."

The equation for making the D2 flip-flop "false" includes this term $Y_a'$ since $$1 \xrightarrow{\Delta} 0 = Y_a'R'D_2$$

The additional terms desired to make the D2 flip-flop "false" are $S_1$ and C, hence: $_0d_2 = Y_a'R'D_2S_1C$.

Because of the nature of handling the y number when the dx input is negative, an additional term is employed to define both the $d_2$ and the $_0d_2$ inputs. This term is $P_{24}B_1'C$ for the $d_2$ input. Thus, at the end of the $P_{24}$ pulse time, whenever the condition of the B1 flip-flop is false, the D2 flip-flop is made to be true, enabling the required unit to be added to the first stage addition process in the $R+Y$ adder.

On the other hand, when B1 flip-flop is true, indicating that the y number is to be added as it appears on the wheel, the D2 flip-flop is made to be in a false state when the $(Y+R)$ addition process starts. Thus this additional term for the $_0d_2$ input equals $P_{24}B_1C$.

A basic logical requirement of a set of integrators is that they must be capable of generalized intercoupling; i.e., that any input must be capable of receiving all outputs. For a practical machine, the ability to receive seven dy inputs is sufficient. If more are required, it is possible to use two or more integrators to achieve the process. For example, suppose that it is found necessary to generate an output which is based upon ten dy inputs and a single dx input. Since the dy inputs are summed by the machine, it is evident that $$dz = \frac{1}{2^n}(y_1 + \ldots + y_a + y_{10})dx$$

This can be broken into two outputs $dz_1$ and $dz_2$ which may be defined as (say)

$$dz_1 = \frac{1}{2^n}(y_1 + y_2 + \ldots + y_6 fy_7)dx$$

and $$dz_2 = \frac{1}{2^n}(y_8 + y_9 + y_{10})dx$$

The first seven dy's are then admitted to one integrator, and the remaining three are routed to another. Both integrators are coded to receive the same dx. The sum of the two integrator output rates will be the desired rate. This summing may take place in any third y register.

There are certain cases in which two or more inputs must be made to a dx in order to code a real problem. For this purpose, the novel concept of using another integrator operationally is introduced.

It will be seen that the introducing of two or more dx input units would call for transferring y into r two or more times which would often lead to the production of two or more dz outputs for which no provision exists. If the integrators whose outputs supply these inputs are suitably scaled down, the maximum average input rate can always be made less than or equal to one unit per turn. For example, if four inputs are required, each might be scaled at its output or source integrator to have a maximum rate of one unit each four turns. No means are available, however, to prevent, for example, four input units from arriving simultaneously, followed by four or more periods of no input.

Assume that an integrator is filled to capacity in its y and r registers; i.e., to all ones, including the sign reversal. Let the output of this integrator, called du, be fed back into its own dy input, and let the independent variable (variously called dx or dt) of the machine be introduced upon dx. The first turn of the wheel will produce a du (1) which will add to y setting it to all zeros, since the capacity of the register is exceeded. The next turn will therefore produce a du (0) which, on feeding back, will subtract 1 from y and restore it to all (1)'s again. The output du will thus average zero in the (one minus one) system from an input of all ones upon dx.

Let the four dx inputs for the other integrator now be introduced into the dy input of the operational or feedback integrator now under consideration.

It will be evident from careful consideration that if four simultaneous ones occur on these input, du will contain four extra zeros occurring one after the other. Similarly, if four simultaneous zeros occur, then four extra ones will be transmitted serially. It will be seen, more generally, that du will act as a negative serial repeater of any inputs which occur in parallel.

Hence, the multiple dx input problem is solved by (a) introducing all of the dx inputs into the dy input of another integrator which is coded in this operational manner, (b) connecting the operational output du, into the original integrators dx input, and (c) reversing the output sign of the original integrator.

This completes the description of the $R+Y$ adder and associated circuitry. As previously noted when discussing the outputs from the $Y + \Sigma dy$ adder, additional terms must be included with the Q' proposition in order to completely define the new r number digits and the dz outputs generated by the $R+Y$ adder.

These new terms are required because in addition to the computation operation of the computer unit, several other operations are provided in the machine, such as filling information into each of the channels of the wheel, shifting this information on the wheel in an orderly fashion from one clock position to another, and idling. Thus, before describing the circuitry for recording the results of a computation back onto the wheel, the additional proposition flip-flops which define the computation process will be described.

When performing operations such as computing and filling, for example, it is desirable to be able to commence these operations at a given point on the memory wheel. Hence, first and second "go" flip-flops designated as G1 and G2, respectively, are employed to enable this initiation to be performed. The first "go" flip-flop G1 can be made true, at any time, by an external switch closed by the operator. The second "go" flip-flop G2 is interconnected so as to be automatically triggered to a "true" state at the next $P_{48}I_{22}$ position time after the external switch is closed. This position time defines the start of a revolution of the wheel. The proposition flip-flops G1 and G2 are interconnected, as shown by their input equations in Figure 47.

The G1 flip-flop can be placed into a "true" state by receiving a negative pulse on its $g_1$ input. Although all the details of the grid input circuitry are not shown in Figure 47, this input circuitry is similar to that of the other flip-flop circuits in that the negative drop of the $g_1$ input pulse (in this case the leading edge) is differentiated and used to trigger the G1 flip-flop to a true state. The negative pulse fed into the $g_1$ input is generated by manually closing either a "0" or a "1" push button. (See Figure 49.) These input pulses are designated by symbols ⓪ or ① and are fed into the $g_1$ input through a mixer circuit 347 which is similar to a logical product circuit (Figure 11) but operates like a logical adding circuit (Figure 10). Normally the two inputs ⓪ and ① to mixer circuit 347 are relatively high in potential so that no current flows through resistor 348. Whenever either one of these inputs ⓪ or ① are low, however, a negative drop is sensed on the $g_1$ input due to current flow through resistor 348.

Referring briefly to Figure 48, the "0" and "1" push buttons 349 and 350 which initiate the negative inputs ⓪ or ①, respectively, are shown. In addition to controlling the G1 flip-flop, the "0" and "1" buttons are used to control an X1 flip-flop whose function will be described later.

At the instant the G1 flip-flop is made true, its $G_1$ high output potential is conveyed to the gate 351 feeding the $g_2$ input of the G2 flip-flop. This potential, along with the $P_{48}I_{22}$ high potential, opens gate 351, thus permitting the next coincident clock pulse C to pass therethrough. The trailing edge of this latter clock pulse triggers the G2 flip-flop to a true state. Thus G2 will come always at the beginning or a new cycle regardless of the point at which the manual buttons may be pushed.

After the G2 flip-flop becomes true, as seen by the $_0g_1$ input equation to the G1 flip-flop, the coincidence of the high output potential $G_2$ with a clock pulse C renders the G1 flip-flop false.

Furthermore, the high level output $G_2$ is impressed on the $_0g_2$ input of its own flip-flop. Thus, flip-flop G2 helps set up the condition for rendering itself to become false when the next $P_{48}I_{22}$ pulse coincidence is made, either after one or a plurality of revolutions of the memory wheel as evidenced by the $\theta'$ or $\theta H$ terms in the equation: $_0g_2 = P_{48}I_{22}G_1(\theta' + \theta H)C$.

In this equation $\theta$ is the independent variable proposition. This proposition is true during the computing operation of the machine and signifies that the machine is computing a predetermined independent variable increment. This computation requires a large number of revolutions of the wheel. When the computer is not in the $\theta$ operation, i.e., $\theta'$ is true, the computer is turned off after a single revolution of the memory wheel.

Hence, when the term $\theta'$ is of a high potential in the above equation, G2 flip-flop is turned off (made false) after a single revolution of the wheel. On the other hand when the term $\theta H$ of the equation is of a high potential, the G2 flip-flop is not turned off until after a large number of revolutions of the wheel.

As will be explained in the ensuing discussion, the output derived from integrator $I_1$ defines the duration of the independent variable increment $\theta$. This output is used for triggering a halt flip-flop H1, shown in Figure 48, into a true state. The product term $\theta H$ in the $_0g_2$ equation is thus indicative of when the computation process of the machine must end after a plurality of revolutions.

The connections controlling the halt flip-flop H1 is next described by reference to Figure 48. As previously stated, this proposition is made true by a carry out from the $I_1$ integrator at $P_{48}$ time. The $P_{48}$ position of the R channel is always 0 in the $I_1$ integrator, hence for an output to occur, the R+Y adder proposition Q, at this time, must be true. This is possible only when a carry results from the $P_{47}$ pulse time addition. In addition, the G2 flip-flop and the independent variable computing operation proposition $\theta$ must both be true, i.e., of a high potential at the same time, to open the gate 210, thus permitting the next clock pulse C to make the H1 flip-flop true.

It is thus seen that the halt flip-flop H1 is made true at the $P_{48}I_1$ time of the last revolution of the wheel. The computation process is then stopped, as shown by the $_0g_2$ input to the G2 flip-flop, at the $P_{48}I_{22}$ time of that revolution. To ensure that the H1 flip-flop will be in a false position until triggered by the $I_1$ output during the last revolution of a computation, the false input $_0h_1$ is defined as $P_{48}I_{22}C$, thus the last clock pulse of any revolution can be used to render the H1 flip-flop false.

Before describing the remaining operations which can be performed on the present computer, the external control switches governing these operations will first be described by reference to Figure 50. Here six mechanically interconnected push buttons designated $\alpha$ $\beta$ $\gamma$ $\delta$ $\phi$ and $\theta$ are shown. These push buttons initiate the following operations respectively; fill Y channel, fill R channel, shift reference pulse left, shift reference pulse right, compute one operation time, and compute independent variable increment. The push button switches are all of the type that are normally up. They are mechanically interconnected so that only one of the push buttons can be manually pushed down at a time.

When the push buttons are in their normally up position (the position shown in Figure 50), their respective outputs are connected to a common bus 352 energized at 100 v. by a source line 353. Any time one of the buttons is pushed down it connects its output to a second common bus 354 connected through a left interconnecting switch 355 to a second source line 355a energized at 130 v.

It should be noted that push button $\theta$ controls first and second interconnected switches 356 and 357 representing the $\theta$ and $\theta'$ propositions respectively. The normally up position of second switch 357 is connected directly to the 130 v. source line 355a, while the down position of second switch 357 is connected to the 100 v. common bus. The $\theta'$ output from the second switch 357 is always connected to the opposite source from that to which the $\theta$ output is connected. Thus it is shown that both states of the $\theta$ proposition can be sensed as high voltages at any time as needed for control.

In addition to these operation switches, an additional push button E is provided, which controls the position of the two interconnected switches, right and left switch 358 and 355, respectively. In the normally up position of right switch 258, E is connected to the 100 v. source, and in the down position, right switch is connected to the 130 v. source. The left switch 355 breaks the normal contact of second common bus 354 to the 130 v. source and connects bus 354 instead to the 100 v. source any time the E switch output is 130 v. The opening of switch 355 to the 130 v. source ensures that during the time the E output is relatively high in potential none of the outputs of the other push button switches are relatively high.

Having described the arrangement of the manual control switches which initiate the various operations performed on the computer, these operations will now be described.

In order to solve a problem on the computer, the first operation which must be performed is to place the initial information in the Y and R channels of each of the integrator arcs on the memory wheel. These filling operations are done independently of each other. The $\alpha$ push button initiates the filling of the Y channel; and, the β push button initiates the filling of the R channel. The manner of placing a digit in a particular position of the R or Y channels of a particular integrator is to first place a reference mark in a corresponding clock position of the $dz$ line. Coincidence of this reference mark with the clock position on the integrator arc specified causes a digit to be deposited in that position on the wheel.

This reference mark is first placed in the Z channel by closing switch E simultaneously with tapping the "1" button 350, for example. As previously described, when the "1" button is tapped, the G1 flip-flop is first made true, then the G2 flip-flop is made true at the beginning of the next revolution of the wheel defined by $P_{48}I_{22}$. At the first $P_{48}$ clock time after the G2 flip-flop is made true, a mark is arranged to be deposited onto the $dz$ channel. The product equation which defines the depositing of this reference mark is $P_{48}EG_2$. As shown in Figure 47, the G2 flip-flop stays true only for one revolution of the wheel. Although every $P_{48}$ interval during which G2 is true a mark is deposited in the $dz$ channel of the wheel, all of these marks, except the last at $P_{48}I_{22}$ time, are erased by erase head 150 (Figure 7) associated with the Z channel. At the end of $P_{48}I_{22}$ time, G2 goes false and thus the last placed in the $dz$ channel now is enabled to stay in the $dz$ line by a $Z_aG_2'$ term which defines the recirculation of the information in the $dz$ channel during the idling operation of the computer, i.e., when G2 is false.

This position of the reference mark in the $dz$ line is controllable so that it can be shifted one step at a time, either forward or backward, enabling anyone of the clock positions $P_1$ through $P_{48}$ in any integrator to be filled. Thus the reference mark serves as a marker for depositing information one digit at a time in each position of an integrator channel.

In order to facilitate the filling operation, the logical nets controlling this operation are so arranged that whenever a digit is deposited in the Y or R channel, the reference mark in the Z channel is automatically shifted to the right (one clock time earlier with respect to the P counter). Furthermore, the push buttons $\gamma$ $\delta$ enable the reference mark to be shifted one interval to the right or left, respectively, as a separate operation which does not include depositing any information on the wheel.

When filling the Y channel, for example, it has been noted that the reference mark in the $dz$ channel is automatically shifted to the next lower clock position each time a digit is placed in the corresponding position of the Y channel. As a consequence, after 48 digits have been filled in an integrator, the reference mark in the $dz$ channel is lost and must be filled again.

During the time that a reference mark is being re-introduced in the $P_{48}$ position of the $dz$ channel, it is desired that other information, already deposited on the Y or R channels be retained. Normally during idling, the re-circulation of the R and Y channel is obtained by logical nets representing terms $R_1G_2'$ or $Y_1G_2'$; but term $G_2'$ is not high during this operation; hence, recirculating means must be provided in the logical net of the computer when the E button is down, as represented by terms $Y_1E$ and $R_1E$, to re-deposit this information.

After placing the reference pulse in the $dz$ line, the E switch is opened. The filling of the Y channel will now be described. Pushing down the $\alpha$ push button initiates this filling of the $y$ channel.

Assume that the reference mark is positioned, for a given instant, in the $P_{30}$ pulse position of the $dz$ channel. Assume further that the integrator switch 290 (Figure 28) has been set so that integrator $I_{10}$ is being filled.

Besides setting flip-flop G2, the 0 and 1 buttons set the fill digit flip-flop X1 shown in Figure 49. The negative pulse, due to the closing of the "0" button 349 for example, is impressed on the left grid of the X1 flip-flop through a differentiating circuit 369 and a diode 359. Diode 359 permits the differentiated leading edge of the negative pulses to pass therethrough to cut off the conduction through the left tube and thus cause the left plate output $X_1'$ to have a high potential thereon. The negative pulse due to the closing of the "1" button 350, in a similar manner, causes the right output $X_1$ of the X1 flip-flop to have a high polarity. This initiation of the "1" button sets up one signal, and initiation of the "0" button sets up a zero signal. The signal output from the X1 flip-flop represents the digit that is to be recorded in the filling process.

For this case, the "1" button is used for setting up both the G1 and X1 flip-flops. Flip-flop X1 remains in its one state until the "0" button is pressed, while G1 is set to zero at $P_1I_1$ which is one pulse after G2 is triggered.

The equation which defines the filling of the Y channel is $X_1\alpha G_2Z_aI_1$.

In summary, the $\alpha$ button has been pushed down and hence its output is connected to the 130 v. source; the integrator switch has been set so that it is high during the $I_{10}$ period; and the $X_1$ and $G_2$ outputs have been set at 130 v. by tapping of the "1" button. Thus during the $I_{10}$ period of the wheel revolution, during which $G_2$ is high, the reference mark in the $dz$ channel at $P_{30}$ clock time triggers the $Za$ flip-flop to a true state. The terms of the filling equation are now all momentarily high and hence the state of the logical product network, which solves the equation, is deposited in the $P_{30}$ position of the Y channel.

In addition, the following logical equations are required for the filling $y$ operation.

During the one revolution of the memory, as defined by the time during which G2 remains on, all the information previously recorded in the R and Y channels must be re-circulated. Likewise, the reference mark in the Z channel must be re-circulated, without precession, for all the integrators which are not being filled. However, the reference mark is picked up one interval earlier from the integrator which is being filled, i.e., the mark precesses or shifts one clock interval position to the right in the $dz$ channel.

The terms re-circulated through the computer unit for the Y channel of the memory are represented by $Y_1\alpha G_2Z_a'$ and $Y_1\alpha G_2I_1'$. The first of these terms include re-circulating all the information on the Y channel except that which recurs at the reference mark ($Za$) time in all the integrators. The second term may be thought of as including re-circulating all the information in the reference ($Za$) time except that in the integrator to be filled. It may be noted that although these terms actually overlap, the result is correct for the overlapped conditions. All the terms are re-circulated, during the $\alpha$ operation, in the R channel. Hence, this process is indicated by the term $R_1C$.

As for the Z channel re-circulation, during the $\alpha$ filling operation, it is desired that the reference mark therein be re-circulated without precession for all the integrators except the integrator to be filled. The coincidence of the terms $G_2I_1'Z_a\alpha$ represents this re-circulation, i.e., the states are recorded from the $Za$ flip-flop of the $dz$ channel. However, as before noted, in order to shift the reference mark to the right (one pulse position earlier) in the specific integrator being filled, the depositing of the reference mark is defined by $P_{48}'G_2I_1Z_1\alpha$. Note that the reference mark is recorded from the Z1 flip-flop in the $dz$ channel, thus automatically being shifted one clock interval, in this case to position $P_{29}$, for the next filling.

The filling of the R channel is carried out in exactly the same manner as the filling of the Y channel. In this case, the $\beta$ push button is down. The $dz$ channel has a reference mark placed in a desired position therein as before described. The zero or one button initiates the closing of the first go gate G1 and the fill digit flip-flop X1, and this digit is then placed in the corresponding position of the integrator selected by the integrator switch. The equation defining the coincidence of the terms for depositing the pulse in the R channel is $X_1\beta G_2 Z_a I_1$ and will not be further described since it is identical to the Y channel fill equation with $\beta$ substituted for $\alpha$.

The equations defining the re-circulation of the previously deposited information in the R channel are $R_1\beta G_2 Z_a'$ and $R_1\beta G_2 I_1'$. These equations are likewise identical to the Y channel re-circulation equations with $\beta$ substituted for $\alpha$.

During the $\beta$ operation, all the information in the Y channel is re-circulated by equation $Y_1\beta$.

Likewise during the $\beta$ operation, the $dz$ channel has its reference mark re-circulated by equations $G_1 I_1' Z_a \beta$ and $P_{48}' G_2 I_1 Z_1 \beta$. The first equation re-circulates the reference mark without precession, while the second equation causes the reference mark to be shifted (one clock interval earlier) after it has been used for filling a digit in the specific integrator chosen.

It should be noted that the second go-flip-flop $G_2$ is true for each revolution of the wheel during which the filling and computing processes are going on. During the time the $G_2$ flop-flop is false, the computer unit is inoperative as far as computing is concerned, but the memory wheel is running. The information is re-circulated in the Y, R and $dz$ channels of the computer, during the idling operations, by the respective logical equations $Y_1 G_2'$, $R_1 G_2'$ and $Z_a G_2'$.

The right and left shifting operations $\delta$ and $\gamma$ respectively will next be described. The shifting operations are used for the reference mark only. They enable this reference mark to be moved in the $dz$ channel one position earlier, or one position later, in time with respect to the P counter time index positions. During these shifting operations the information in the Y and R channels is merely re-circulated with no change. The equations which define this re-circulation when the shift left push button $\gamma$ is down are $Y_1\gamma$ and $R_1\gamma$. The equations defining this re-circulation for the shift right operation $\delta$ are $Y_1\delta$ and $R_1\delta$.

The shifting operations take effect in the Z channel only during one integrator time; hence, during the other integrator times, as defined by $G_2 I_1' Z_a \gamma$ and $G_2 I_1' Z_a \delta$ for shifting left and right respectively, the reference mark is not precessed. The equations defining the time the shifting actually takes place are $G_2 I_1 Z_b \gamma$ and $G_2 I_1 Z \delta$. The first of these latter equations shows that the reference mark is picked up from the $dz$ channel during the integrator $I_1$ by the $Zb$ flip-flop, thus causing this mark to be picked up one clock interval later in time when the $\delta$ button is down. The second of these latter equations shows that the reference mark is picked up by the Z1 flip-flop, i.e., one clock interval time earlier during the $I_1$ integrator time when the $\gamma$ push button is down. Figure 34 shows how these marks can be picked up from either the Z1, Za or Zb flip-flops.

The computing operation equations of the computer will next be described with reference to the $Y+\Sigma dy$ adder truth table in Figure 38 and the $R+Y$ adder truth table in Figure 45.

Referring back first to Figure 38, the serial summation of the digits of the $y$ number taken from the memory, the digits of $dy$ taken from the $\Sigma dy$ adder, and the carry flip-flop D1 was there shown. In order to completely define these summations, additional terms are required in logical equations. These additional terms are the true states of the S1 flip-flop, and the second go flip-flop $G_2$. Since a computation can be made for either a single revolution of the wheel, or a plurality of revolutions, these latter two ranges of computation are distinguished by initiating either the $\varphi$ or the $\theta$ push buttons respectively. The complete equations defining the new $y$ number digits generated and deposited on the wheel as a result of the $Y+\Sigma dy$ addition are as follows:

$$Y_1 A_1 D_1 S_1 G_2(\varphi+\theta)$$
$$Y_1 A_1' D_1 S_1 G_2(\varphi+\theta)$$
$$Y_1' A_1 D_1' S_1 G_2(\varphi+\theta)$$
$$Y_1' A_1' D_1 S_1 G_2(\varphi+\theta)$$

During these computation processes, the $dy$ code mark in each integrator set-up must be re-circulated since they are fixed for the duration of a problem. Hence, the re-circulation equation $Y_1 S_1' G_2(\varphi+\theta)$ enables these $dy$ code marks to be re-deposited. The false state of the S1 flip-flop, $S_1'$, characterizes the portion of each integrator time during which the $dy$ code marks in the channel are re-deposited.

The above completes the detailed logical description of the first main loop of the computing system shown in Figure 16.

Referring back to Figure 45, the serial summation of the digits of the $y$ and $r$ numbers taken from the memory, together with the carry digit from the D2 flip-flop, will now be further described. This summation is carried on in accordance with the $dx$ input rate to, in effect, perform the integration process.

The results of this summation, as shown in the table of Figure 45, are represented by a single proposition $Q'$. However, this proposition is inverted in a manner to be described such that the term Q is made available.

This summation term Q is employed both for generating the new $r$ digits and for generating the new $dz$ output unit.

To define completely both these latter computing operation equations, addition terms are required. For generating the new $r$ digits, these are the $G_2$ term and the $S_1$ term, together with the initiation of either the $\varphi$ or $\theta$ push buttons.

As with the code portion of the Y channel, the information in the $dx$ code section of each integrator of the R channel remains fixed for the duration of a problem; hence, the re-circulation of the $dx$ code section is identified by the product $R_1 S_1'(\varphi+\theta)$. The $S_1'$ term characterizes this code section.

It should be noted that $S_1'$ is true during the $P_{48}$ clock time. Also, Figure 31 shows that $_0 s_1 = P_{47} C$, hence the above re-circulation equation for the R channel also maintains the digit required in the $P_{48}$ position of the $r$ number as described in connection with Figure 41, for example.

The $dz$ channel operation during the computing process will now be explained. As shown by Figure 42, for example, the $dz$ output as the result of a computing routine is generated during the $P_{48}$ clock interval of an integrator. Hence, the result of the summation of the terms in the $(Y+R)$ adder during the $P_{48}$ period form the $dz$ output digit to be deposited onto the wheel. This equation is defined as $QG_2 P_{48}(\varphi+\theta)$ and its explanation follows from that above.

During the remaining clock times (excepting $P_{48}$ when the $dx$ output is being generated), the $dz$ information in the $dz$ channel is precessed, i.e., picked up by the $Zb$ flip-flop (see Figure 34). This operation is defined by the equation $P_{48}' Z_b G(\varphi+\theta)$.

There is one more logical equation required for the $dz$ channel computing process. As the $P_{48}$ time of the $I_1$ integrator comes up each revolution of the wheel, an independent variable input unit is fed into the $dz$ delay line. The equation defining this $dz$ unit input is noted to be $P_{48} I_1 G(\varphi+\theta)$.

This completes the logical description of the operations that can be performed on the machine. As before noted, these operations are obtained by initiating one of the push buttons shown in Figure 50.

Having described the logical equations which define the outputs to be recorded from the computer unit onto the channels of the wheel, the logical nets which physically solve these equations will next be described.

Referring next to Figure 53, the logical nets are shown for the inputs to the B1 flip-flop and the S1 flip-flop. The $P_{1/22}'$, $P_{48}'$ and $P_{24}'$ time proposition logical nets are also shown.

As shown in Figure 40, the $b_1$ input equation to the B1 flip-flop is composed of two parts $(R_1Z_bP_{1/22})$ and $P_{47}$ connected by symbolic addition. The resulting symbolic sum is then multiplied by a clock state to give the desired solution. Symbolic product network 372 in Figure 53 generates the first of these products and a pair of cascaded product networks 373a and 373b generates the second part $P_{47}$ which is equal to $F_1'F_2F_3F_4F_5F_6$. The outputs of these product networks are fed into addition network 374 whose output along with the clock state C is fed into a final product network 375 to obtain the desired $b_1$ input solution.

The $_0b_1$ input is simply a product net 376 for obtaining $P_{48}C$.

The input equations for the S1 flip-flop are shown in Figure 31. One of the $s_1$ input terms $$P_{24/48}=F_6+(F_1F_2F_3F_4F_5)$$

is obtained by cascading the output of product network 373a into product circuit 377 and feeding the result into addition circuit 378 along with the $F_6$ term. The output of circuit 378 is fed into a final product circuit 379 along with the C, $S_1'$, $Y_1$ and $P_{48}'$ terms to derive therein the $s_1$ input.

The $_0s_1$ input is equal to $P_{47}C$. Since $P_{47}$ was previously generated as part of the $b_1$ input solution by cascaded product network 373a into 373b, the output of these latter two networks is fed along with a clock state into final symbolic product circuit 380 to obtain $_0s_1$.

As previously shown in Figure 18, the $P_{1/22}'$ time proposition equation is equal to $F_6+F_2F_3F_4F_5$. Hence the output of product network 373a is fed along with the $F_6$ term into a summation circuit 381 which generates $P_{1/22}'$ on its output. As for the other time propositions, $P_{48}'$ is equal to the logical sum of $$(F_1'+F_2'+F_3'+F_4'+F_5'+F_6')$$

hence a first addition circuit 382 is employed for obtaining the sum of terms $F_1'$ through $F_5'$, and a second addition circuit 383 is employed for combining the output of circuit 382 with the $F_6'$ terms.

The $P_{24}'$ time proposition is similar to the $P_{48}'$ proposition except that it includes $F_6$ instead of $F_6'$. Hence, the output of first addition circuit 382 is combined in a third addition circuit 384 with term $F_6$ to obtain this $P_{24}'$ output.

Figure 54 shows the logical nets for the inputs to the second go flip-flop G2 (Figure 47) and the halt flip-flop H1 (Figure 48). Input $g_2$ equals $P_{48}I_{22}G_1C$. Since $I_{22}$ equals $K_1K_2K_3K_4K_5$ (Figure 27), these terms along with terms $P_{48}$ and C are generated in a common product network 385. The output of network 385 is then joined with term $G_1$ in an output product network 386 to generate $g_2$. The other input $_0g_2$ is equal to $$P_{48}I_{22}G_2(\theta+\theta H_1)C$$

Common product network 385 has already been provided for generating $P_{48}I_{22}C$, hence this output is fed into one of the inputs of terminal product network 387. The requisite terms $(\theta'+\theta H_1)$ are obtained by a logical summation circuit 388. It can be shown by logical algebra that $(\theta'+\theta H_1)=(\theta'+\theta H_1)$, thus the single terms $\theta'$ and $H_1$ only need to be fed into circuit 388. This latter output and the $G_2$ term are also fed into the terminal product circuit 387 to obtain the desired $_0g_2$ solution.

It should be noted the inputs to the first go flip-flop G1 are evident from Figure 47, and, therefore, are not further shown.

The $h_1$ input for the H1 flip-flop has been shown to be equal to $QP_{48}G_2\theta I_1C$. This product is obtained by first forming a partial product $I_1P_{48}$ in diode product circuit 390. It should be noted from Figure 27 that $I_1=K_1'K_2K_3'K_4K_5$. This partial product is then combined in diode product network 391 with terms C, $G_2$, Q and $\theta$ to obtain $h_1$. Since $_0h_1$ is equal to $P_{48}I_{22}C$, it is generated directly by common product network 385.

Referring next to Figure 55, the logical net circuits are shown for generating the inputs to the D2 flip-flop and the Q' summation proposition. In connection with Figures 45 and 46, $d_2$ was shown to be equal to $$[(Y_1B_1+Y_1'B_1')R_1D_2'S_1+P_{24}B_1']C$$

In Figure 55, circuit 393 generates $(Y_1B_1+Y_1'B_1')$. The output of circuit 393 is then cascaded along with terms $R_1$ and $D_2'$ into an intermediate multiplication circuit 394. The output from this latter circuit is then combined along with term $S_1$ in a two input product circuit 395. The product $P_{24}B_1'$ is obtained from multiplier 396. The outputs of circuit 395 and 396 are then impressed upon a two input adder 397 whose output when multiplied by clock pulse C in output circuit 398 gives the desired solution $d_2$.

The physical circuit for solving the $_0d_2$ input $$[(Y_1'B_1+Y_1B_1')R_1'D_2S_1+P_{24}B_1]C$$

is also shown in Figure 55. The $(Y_1'B_1+Y_1B_1')$ term is obtained by symbolically multiplying and adding the results in network 400. The output of network 400 is multiplied by terms $R_1'$, $D_2$ and $S_1$ in a four input multiplier 401.

The other part of the solution of $_0d_2$ is obtained by multiplying terms $P_{24}$ and $B_1$ in network 402 and impressing the result therefrom along with the output from multiplier 401 into adder 403. The output of adder 403 and a clock pulse or state C generates the desired $_0d_2$ terms in final multiplier 404.

The Q' network will next be described. In Figure 45, Q' is shown to be equal to $$Y_a'R_1'D_2'+Y_aR_1D_2'+Y_aR_1'D_2+Y_a'R_1D_2$$

It is noted that some of the product terms of Q' and the $d_2$ and $_0d_2$ input defining equations are similar.

Hence, network 400, which is equivalent to $Y_a'$ is fed into one of the inputs of each of the first multiplier circuit 405 and the second multiplier circuit 406 along with the necessary other terms to obtain $Y_a'R_1'D_2'$ and $Y_a'R_1D_2$, respectively. Similarly, $Y_2$, which is generated in circuit 393, is fed into one of the inputs of each of the multiplier circuits 394 and 407 along with the necessary other terms to obtain $Y_1R_1D_2'$ and $Y_1R_1'D_2$.

These four multiplier circuits 405, 406, 407 and 394 are then combined in a four input adder 408 to provide the term Q'.

In the computer, there are four propositions formed by logical nets. It is desired that the true states of these propositions drive other logical nets. Hence, the false states of these propositions, namely Q, $P_{1/22}$, $P_{24}$ and $P_{48}$ are first generated. These false states are then fed into driver circuits which invert them and thus supply the desired true states, with the additional current requirements needed.

In Figure 52, a typical driver circuit is shown to comprise a triode 434 having the inverted term fed in on its grid through an integrating circuit 435 which overcomes the differentiation of the input pulse caused by bias resistor 436 and the stray capacity of triode 434. The plate of triode 434 is connected to a 230 v. source through a load resistor 437. The output line 438 from the plate of triode 434 is clamped between 100 v. and 130 v. by diodes 439. This output line conveys the $P_{48}$ proposition term.

A similar circuit to the above is used for inverting the $P_{24}$, the $P_{1/22}$ and the Q terms.

As shown next in Figure 56, the input diode nets for the D1 flip-flop are made up of a true diode net 411 and a false diode net 410. The $d_1$ input, $Y_1A_1D_1'S_1C$, is provided by logical multiplication in true diode net 411. The terms $Y_1$ and $A_1$, since they appear together in another equation, are set up to feed through separate diodes to a common line 413. The terms C, $S_1$ and $D_1'$ are fed singly along with the result on line 413, into a four input product circuit whose output it $d_1$. When all of these inputs are of a relatively high polarity, the output $d_1$ is of a relatively high polarity.

The $_0d_1$ input $(Y_1'A_1'D_1S_1+P_{48})C$ is obtained in false diode net 410 by multiplying $Y_1'A_1'D_1S$ together in a first multiplier having a common junction 414. The output of junction 414 is then combined with term $P_{48}$ in a logical adder having a common junction line 416. The output from common junction line 416 is then multiplied by C to obtain the $_0d_2$ input.

The output equations from the computer, as previously described, for the filling, shifting, idling and computing operations are grouped in the bottom of Figure 56 according to the three channels Y, R and Z of the memory onto which the information is recorded. The particular grouping of these equations is designated by $Y_0$, $R_0$ and $Z_0$, respectively. The logical nets for physically solving these output equations are also shown in Figure 56.

Several of the logical output equations, the ones which are used during the computation process, include the partial product $G_2(\varphi+\theta)$. Hence, this partial product is generated once by network 430 and the output therefrom is fed directly into the left family tree network 431, and through lead 432 to the right family tree network 433. Since the $S_1$ term appears in several of the computation process equations, it is introduced once at the bottom of the right family tree network 433.

The $Y_0$ group of output equations will be described first. It should be noted that the solution to each of the equations for generating a $Y_0$ output is fed through a common add circuit 418. Since there are nine major solutions possible, add circuit 418 has nine input lines 420 through 428.

$Y_0$ output lines 425 through 428 have the computing terms impressed thereon, while line 420 receives the $dy$ code terms re-circulated during the computation process. The fill Y channel solution, as characterized by the initiation of the $\alpha$ push button, is generated on line 422, and re-circulation during the $\alpha$ operation is generated on line 421. The re-circulation of the Y channel during filling of the R channel and during shifting of the reference pulse in the Z channel is represented by the potential on line 423, while line 424 supplies the recirculation of the Y channel during filling of the Z channel and during the idling operation.

It should be noted that the load resistor associated with common add circuit 418 is shown as part of the second circuitry in Figure 51.

The solutions of each of the $R_0$ output equations are fed through add circuit 433. In this case there are six possible solutions as obtained by input leads 440 through 445. Since the $R_0$ computation output includes the intermediate solution of proposition Q, the single computing output equation required is generated on lead 441, while the equation defining the re-circulation of the $dx$ code mark is generated on lead 440. The fill R operation equations, characterized by the initiation of the $\beta$ push button, are generated on leads 444 and 445. Finally, the re-circulation outputs during the other fill operations, the shifting process outputs, and the idling outputs are generated on leads 444 and 445.

Eight possible solutions of the $Z_0$ output equations are fed out of logical addition circuit 434 via connections 446 to 453, inclusive. Three of these solutions, defining the computation process, are generated on connections 446, 447 and 448. Connection 446 carries the new $dz$ term, connection 447 carries the independent variable term, and connection 448 provides for the re-circulation of the remaining terms of the Z channel during computation. The filling of the Z channel is accomplished by the solution on line 451, and the re-circulation of the Z channel during the other processes is accomplished by solutions on lines 449. The idling output is represented by the solution on line 450 and the shifting of the reference mark in the $dz$ channel is accomplished by the potential on lines 452 and 453.

The record circuitry for recording the $Y_0$, $R_0$ and $Z_0$ information (pulses) from the logical nets back onto the wheel 116 will next be described by reference to Figure 51. These three record paths denoted $Y_0$, $R_0$ and $Z_0$, respectively, are all identical, so that only the $Z_0$ path will be described in detail.

Any time a $Z_0$ state is received it is applied through a first integrating circuit 363 onto the grid 360 of a record triode 361. This grid 360 is normally held at cut-off by a grid resistor 371 connected to $-190$ v. A $Z_0$ unit or one state raises the grid 360 to not more than $-3$ v. due to clamping diodes 362 which limit the grid 360 to such a value by connecting it to the intermediate point of a potentiometer 364. When at this limiting potential, triode 361 conducts. The plate output of record triode 361, carrying the inverted form of its input, is coupled to a second record triode 365 through a second integrator circuit 367. Any time second triode 365 conducts, the current therethrough energizes the coil 368 of record head 147. Previous to the passage of the magnetic material on the wheel under record head 368, it has passed under erase head 150, Figure 4, which is supplied with a D.C. current of such polarity and magnitude as to give the magnetic material maximum negative magnetization; i.e., to saturate it. If head 368 is not energized because triode 365 is cut off (by the presence of a "zero" state on its grid) then the magnetic material passes under it unchanged. It is left in a state of negative saturation.

If head 368 is energized by triode 365 as the result of a "one" state being applied to its grid, the magnetic material immediately under the head will be reversed in state and given a maximum positive polarity to the point of saturation. This yields the magnetic pattern as previously referred to.

After a problem is solved on a computer, or when a mistake is made while filling a computer, means are provided for erasing the information on the wheel 116. This means is in the form of a manually operated clear push button switch 370 which connects the grids of the second triode in each of the record circuitries to the intermediate point of potentiometer 364. This causes each of the triodes to conduct simultaneously, thus magnetizing the record heads 147, 141, 142, respectively, of each of the channels to erase the information on the wheel.

This completes the detailed description of the computer components.

In Figure 57, an illustration of the preferred embodiment of the present invention is shown located on a table 455.

The power supply (not shown) for the machine is located below table 455, and feeds power therein through power cable 456.

The memory wheel 116 is disposed in this embodiment with its rotating axis in a vertical position and the associated record and pick-up heads, such as 128 and 141, respectively, are spaced around the circumference of the wheel 116 and mounted on a horizontal plate 457 which encircles the wheel. On the under side of plate 457 are attached the tubes such as amplifier 168 associated with the pick-up circuitry.

The diode logical nets which comprise the computer unit 136 are set up and arranged on a square flat framework 458. The crystal diodes are clipped in evenly spaced rows and columns on the under side (not shown)

of framework 458; and the interconnecting wires and resistors are hooked-up on the top side of the framework 458.

Around the sides of framework 458 the proposition flip-flops 459 required in the computer unit 136 are attached.

On the front end of framework 458, elevated on posts 460, is a control panel 461 on which are located the various switches and push buttons for controlling the operation of the machine.

An oscilloscope 463, which affords a visual read-out for the machine on its screen 463a, is located on the table 455 and connected to the machine through a cable 465.

Referring back to the control panel 461, the six operation push buttons, $\alpha$, $\beta$, $\gamma$, $\delta$, $\phi$ and $\theta$, previously described, are arranged thereon in row 466. In front of row 466 are the zero and one digit buttons 349 and 350, respectively. Nearer the center of control panel 461 the integrator switch 290, having 22 possible switch positions, is provided.

In order to facilitate the read-out, channel switch 468 is provided. This latter switch has three positions which connect either channel $dz$, R or Y to the oscilloscope 463. In addition, switch 469 is provided. The screen 464 of oscilloscope 463 has a 22 position scale 470 thereon, hence switch 469 makes it possible for the operator to connect either the first or second half of an integrator period to oscilloscope 463.

This completes the description of the overall illustration of a preferred embodiment of the present digital integrating computer which can be used for obtaining solutions to any type of ordinary differential equation or simultaneous sets thereof, or for generating functions of time which are solutions of differential equations.

The basic method of solving, for example, ordinary differential equations by the use of integrating means such as these is to, in effect, interconnect the outputs of one or a plurality of the integrators to some of the inputs in such a manner so as to create a feedback system, and then "drive" the entire integrator system by pulses from an external source fed into the remaining inputs. The pulse stream fed in from the external source is known as the independent variable $x$ of the equation.

On actuating the system a pulse stream corresponding to the dependent variable $y$ of the equation will be stored in one of the integrators.

The solution of the equation can be defined by noting the values of $y$ corresponding to values of $x$ at fixed increments of the variable $x$. Hence, means need also be provided for summing and storing $dxe$.

The manner of interconnecting the integrator set-ups is determined by the differential equations to be solved, i.e., for each particular problem the interconnection system is arranged in a particular way. The general theory of this is well known to the differential analyzer art.

As an example of a problem that can be solved using these circuits, the set-up and mode of operation for simultaneously generating the sine and cosine functions will be described. As is well known, these trigonometric functions can be expressed as the solutions to the relatively simple harmonic differential equation $$\frac{d^2y}{dx^2}+y=0$$

In considering the application of the digital integrating means, it is noted that two integrations are required to obtain the solutions to this equation. The first integration gives:

$$\int \frac{d^2y}{dx^2}dx=\frac{dy}{dx}$$

and the second integration gives:

$$\int -\frac{dy}{dx}dx=-y$$

In order to physically solve the above differential aquation, four integrators, i.e., integrator set-ups on the memory wheel 116, are utilized. Two of these integrator set-ups are provided for the first and second integration processes indicated above; a third is used for generating the independent variable $dx$ and for stopping the computation at fixed increments of the independent variable $x$; and a fourth is used for summing the independent variable $dx$.

These four integrator set-ups will first be schematically illustrated in Figure 58. This illustration actually comprises a work sheet which facilitates coding up a problem preparatory to placing it on the machine. On this work sheet the interconnections between the integrators are indicated; the scale factors are recorded; and the initial number and code information required in the R and Y channels of each of the integrators are shown.

In general, to determine how to interconnect the integrator set-ups to obtain the feedback network, two "ones" sources are considered. One of these sources constitutes the independent variable $dx$ units generated by integrator 1, in this case. It will be noted that in the present embodiment a 1 is inserted in the $dz$ line as the output of integrator 1, regardless of what its actual output may be, so that this position in the $dz$ channel may be treated by any other integrator as the independent or driving variable of the machine.

The actual output of integrator 1, of course, is used to control the stopping of the machine. The other of these sources is an assumed source generating $$\frac{d^n y}{dx^n}$$

units, where $$\frac{d^n y}{dx^n}$$

is the highest derivative in the equation, in this case, $$\frac{d^2 y}{dx^2}$$

All the terms of the differential equation are generated from the $dx$ source and the assumed source. A final feed-back connection is then made from the output to the initially assumed input line. This feed-back connection represents the completion of the equality of the equation.

Referring to the schematic of the system in Figure 58, the "one's" streams corresponding to the variables of the equation are denoted by vertical lines. The first vertical line starting from the left is designated line $x$, disregarding the co-efficient there shown, and is connected to receive pulses from integrator 1. The second vertical line carries digits from the assumed source and is labeled $$\frac{d^2 y}{dx^2}$$

the third vertical line carries the result of the first integration obtained from integrator 3 and is labelled $$\frac{dy}{dx}$$

and the fourth vertical line carries units corresponding to the result of the second integration obtained from integrator 5 and is labelled $y$.

As noted in Figure 58, each integrator is schematically illustrated by a rectangle, such as 471 for integrator 1. The R and Y channels, each 48 clock intervals in length, are indicated along the top and bottom of each of the rectangles. On the left of each of the rectangles, the number of the integrator is indicated in block 472. On the right of each of the rectangles, between the aforementioned channels, as shown in particular for integrator 1, three rows 473, 474 and 475 contain information concerning the $dz$ output, the $dx$ input, and the $dy$ input, from top to bottom, respectively.

The first integration, $$\int \frac{d^2y}{dx^2}dx$$

is performed in integrator 3. Thus its $dx$ input line 476 receives ones from the vertical line $x$, and its $dy$ input line 477 receives one from the vertical line $$\frac{d^2y}{dx^2}$$

The output from integrator 3 is equal to rate $$d\left(\frac{dy}{dx}\right)$$

and is fed on its $dz$ output line 478 to the vertical line labelled $$\frac{dy}{dx}$$

The second integration $$\int \frac{dy}{dx}dx$$

is performed in integrator 5. Thus the $dx$ input lead 479 of this latter integrator receives units from vertical line $x$, and its $dy$ input lead 480 receives units from vertical line $$\frac{dy}{dx}$$

The output from integrator 5 is equal to rate $-dy$ and it is fed on its $dz$ output lead 481 to the last vertical line labelled $y$.

The completion of the feedback loop is made from the last vertical line, representing $y$, to the initially assumed line $$\frac{d^2y}{dx^2}$$

by a jumper 482 shown dashed in Figure 58. It is seen that this latter interconnection represents the completion of the equality $$\frac{d^2y}{dx^2} = -y$$

of the differential equation.

It is known from the study of calculus that for this simple linear differential equation one solution is $$y = y_{max}. \sin x$$

i.e., the value of $y$ varies as the function of sine. Furthermore, $$\frac{dy}{dx} = y_{max}. \cos x$$

i.e., the value of the first derivative $$\frac{dy}{dx}$$

varies as the function of a cosine. Thus, it is noted that the values $y$ and $$\frac{dy}{dx}$$

are indicated by the $y$ number in the Y channel of integrator set-ups 3 and 5, respectively.

After interconnecting the integrator circuits in the schematic of Figure 58 in the manner above described, the sign of the variables must be considered.

It is noted that it is desired that the first integration produce a $$-d\left(\frac{dy}{dx}\right)$$

rate. Thus, the outputs on the $dz$ output line 478 from integrator 3 must be properly reversed in sign before being fed into the $dy$ input lead 480 of integrator 5.

This reversal in sign is indicated in the schematic of Figure 58 by a minus sign in the sign box 483 in the $dz$ output row 473 of integrator 3. The $dy$ input line 477 to integrator 3, however, receives the $dy$ output rate from integrator 5, without a sign change and hence a plus sign is located in the sign box 483 of integrator 5.

It must be noted that all rates considered here are effective rates and should bear the subscript $e$, since the value which they produce is not the sum of ones but the difference in the number of ones and zeros. This in no wise affects the logic and need not be considered in the coding.

The scale factors will next be introduced as algebraic symbols in the work sheet in Figure 58. On this diagram the independent variable vertical line $x$ is labelled $\alpha_1 x$, where $\alpha_1$ is a constant. This signifies that $\alpha_1 dx$ units represent a change of one unit in the variable $x$. In a like manner, the scale factor of $$\frac{d^2y}{dx^2}$$

is $\alpha_2$. The integrator constant is equal to $2^n$, hence the output of integrator 3, which is $$\frac{dy}{dx}$$

has the scale factor $$\alpha_3 = \frac{\alpha_1 \alpha_2}{2^n}$$

Referring next to integrator 5, it receives inputs $dx$ and $$\frac{dy}{dx}$$

whose scale factors were defined above, hence the output scale factor assigned to its output $y$ is equal to $$\frac{\alpha_1 \alpha_2}{[2^n]^2}$$

As previously noted this output $y$ is fed by jumper 482 into the $dy$ input of integrator 3.

Thus, the scale equation expressed by these interconnections is $$\frac{\alpha_1^2 \alpha_2}{[2^n]^2} y = \alpha_2 \frac{d^2y}{dx^2}$$

hence the original equation will only be satisfied if the relation $$\frac{\alpha_1^2 \alpha_2}{[2^n]^2} = \alpha_2 \text{ or } \alpha_1^2 = [2^n]^2$$

holds between the constants introduced.

Since $\alpha_2$, the scale factor for the variable $y$, dropped out of the above equation, it can be arbitrarily chosen, realizing that the maximum number of units which can represent $y$ is limited by the capacity of the stages, $n$, allotted thereto. The maximum value of the $y$ number, i.e., the amplitude, is known to be the same for the sine and cosine and in this case is made equal to unity.

Thus the scale factors $\alpha_2$ and $\alpha_3$ are likewise equal and arbitrarily chosen to be $2^{18}$ in order to give the desired accuracy.

In order to set up these scale factors, the start mark is located in clock position $P_{27}$ of the Y channel of both integrators 3 and 5. Hence, this reserves clock positions $P_{28}$ through $P_{46}$, inclusive (19 stages), for the $y$ number. This determines the integrator constant $2^n$ of the machine, setting it at $2^{19}$. Thus from the above equations it follows that $\alpha_1 = 2^{19}$.

Assuming the initial value of $x$ is zero, the initial value of the $y$ number (sine) to be placed in integrator 3 is zero and the initial value of the $y$ number (cosine) to be placed in integrator 5 is the maximum value to be assigned to $y$, i.e., $y_{max}$.

The maximum value of $y$, (unity) after being multiplied by the scale factor, is represented on the work sheet by a "one" initially located in the last stage position $P_{46}$, reserved for the y number in integrator 5. This is equivalent to a y number of $2^{18}$. The initial setting of the y number in integrator 3, on the other hand, is made by placing a digit zero in all of its stages ($P_{27}$ through $P_{46}$) since it sums the $$\frac{dy}{dx}$$

variable which is initially equal to zero.

By referring to the convention for representing the y number in Figure 36, the sign of the initial y number settings in both integrators 3 and 5 require a digit one in their $P_{47}$ clock position.

As for the code sections of integrators 3 and 5, the interconnections already determined decide their location. By use of the slide rule shown in Figure 35 it is now clear that integrator 3 can be made to pick up the output of integrator 1 by placing a $dx$ code in position $P_1$ of the R channel of integrator 3; while integrator 5 can be made to pick up the output of integrator 1 by placing a $dx$ code mark in position $P_3$ of the R channel of integrator 5. In a similar manner, it is determined that the $dy$ code of integrator 3 picks up the output of integrator 5 by a mark in position $P_{19}$ of the Y channel of integrator 3; while integrator 5 picks up the output of integrator 3 by a mark in position $P_1$ of the Y channel of integrator 5.

Integrator 1 will now be further explained. This integrator generates a $dx$ "one" each revolution of the wheel during computation. This is obtained by term $P_{48}I_1G(\phi+\theta)$ which, whenever true, feeds a unit from the computer unit 136 to the $dz$ channel delay line.

In order to have the computation carried out for a given increment of the independent variable x, integrator 1 is further arranged so as to have a carry out from its R channel, after the required number of $dx$ pulses (revolutions of the wheel) have been generated.

A precalculated y number is initially placed in the Y channel of integrator 1. Once each revolution of the wheel during the computation process, this y number is subtracted from the r number until a carry out occurs at the $I_1P_{48}$ time. This carry out is utilized to turn on halt flip-flop H1 (Figure 48) which stops the computation.

The precalculated number, designated V, to place in the Y channel of integrator 1 can now be determined. Since $\alpha_1 dx$ units represent a unit change of the variable x, $2^{19}\Delta x$ is the number of $dx$ units representing $\Delta x$ units. If y were to be added into r in integrator 1, then y would be filled with a number equal to $$\frac{2^{23}}{\alpha_1 \Delta x}$$

However, no $dx$ inputs are fed into integrator 1 and hence the number y therein is actually subtracted from r. Hence, the number V placed in the Y channel of integrator 1 is equal to $$V = 2^{23} - \frac{2^{23}}{\alpha_1 \Delta x}$$

which when complemented equals $2^{23}/\alpha_1 \Delta x$.

Assuming $\Delta x = \frac{1}{16}$ or $2^{-4}$, then $V = 2^{23} - 2^8$. The result of this subtraction is set up in the Y channel of integrator 1 by placing a digit one in clock positions $P_{33}$ through $P_{47}$.

In order to obtain the cumulation of the $dx$ outputs from integrator 1, integrator 8 is provided with a $dy$ pickup mark in the $P_6$ position of the Y channel. Thus the y number in integrator 8 represents the value of the independent variable.

After setting up the work sheet shown in Figure 58, the Y and R channels of the wheel are filled by the operator using the control panel switches, as previously described.

The generation of the solution to the differential equation is now started by the operator triggering the first go flip-flop G1 by hitting either the one or zero buttons on control panel 461.

The values of the sine and cosine functions which appear in the Y channels of integrators 3 and 5, respectively, as the calculation proceeds are shown in graphical form in Figure 59. The ordinates of the graphs correspond to the indicated value of the functions in the counter, and the abscissae of the graph correspond to the summation of $dx$ units as indicated in integrator 8.

Referring to integrator 5, the initial $dx$ outputs from integrator 1 cause the positive y number initially set in its Y channel to be added into its R channel. The positive $dz$ output pulses from integrator 5 are fed into the Y channel of integrator 3 and start to increase the y number therein, thus indicating an increasing value of the sine. As evidenced by the cosine x graph, the $dx$ outputs from integrator 1 simultaneously start to transfer the positive y number in the Y channel of integrator 3 to produce output $$\frac{dy}{dx}$$

The initial outputs from integrator 3 are made negative, as before noted, in feeding into the $dy$ input of integrator 5 and thus start to decrease the value of y in integrator 5 as shown in the graph of Figure 59.

When the r number of integrator 1 reaches capacity, it emits a "one" which stops the computation. The values of the sine and cosine function, corresponding to the value of the x variables $\Delta x$ intervals, can then be directly read off as binary numbers by reading the oscilloscope 463.

The mode of generation of these functions can be more clearly seen by Figure 60. Here the unit interval $\Delta x_n$ is shown to be subdivided into $\alpha_1$ equal parts, each part equivalent to $dx$ in width. Here $\alpha_1$, as before, is the scale of the independent variable x. Thus the curve is represented by a step function having $\alpha_1$ flats in the unit interval.

It is thus clearly seen that the present invention provides a novel means and method of performing digital integration. In tests of this device, the sine and cosine function as herein described were calculated to an accuracy of seventeen significant binary figures using nineteen binary stages in the Y counter. This is better than a five significant figure decimal accuracy. It should be apparent to those skilled in the art that by utilizing additional stages for the y number the accuracy can be increased to a greater order if desired.

It should be appreciated that the term "signal indications" as used in the claims refers to physical phenomena which take place in the digital differential analyzer, as for example, the production of electrical signals. The term "sequentially presenting the integrators for computation" refers to the time-sharing arrangement in which computation is performed upon each of the integrators in sequence.

The term "independent quantity" refers to the value of x—or, in other words, to the quantity whose increments control the production of the $y\Delta x$ increments. The term "dependent quantity" in the claims refers to the value of y—or, in other words, the quantity which is combined with the increments of the indpendent quantity. The term "differential combination" as used in the claims refers to the $y\Delta x$ increments.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

We claim:

1. A digital differential analyzer, including, a plurality of integrator storage sections, means for providing in each integrator storage section signal indications representing variations in an independent variable quantity, means for providing in each integrator storage section digital signal indications representing a dependent variable quantity, sensing means for sequentially sensing said integrator storage sections including means to alter the signals recorded therein, means connected to said sensing means for differentially combining the signal indications representing the dependent quantity and the variations in the independent quantity for each integrator storage section upon occurrence of each signal representing a variation in the independent quantity of the integrator storage section to produce output signal indications for the integrator storage section and means for transferring the output signal indications of predetermined integrator storage sections to provide new signal indications representing the dependent quantity for other integrator storage sections.

2. A digital differential analyzer, including, a plurality of integrator storage sections, means for providing in each integrator storage section digital signal indications representing variations in an independent variable quantity, means for providing in each integrator storage section digital signal indications representing a dependent variable quantity, means for sensing and altering the dependent quantity in each integrator storage section on a sequential basis, means for differentially combining signal indications representing the dependent variable quantity and the variations in the independent quantity upon each occurrence of a discrete variation in the independent quantity in an integrator storage section, means for accumulating signal indications representative of said differential combinations of each of said storage sections, means for providing overflow signal indications to indicate a predetermined value of the signal indications representing said accumulation of differential combinations of each integrator storage section has been exceeded, means for providing signal indications representing increments in the dependent quantity for each integrator storage section in accordance with the signal indications representing overflow signals from certain of said integrator storage sections dependent upon a problem to be solved.

3. A digital differential analyzer, including, a plurality of integrator storage sections, means for providing signal indications in each integrator storage section representing variations in an independent variable quantity, means for providing finite signal indications in each integrator storage section representing a dependent variable quantity; means for sequentially sensing said signal indications from said integrator storage sections, means for differentially combining the signal indications representing the dependent quantity and the variations in the independent quantity in each integrator storage section during each occurrence of a discrete variation in the independent quantity in the integrator storage section, means for accumulating in each integrator storage section finite signal indications representing the differential combination, means for providing finite overflow signal indications indicating an excess of a predetermined value in the signal indications of the differential combination accumulated in each integrator storage section has occurred, means for applying the overflow signal indications from the different integrator storage sections in sequence to alter the signal indications registered therein.

4. A digital differential analyzer, including, a plurality of integrator storage sections, means including a first storage channel in each of said integrator storage sections for providing digital signal indications representing variations in an independent quantity, means including a second storage channel in each of said integrator storage sections for providing digital signal indications representing a dependent quantity, means for sequentially sensing the integrator storage sections and vary the signals representative of the independent quantity of each integrator storage section, means for differentially combining the signal indications representing the dependent quantity and the variations in the independent quantity for each integrator storage section upon discrete variations in the independent quantity to produce representative digital signals and means for providing signal indications for determining which of the signal indications representing the differential combinations from predetermined integrator storage sections shall be combined with signal indications representing the dependent quantity in each integrator storage section upon each presentation of the integrator for variations in the independent quantity for the integrator storage section.

5. A digital differential analyzer, including, a plurality of integrator storage sections, means including a first storage channel in each of said integrator storage sections for providing digital signal indications representing variations in an independent quantity, means including a second storage channel in each integrator storage section for providing digital signal indications representing a dependent quantity, means for sequentially sensing the integrator storage sections to vary the signals representative of quantities stored therein, means for differentially combining the signal indications representing the dependent quantity and the variations in the independent quantity of each integrator storage section during periods of variation to form digital signals representative of the differential combinations, means for providing signal indications for determining the manner in which the signal indications representing the differential combinations from predetermined integrator storage sections are utilized for controlling variations in quantities stored in other of said integrator storage sections.

6. A digital differential analyzer, including, a plurality of integrator storage sections, means for providing digital signal indications representing variations in an independent quantity for the integrator storage sections, means including a first storage channel in each of said integrator storage sections for registering digital signal indications representing a dependent quantity for each integrator storage section, means for sequentially sensing the integrator storage sections to vary the signals representative of the dependent quantity of each integrator storage section, means for differentially combining the signal indications representing the dependent quantity and the variations in the independent quantity for each integrator storage section to thereby produce digital signals representative of the differential combination, means including a second storage channel in each of said integrator storage sections for registering digital signal indications representing said differential combination, means for providing signal indications for controlling the manner in which the signal indications in said second storage channel representing the differential combinations of different integrators are combined with the signal indications representing the dependent quantity in each integrator.

7. A digital differential analyzer, including, a plurality of integrator storage sections, means for providing digital signal indications representing variations in an independent quantity for each of the integrator storage sections, means including a first storage channel for registering digital signal indications representing a dependent quantity in each integrator storage section, means for sensing the integrator storage sections on a sequential basis to vary the signal representative of the dependent quantity for each integrator storage section, means for differentially combining the signal indications representing the dependent quantity and the variations in the independent quantity for each integrator storage section upon each discrete variation in the dependent quantity of an integrator storage section to thereby produce digital signals representative of such a combination, means including a second storage channel for registering digital signal indications representing the differential combination for each integrator storage section, means including a third storage channel for registering overflow digital signal indications formed from said second storage channel upon a predetermined value in signal indications representing the differential combination for each integrator storage section being exceeded, and means for providing signal indications to control the manner in which the overflow signal indications from predetermined integrator storage sections are combined with the signal indications representing the dependent quantity in other integrator storage sections upon each presentation of the integrator storage section for variations of the dependent quantity for the integrator.

8. A digital differential analyzer, including, a plurality of integrator storage sections, means for providing digital signal indications representing variations in an independent quantity to each of the integrator storage sections, means including a first storage channel for registering digital signal indications representing a dependent quantity for each integrator storage section, means for sequentially sensing the integrator storage sections to vary the signals representative of the dependent quantity for each integrator storage section, means for differentially combining the signal indications representing the dependent quantity and the variations in the independent quantity for each integrator storage section during the presentation of an integrator storage section to thereby produce digital signals representative of such a combination, means including a second storage channel for registering digital signal indications representing the differential combination for each integrator storage section, means including a third storage channel for registering overflow digital signal indications formed by said second storage means upon the occurrence of an excess of a predetermined value in the differential combination for an integrator storage section, means for providing signal indications to control the manner in which the overflow signal indications from predetermined integrator storage sections are combined with the signal indications representing the dependent quantity in each integrator storage section upon each sensing of the integrator storage section, and means for recirculating in a precessing pattern, in the third storage channel, the overflow signal indications of each integrator storage section during the combination of the different quantities in the integrator storage section.

9. A digital differential analyzer, including, a plurality of integrator storage sections, means for providing digital signal indications representing variations in an independent quantity of each integrator storage section, means for sequentially sensing said integrator storage sections to vary the signals representative of the quantities registered therein, means for providing signal indications representing the polarity of the variations in the independent quantity to each integrator storage section during sensing of the integrator storage sections, means including a first storage channel in each integrator storage section during sensing of the integrator storage sections, means including a first storage channel in each integrator storage section for registering digital signal indications representing a dependent quantity for each integrator storage section, means for providing digital signal indications representing variations to be made in the dependent quantity in each integrator storage section upon each sensing of the integrator storage sections, means for differentially combining the signal indications representing the dependent quantity and the variations in the independent quantity for each integrator storage section on presentation of the integrator storage sections in accordance with the polarity of such variation to form digital signals representative of the combination, means including a second storage channel for registering in each integrator storage section signal indications digitally representing the differential combination for the integrator storage section, and means for transferring, the signal indications representing the differential combinations from certain integrator storage sections to provide new signal indications representing variations in the dependent quantity.

10. A digital differential analyzer, including, a plurality of integrator storage sections, means for registering digital signal indications representing variations of an independent quantity in each integrator storage section, means for registering signal indications representing a dependent quantity in each integrator storage section, means for sequentially sensing the integrator storage sections to vary the signal representative of the registered quantities, means for performing the differential combination of the signal indications representing the variations in the independent quantity and of the signal indications representing the dependent quantity in each integrator storage section upon each sensing of an integrator storage section to thereby form digital signals representative of such a combination, and means for producing signal indications representing the variations in the independent quantity for each integrator storage section upon the sensing of the integrator storage section and in accordance with the signal indications represented by the differntial combination for other integrator storage sections, dependent upon the problem to be solved.

11. A digital differential analyzer, including, a plurality of integrator storage sections, means for registering digital signal indications representing variations of an independent quantity in each of the integrator storage sections, means for registering digital signal indications representing a coded dependent quantity in each integrator storage section, means for sequentially sensing the integrator storage sections to vary the signals representative of the dependent quantity registered in each integrator storage section, means for performing the differential combination of the signal indications representing the variations in the independent quantity and of the signal indications representing the digitally-coded dependent quantity from each integrator storage section to form digital signal indications representative of such a combination, upon each occurrence of a digital signal representing a variation in an independent quantity, means for varying the signal indications representing the value of the dependent quantity in an integrator storage section upon each sensing of the integrator storage section and in accordance with the signal indications representing the values of the differential combinations of certain other integrator storage sections determined in accordance with a problem to be solved, means for registering the digital signal indications representing the differential combination in each integrator storage section, and means for precessing the signal indications representing the differential combinations in the integrator storage sections as each integrator storage section is sensed.

12. A digital differential analyzer, including a magnetic drum, means for rotating the drum, counting means for effecting a plurality of integrator storage sections on said drum each having a predetermined number of pulse registering positions, means for storing coded digital signal indications representing variations in an independent quantity in each integrator storage section, means for storing in certain pulse registering positions of each integrator storage section digital signal indications representing a dependent quantity, means for differentially combining the signal indications representing the dependent quantity and the variations in the independent quantity for each integrator storage section to provide digital signal indications representative of the combination, upon each occurrence of coded digital signal indications representing a variation of the independent quantity, means for storing in other pulse registering positions of integrator storage sections digital signal indications representing said differential combination, means for storing in still other pulse positions of each integrator storage section digital signal indications representing increments of the differential combination for each integrator storage section beyond the storage capacity for the signal indications representing the differential combination, and means for combining the signal indications representing increments from predetermined integrator storage sections with the signal indications representing the dependent quantity for each integrator storage section during the rotation of the magnetic drum.

13. A digital differential analyzer comprising: a recording means; means for defining said recording means into a plurality of integrator storage sections; means for scanning said recording means with sensing means to derive a plurality of signal indications from each of said integrator storage sections of said recording means, said plurality of signal indications including digital signal indications representing an increment in an independent quantity, digital signal indications representing a dependent quantity, and digital signal indications representing an accumulated differential combination of increments in said independent quantity and said dependent quantity, means for differentially combining said signal indications representing said increments in said independent quantity and said signal indications representing said dependent quantity to form differential combination signal indications upon each sensing of said signal indications representing an increment in an independent quantity, and means for adding said differential combination signal indications to accumulated differential combination signal indications registered in each of said integrator storage sections.

14. A digital differential analyzer comprising: a recording means; means for defining said recording means into a plurality of integrator storage sections; means for scanning said recording means with sensing means to derive a plurality of signal indications from each of said integrator storage sections of said recording means, said plurality of signal indications including digital signal indications representing an increment in an independent quantity, digital signal indications representing a dependent quantity, and digital signal indications representing an accumulated differential combination of increments in said independent quantity and said dependent quantity; means for differentially combining said signal indications representing said increments in said independent quantity and said signal indications representing said dependent quantity to form differential combination signal indications upon each sensing of said signal indications representing an increment in on independent quantity; means for adding said differential combination signal indications to accumulated differential combination signal indications registered in each of said integrator storage sections; means for generating an overflow signal indication at a time when said accumulated differential combination registered in an integrator storage section reaches a predetermined value; and means for varying the signals representative of the quantities registered in certain of said integrator storage sections in accordance with the said overflow signal indications from other of said integrator storage sections.

15. A digital differential analyzer including a plurality of integrator storage sections, means for registering digital signal indications representing a dependent quantity in each of said integrator storage sections, means for registering digital signal indications representing increments in an independent quantity in each of said integrator storage sections, means for sequentially sensing said signals indications in each of said integrator storage sections, means for differentially combining signal indications representing said dependent quantity and said increments in said independent quantity from each of said integrator storage sections to form digital signals representative of such a combination, and means for controlling the signal indications representing the value of said dependent quantity of certain of said integrator storage sections in accordance with said signal indications representing the differential combination of said dependent quantity and said increments in said independent quantity from other of said integrator storage sections.

16. A digital differential analyzer including, a plurality of integrator storage sections, means for registering digital indications representing a dependent quantity in each of said integrator storage sections, means for registering digital indications representing an accumulated differential combination of a dependent quantity and increments in an independent quantity in each of said integrator storage sections, means for registering digital indications representing increments in an independent quantity in each of said integrator storage sections, means for sequentially sensing said indications from each of said integrator storage sections, means for differentially combining digital indications representing said dependent quantity and said increments in said independent quantity from each of said integrator storage sections and to form incremental differential combination signal indications upon each occurrence of a digital indication representing an increment in an independent quantity, means for adding said incremental differential combination signal indications and said accumulated differential combination signal indications.

17. A digital differential analyzer including a plurality of integrator storage sections, means for sequentially sensing said integrator storage sections, means for providing signal indications representing increments in an independent quantity registered in each of said integrator storage sections, means for providing signal indications representing a dependent quantity registered in each of said integrator storage sections, means for combining said signal indications representing said dependent quantity and said increments in said independent quantity from each integrator storage section upon the sensing of a signal indication representing an increment in an independent quantity, to provide digital signal indications representing a differential combination, means for accumulating said signal indications representing a differential combination, for providing overflow signals which indicate a predetermined value in said signal indications of said differential combination has been exceeded, means for providing digital signal indications representing increments in the value of a dependent quantity in accordance with said overflow signal indications, means for registering and precessing said overflow signals in such a manner as to make said overflow signals available to each of said integrator storage sections during computation.

18. In a digital differential analyzer, a plurality of integrator storage sections, means for sequentially sensing said integrator storage sections, means for registering digital signal indications representing variations in an independent quantity in each of said integrator storage sections, means for registering digital signal indications representing a dependent quantity in each of said integrator storage sections, means for differentially combining said signal indications representing said dependent quantity and variations in said independent quantity from each of said integrator storage sections when sensed, to thereby provide digital signal indications representing said differential combination from each integrator storage section.

19. In a digital differential analyzer, a plurality of integrator storage sections, means for sequentially sensing said integrator storage sections, means for providing digital signal indications representing increments in an independent quantity for each integrator storage section, means for providing digital signal indications representing a dependent quantity registered in each of said integrator storage sections, means for differentially combining said signal indications representing said dependent quantity and said variations in said independent quantity upon sensing both of said signal indications to be combined, to form differential combination signals, means for accumulating said differential combination signals, means for registering said accumulation of said differential combination signals in each of said integrator storage sections.

20. In a digital differential analyzer a plurality of integrator storage sections, means for sequentially sensing said integrator storage sections, to thereby provide digital signal indications representing variations in an independent quantity registered in each of said integrator storage sections, and digital signal indications representing a dependent quantity registered in each of said integrator storage sections, means for differentially combining the signal indications representing said dependent quantity and said variations in said independent quantity upon the occurrence of signal indications indicating the presence of both quantities from an integrator storage section to thereby provide digital signal indications representing said differential combination for each integrator storage section, gating means for interrupting said differentially combining upon occurrence of a particular value for one of said quantities registered in said integrator storage section.

21. A digital differential analyzer including; a plurality of integrator storage sections, means for sensing each of said integrator storage sections sequentially, to thereby provide digital signal indications representing a variation in an independent quantity for each of said integrator storage sections, and digital signal indications representing a dependent quantity from each of said integrator storage sections, means for differentially combining said signal indications representing said dependent quantity and said variations in said independent quantity during sensing of each integrator storage section and upon the occurrence of signal indications representing both said dependent quantity and said variation in an independent quantity, to provide digital signal indications representative of such a combination, means for accumulating said signals representing said differential combination in each of said integrator storage sections, means connected to said means for accumulating, for providing overflow signals indicating an accumulated value of said differential combination as represented by signals, has exceeded a predetermined value, means for varying the signals registered in certain of said integrator storage sections controlled by said overflow signals from other of said integrator storage sections.

22. A digital differential analyzer including: a plurality of integrator storage sections, means for sensing each of said integrator storage sections for computation in a sequential manner, to thereby provide digital signal indications representing variations in an independent quantity from each of said integrator storage sections and digital signal indications representing a dependent quantity from each of said integrator storage sections, means for differentially combining said signal indications representing said dependent quantity and variations in said independent quantity from each integrator storage section upon sensing of said integrator storage section, to thereby provide digital signal indications representing the differential combination for each integrator storage section, means for accumulating said signals representing said differential combination, in said integrator storage sections, for providing overflow signal indications indicating an exceeding of a predetermined value by said differential combination for an integrator storage section, and means for varying the signal indications representing said dependent quantity for each integrator storage section in accordance with said overflow signal indications from certain of said integrator storage sections dependent upon the problem undergoing solution.

23. A digital differential analyzer including a plurality of integrator storage sections, means for sequentially scanning each of said integrator storage sections, to thereby provide digital signal indications representative of variations in an independent quantity registered in each of said integrator storage sections, and digital signal indications representative of a dependent quantity registered in each of said integrator storage sections, means for differentially combining said signal indications representative of said dependent quantity and variations in said independent quantity from each of said integrator storage sections during the period when each of said integrator storage sections are being considered, to thereby provide digital signal indications representative of the differential combination from each of said integrator storage sections, means for accumulating the value of said differential combination and providing digital overflow signal indications indicating that a predetermined value of said differential combination in each of said integrator storage sections has been exceeded, means for registering and precessing said overflow signal indications such as to enable said overflow indications to be available for utilization during consideration of each of said integrator storage sections and means to vary the magnitude of quantities registered in each of said integrator storage sections under control of said overflow signal indications.

24. In a digital differential analyzer first, second, and third storage channels each having a plurality of pulse registering positions, means including a plurality of counters for defining said first and said second channels into a plurality of integrator storage sections, each of said integrator storage sections having a plurality of pulse registering positions, means for sequentially scanning said pulse positions of said integrator storage sections during computation, means for providing in said first channel digital signal indications representing a dependent quantity for each of said integrator storage sections, means for providing in said second channel digital signal indications representing variations in an independent quantity for each of said integrator storage sections, means for providing a marker pulse in a pulse registering position in said third channel, means for differentially combining signal indications in said first and said second channels in a particular integrator storage section depending on the presence of a marker pulse in said third channel in a predetermined pulse registering position to thereby form digital signal indications representative of the combination, and means operative to advance said marker pulse to different positions in said third channel.

25. In a digital differential analyzer, a recording means having first, second, and third channels, each of said channels have a plurality of pulse registering positions, means including a plurality of counters for dividing said first and said second channels into a plurality of integrator storage sections, each of said integrator storage sections having a plurality of pulse registering positions, means for sequentially reading the content of said integrator storage sections, means for providing in said first channel digital signal indications representing a dependent quantity for each integrator storage section, means for providing digital signal indications representing variations in an independent quantity for each of said integrator storage sections, means for providing in said second channel digital signal indications representing a differential combination of a dependent quantity and variations in a dependent quantity for each of said integrator storage sections, means for providing a marker pulse in said third channel, means for differentially combining signal indications from a particular integrator storage section of said first channel with signal indications representing digital variations in an independent quantity to thereby form digital signal indications representative of such a combination, upon the presence of a marker pulse in a certain pulse registering position in said third channel, means operative to advance said marker pulse to a different pulse position in said third channel.

26. In a digital differential analyzer, a plurality of integrator storage sections, means for sensing the integrator storage sections in sequence to provide signal indications representing variations in an independent quantity for each integrator storage section, and signal indications digitally representing a dependent quantity for each integrator storage section, electrical circuits for differentially combining the signal indications representing the dependent quantity and the variations in the independent quantity for each integrator storage section to form signal indications representative of such a combination, upon the presentation of the integrator storage section for sensing and upon each digital variation in the independent quantity for the integrator storage section, electrical circuits for providing overflow signal indications to indicate an excess of a predetermined value has occurred, as represented by the signal indications representing the differential combination for each integrator storage section, electrical circuits for transferring to each integrator storage section the overflow signal indications from different integrator storage sections in the plurality, and electrical circuits for providing signal indications representing variations in the dependent and independent quantities for each integrator storage section in accordance with the overflow signal indications from certain integrator storage sections dependent upon the problem to be solved.

27. A differential analyzer comprising: storage means for registering signal representations, representative of a plurality of numerical values; means for sensing first digital signal representations registered in said storage means representative of a dependent quantity of a mathematical function; means for varying said first digital signal representations in accordance with variations in said dependent quantity; means for providing second digital signal representations, representative of variations in an independent quantity of said mathematical function; means for sensing third digital signal representations registered in said storage means, representative of a combination of said dependent quantity and variations in said independent quantity; means connected to receive said first and said second digital signal representations for forming fourth digital signal representations, representative of the product of said dependent quantity and said variations in said independent quantity upon the occurrence of signal representations representative of variations in an independent quantity; means connected to receive said third and said fourth signal representations for forming fifth signal representations, representative of the accumulation of the quantities represented by said third and said fourth signal representations; and means for returning said first and said fifth signal representations to said storage means.

28. A differential analyzer comprising: storage means for registering digital signal representations, representative of a plurality of numerical values; means for sensing first digital signal representations registered in said storage means representative of one quantity of a mathematical function; means for varying said first digital signal representations in accordance with received digital signal representations representative of variations in said one quantity; means for receiving second digital signal representations, representative of variations in an other quantity of said mathematical functions; means for sensing third digital signal representations registered in said storage means, representative of a combination of said one quantity and variations in said other quantity; means connected to receive said first and said second signal representations for forming fourth digital signal representations upon the occurrence of said second digital signal representations, said fourth signal representations being representative of the product of said one quantity and variations in said other quantity; means connected to receive said third and said fourth signal representations for forming fifth digital signal representations, representative of the accumulation of the quantities represented by said third and said fourth digital signal representations; and means for returning said first and said fifth digital signal representations to said storage means.

29. A differential analyzer comprising: storage means for registering digital signal representations, representative of a plurality of numerical values; means for sequentially sensing first digital signal representations registered in said storage means, each representative of one quantity of a mathematical function; means for varying said first signal representations in accordance with received digital signal representations, representative of variations in said one quantity; means for sequentially providing second digital signal representations each representative of variations in an other quantity of said mathematical function; means for sequentially sensing third digital signal representations registered in said storage means, each representative of a combination of said one quantity and variations in said other quantity; means connected to receive said first and said second signal representations for forming fourth digital signal representations upon the occurrence of said second digital signal representations indicating a discrete variation in said other quantity, said fourth signal representations being representative of the product of said one quantity and variations in said other quantity; means connected to receive said third and said fourth signal representations for forming fifth digital signal representations, representative of the accumulation of the quantities represented by said third and said fourth signal representations; and means for returning said first and said fifth signal representations to said storage means.

30. A differential analyzer comprising: storage means for registering digital signal representations, representative of a plurality of numerical values; means for sensing first digital signal representations registered in said storage means representative of one quantity of a mathematical function; means for varying said first digital signal representations in accordance with variations in said one quantity; means for providing second digital signal representations, representative of variations in an other quantity of said mathematical functions; means for sensing third digital signal representations registered in said storage means, representative of a combination of said one quantity and variations in said other quantity; means connected to receive said first and said second digital signal representations for forming fourth digital signal representations upon each occurrence of second signal representations indicating a change in said other quantity, said fourth signal representations being representative of the product of said one quantity and variations in said other quantity; means connected to receive said third and said fourth digital signal representations for forming fifth digital signal representations, representative of the accumulation of the quantities represented by said third and said fourth digital signal representations; and means for returning said first and said fifth digital signal representations to said storage means.

31. A differential analyzer comprising: storage means for registering signal representations, representative of a plurality of numerical values; means for sequentially sensing different first digital signal representations registered in said storage means representative of a dependent quantity of a mathematical function; means for sequentially providing different digital signal representations, representative of variations in said dependent quantity, and for varying said first signal representations; means adapted to sequentially receive different second digital signal representations, representative of variations in an independent quantity of said mathematical function; means for sequentially sensing different third digital signal representations registered in said storage means, representative of a combination of said dependent quantity and variations in said independent quantity; means connected to sequentially receive said different first and said second signal representations for forming different fourth digital signal representations upon the occurrence of said second signal representations indicating a discrete variation in said independent quantity, said fourth signal representations being representative of the product of said dependent quantity and said variations in said independent quantity; means connected to sequentially receive said different third and said different fourth signal representations for forming different fifth signal representations, representative of the accumulation of the quantities represented by said third and said fourth signal representations; and means for sequentially returning said first and said fifth signal representations to said storage means.

32. Apparatus according to claim 27 wherein said signal representations may alternatively represent positive and negative numerical values.

References Cited in the file of this patent

UNITED STATES PATENTS

| | | |
|---|---|---|
| 2,540,654 | Cohen | Feb. 6, 1951 |
| 2,564,403 | May | Aug. 14, 1951 |
| 2,614,169 | Cohen et al. | Oct. 14, 1952 |
| 2,701,095 | Stibitz | Feb. 1, 1955 |
| 2,737,342 | Nelson | Mar. 6, 1956 |
| 2,749,037 | Stibitz | June 5, 1956 |
| 2,776,794 | Williams | Jan. 8, 1957 |
| 2,785,855 | Williams | Mar. 19, 1957 |

OTHER REFERENCES

Journal of the Franklin Institute, "A New Type of Differential Analyzer," by V. Bush, October 1945 (pages 255 to 326 total; pages 255 to 270, 280, 281 considered necessary).

"Third Interim Progress Report on the Physical Realization of an Electronic Computing Instrument," Bigelow et al., Institute for Advanced Study, Princeton, N.J., pages 128 to 138. January 1, 1948.

"A Magnetic Digital Storage System," Booth, Electronic Engineering, pages 234 to 328, July 1949.

"Functional Description of the Edvac," Univ. of Pa., Moore School of Electrical Engineering, volumes I and II, November 1, 1949. Vol. I pp. 1-1 to 1-5; 4-1 to 4-5; vol. II, dwgs. 104-10LD-6 and 104-3LD-2.

"Magnetic Drum Storage for Digital Information Processing Systems," Mathematic Tables and Other Aids to Computation, National Research Council, Washington, D.C., pages 31 to 39, January 1950.

"Positive Gate Counter Circuit," Ratz, Electronics, November 1950, pages 194, 196, 198, 200, 202 and 204.